United States Patent
Hayasaka et al.

(10) Patent No.: US 9,996,286 B2
(45) Date of Patent: Jun. 12, 2018

(54) DATA STORAGE SYSTEM, PROCESS AND COMPUTER PROGRAM FOR SUCH DATA STORAGE SYSTEM FOR REDUCING READ AND WRITE AMPLIFICATIONS

(71) Applicant: Hitachi, Ltd., Tokyo (JP)

(72) Inventors: Mitsuo Hayasaka, Tokyo (JP); Christopher James Aston, Tokyo (JP); Jonathan Mark Smith, Tokyo (JP); Yuko Matsui, Tokyo (JP); Simon Latimer Benham, Tokyo (JP); Trevor Edward Willis, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days. days.

(21) Appl. No.: 15/373,686

(22) Filed: Dec. 9, 2016

(65) Prior Publication Data
US 2017/0329541 A1    Nov. 16, 2017

Related U.S. Application Data

(63) Continuation of application No. PCT/US2016/031811, filed on May 11, 2016.

(51) Int. Cl.
*G06F 3/06*    (2006.01)
*G06F 12/08*    (2016.01)
(Continued)

(52) U.S. Cl.
CPC ............ *G06F 3/0619* (2013.01); *G06F 3/065* (2013.01); *G06F 3/0685* (2013.01);
(Continued)

(58) Field of Classification Search
CPC ......... G06F 17/30067; G06F 17/30631; G06F 17/30625; G06F 17/30336;
(Continued)

(56) References Cited

U.S. PATENT DOCUMENTS

| | | | |
|---|---|---|---|
| 5,386,545 A * | 1/1995 | Gombos, Jr. | ......... G06F 3/0601 707/640 |
| 7,873,601 B1 * | 1/2011 | Kushwah | ............ G06F 11/1451 707/654 |

(Continued)

*Primary Examiner* — Mano Padmanabhan
*Assistant Examiner* — William E. Baughman
(74) *Attorney, Agent, or Firm* — Mattingly & Malur, PC

(57) ABSTRACT

The present disclosure relates to a data storage system, and processes and computer programs for such data storage system, for example including processing of: managing one or more metadata tree structures for storing data to one or more storage devices of the data storage system in units of blocks, each metadata tree structure including a root node pointing directly and/or indirectly to blocks, and a leaf tree level having one or more direct nodes pointing to blocks, and optionally including one or more intermediate tree levels having one or more indirect nodes pointing to indirect nodes and/or direct nodes of the respective metadata tree structure; maintaining the root node and/or nodes of at least one tree level of each of at least one metadata structure in a cache memory; and managing I/O access to data based on the one or more metadata structures.

26 Claims, 39 Drawing Sheets

(51) Int. Cl.
*G06F 17/30* (2006.01)
*G06F 12/02* (2006.01)
*G06F 12/0811* (2016.01)

(52) U.S. Cl.
CPC ...... *G06F 12/0811* (2013.01); *G06F 12/0246* (2013.01); *G06F 17/3023* (2013.01); *G06F 17/30088* (2013.01); *G06F 17/30203* (2013.01); *G06F 2212/283* (2013.01)

(58) Field of Classification Search
CPC ......... G06F 17/30321; G06F 17/30327; G06F 17/3007; G06F 17/30091; G06F 17/301; G06F 17/30088; G06F 17/30082; G06F 17/30085; G06F 17/3012; G06F 17/30132; G06F 17/30961; G06F 3/0619; G06F 3/065; G06F 12/0811; G06F 2212/283

See application file for complete search history.

(56) References Cited

U.S. PATENT DOCUMENTS

| | | | |
|---|---|---|---|
| 2008/0040385 A1* | 2/2008 | Barrall | G06F 17/30203 |
| 2011/0035359 A1* | 2/2011 | Bendakovsky | G06F 11/1458 |
| | | | 707/640 |
| 2015/0081966 A1 | 3/2015 | Zheng et al. | |
| 2016/0335278 A1* | 11/2016 | Tabaaloute | G06F 17/30212 |

* cited by examiner

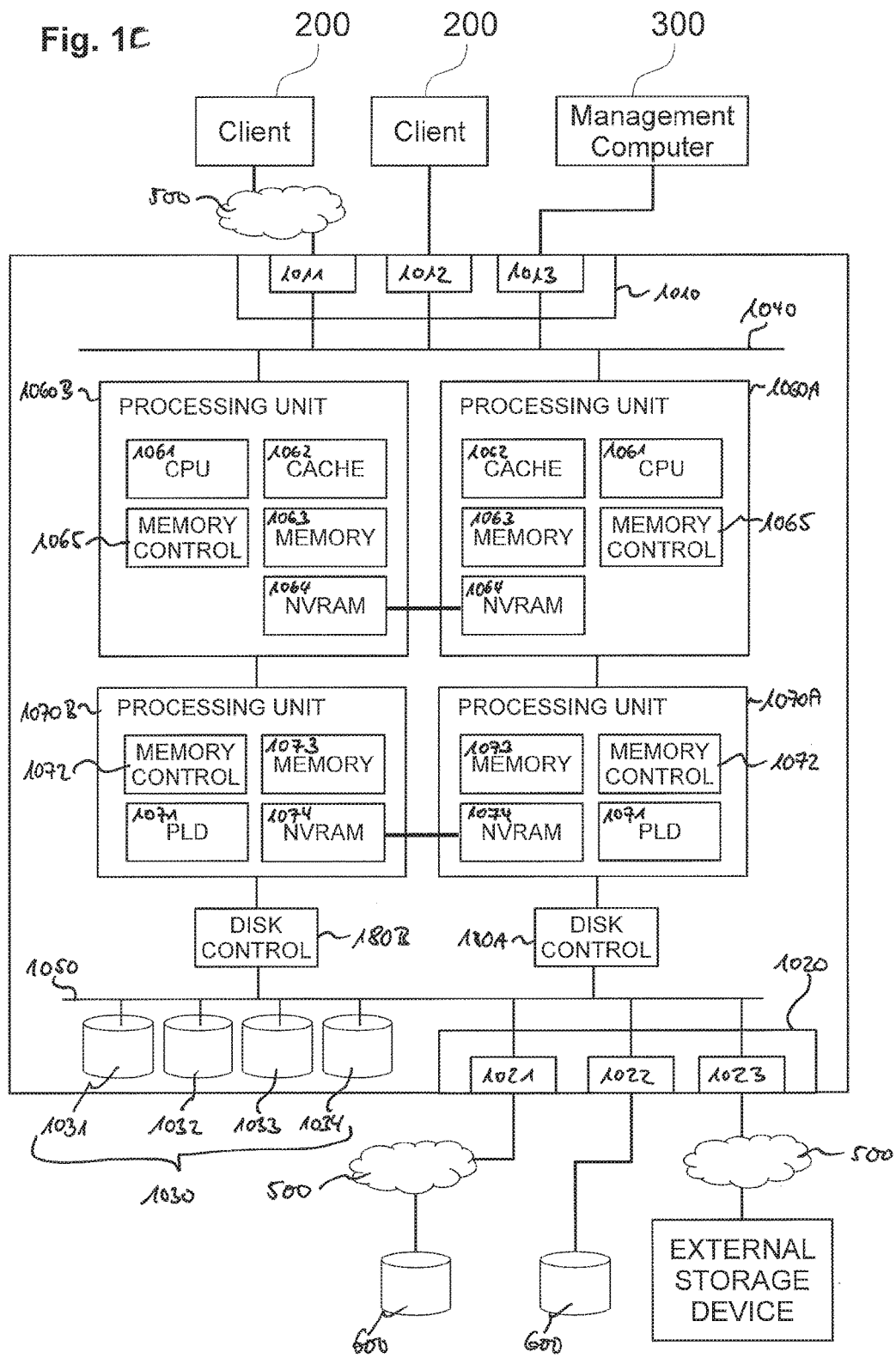

5 random read operations 3 cache reads 2 random read operations 2 random read operations 1 cache read

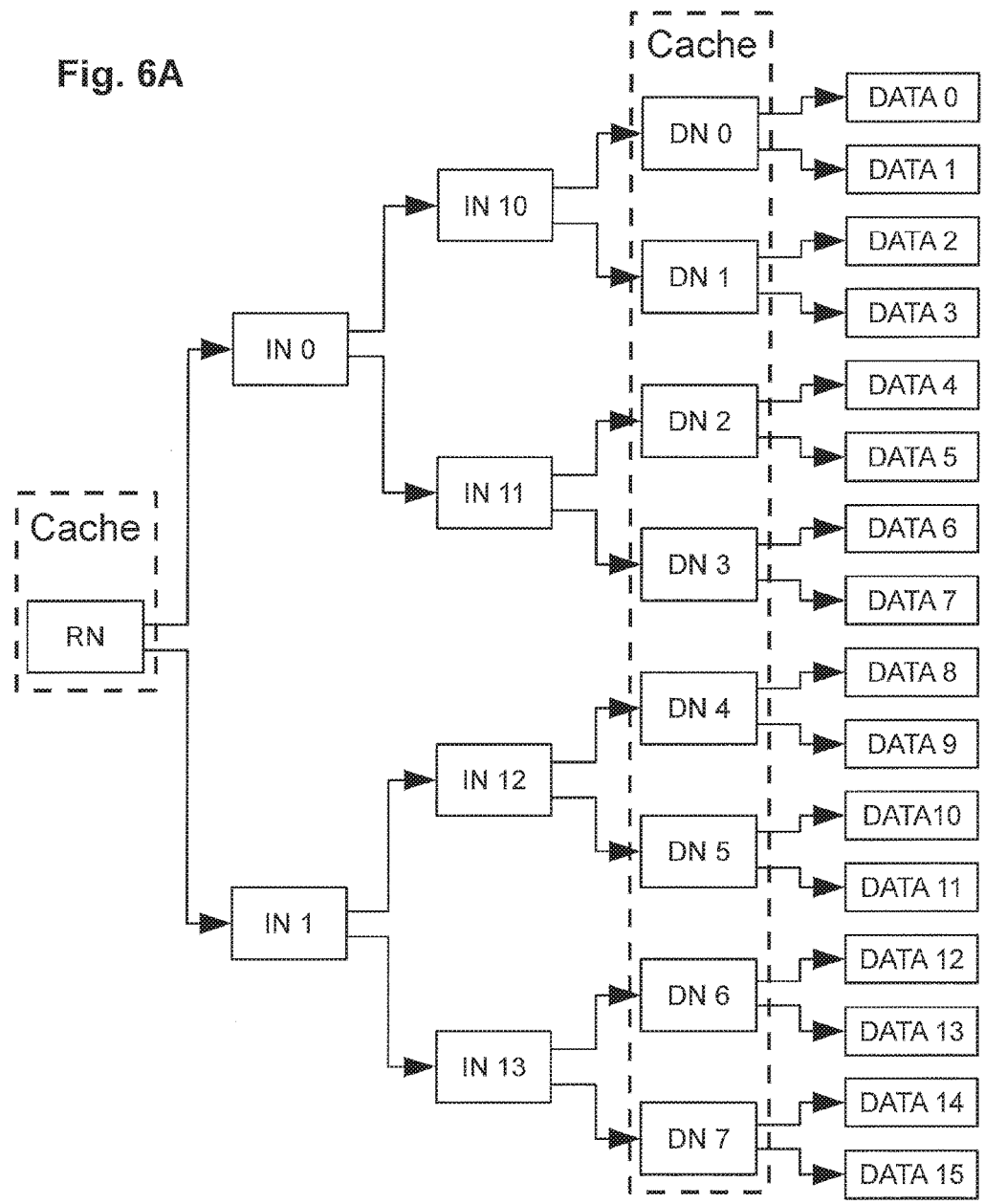

DATA STORAGE SYSTEM, PROCESS AND COMPUTER PROGRAM FOR SUCH DATA STORAGE SYSTEM FOR REDUCING READ AND WRITE AMPLIFICATIONS

The present disclosure relates to a data storage system and/or a data storage apparatus connectable to one or more host computers, and in particular a data storage system and/or a data storage apparatus processing I/O requests.

Further, the present disclosure relates to methods of control of such data storage system and/or a data storage apparatus. Other aspects may relate to computer programs, computer program products and computer systems to operate software components including executing processing I/O requests at such data storage system and/or a data storage apparatus.

BACKGROUND

When managing I/O requests from clients to data stored in units of blocks on storage devices based on a metadata tree structure including a root node directly or indirectly pointing to blocks e.g. via indirect nodes pointing to direct nodes and via direct nodes pointing to blocks of data, in particular in connection with a log write method which writes modified data to newly allocated blocks, it has been recognized that by referring to the metadata nodes by processing the metadata tree structure may lead to significant read and write amplifications due to random reads and/or random writes in connection with metadata nodes.

In view of the above problem, it is an object of the present invention to provide aspects in a data storage system, which provides and updates a metadata tree structure of plural metadata nodes for managing I/O requests, allowing to reduce or avoid read and write amplifications, preferably while achieving high efficiency in handling I/O requests from a high number of clients and in connection with multiple types of I/O access protocols, economical use of storage resources and memories, efficient scalability for clustered systems of multiple node apparatuses, highly reliable and efficient data consistency and data protection, and efficient and reliable recovery functions in case of failures.

SUMMARY

According to the invention, there is proposed a computer program, a method and a data storage system according to independent claims. Dependent claims related to preferred embodiments.

According to exemplary aspects, there may be provided a computer program including instructions to cause a computer to execute a method for managing a data storage system.

The method may be comprising: managing one or more metadata tree structures for storing data to one or more storage devices of the data storage system in units of blocks, each metadata tree structure including a root node pointing directly and/or indirectly to blocks, and a leaf tree level having one or more direct nodes pointing to blocks, and optionally including one or more intermediate tree levels having one or more indirect nodes pointing to indirect nodes and/or direct nodes of the respective metadata tree structure; maintaining the root node and/or metadata nodes of at least one tree level of each of at least one metadata structure in a cache memory; and managing I/O access to data based on the one or more metadata structures, including obtaining the root node and/or nodes of the at least one tree level of the metadata structure maintained in the cache memory from the cache memory and obtaining at least one node of another tree level of the metadata structure from the one or more storage devices.

According to exemplary aspects, the root node and/or metadata nodes of at least one tree level of each of at least one metadata structure are preferably systematically maintained in the cache memory preferably for managing the I/O access to data based on the one or more metadata structures.

For example, "systematically maintaining" a certain data unit in cache memory may mean that the data unit is kept in cache memory until reset or re-boot of the system, and is updated whenever modified in cache memory. Specifically, data systematically maintained in cache memory may be kept in cache memory for a long time (e.g. until manual reset or system shutdown or re-boot), in particular independent of whether the data is frequently accessed, less frequently accessed or accessed at all. Other data may be commonly kept in cache memory temporarily (e.g. according to FIFO management), and such data is only kept longer in cache memory when used or accessed regularly. At system start, data systematically maintained in cache memory may be automatically loaded into the cache memory independent of access to the data, while other data is only loaded to cache memory when actually needed.

According to exemplary aspects, metadata nodes of at least one other tree level of each of at least one metadata structure are preferably temporarily loaded to the cache memory, preferably when required for managing the I/O access to data based on the one or more metadata structures.

According to exemplary aspects, metadata nodes of a first group associated with one or more lowest tree levels of each of at least one metadata structure, in particular including at least a tree level of direct nodes, are preferably temporarily loaded to the cache memory when required for managing the I/O access to data based on the one or more metadata structures.

According to exemplary aspects, metadata nodes of a second group associated with one, more or all higher tree levels above the one or more lowest tree level in each of at least one metadata structure are systematically maintained in the cache memory.

According to exemplary aspects, writing modified metadata nodes of the first group to the one or more storage devices is preferably controlled on the basis of taking a first-type of checkpoint.

According to exemplary aspects, writing modified metadata nodes of the second group to the one or more storage devices is preferably controlled on the basis of taking a second-type of checkpoint.

According to exemplary aspects, taking a new first-type checkpoint (and preferably writing metadata nodes of the first group which have been modified in a previous first-type checkpoint to the one or more storage devices upon taking the new first-type checkpoint), is preferably performed more frequent than taking a new second-type checkpoint (and preferably writing metadata nodes of the second group which have been modified in a previous second-type checkpoint to the one or more storage devices upon taking the new second-type checkpoint).

According to exemplary aspects, modifying one or more metadata nodes of the first group preferably includes writing the one or more modified metadata nodes to a non-volatile memory.

According to exemplary aspects, modifying one or more metadata nodes of the second group preferably includes writing respective delta data for each of the one or more modified metadata nodes to the non-volatile memory, each respective delta data preferably being indicative of a difference between the respective modified metadata node of the second group as stored in the cache memory and the respective non-modified metadata node as stored on the one or more storage devices.

According to exemplary aspects, the size of a delta data unit is preferably smaller than a size of an associated metadata node.

According to exemplary aspects, taking a new first-type checkpoint is preferably performed when an amount of data of metadata nodes of the first group in the non-volatile memory exceeds a first threshold.

According to exemplary aspects, taking a new second-type checkpoint is preferably performed when an amount of delta data associated with metadata nodes of the second group in the non-volatile memory exceeds a second threshold.

According to exemplary aspects, the second threshold is preferably larger than the first threshold.

According to exemplary aspects, when performing a recovery operation, the method may include recovering a previously modified metadata node of the first group preferably includes reading the modified metadata node of the first group from the non-volatile memory.

According to exemplary aspects, when performing a recovery operation, the method may include recovering a previously modified metadata node of the second group preferably includes reading the corresponding non-modified metadata node from the one or more storage devices, reading corresponding delta data from the non-volatile memory, and modifying the non-modified metadata node based on the corresponding delta data.

According to exemplary aspects, the method may include changing a highest node tree level of the metadata nodes of the first group to become a new lowest node tree level of the metadata nodes of the second group preferably based on monitoring a cache capacity, in particular preferably if a data amount of metadata nodes of the second group falls below a third threshold.

According to exemplary aspects, the method may include changing a lowest node tree level of the metadata nodes of the second group to become a new highest node tree level of the metadata nodes of the first group preferably based on monitoring a cache capacity, in particular preferably if a data amount of metadata nodes of the second group exceeds a fourth threshold.

According to exemplary aspects, when modifying a metadata node of the second group associated with a new second-type checkpoint before a respective corresponding modified metadata node of the second group associated with a previous second-type checkpoint is written to the one or more storage devices, the respective modified metadata node of the second group associated with the new second-type checkpoint and corresponding reverse delta data is preferably stored in the cache memory, the corresponding reverse delta data being preferably indicative of a difference between the respective modified metadata node of the second group as stored in the cache memory and the respective corresponding modified metadata node of the second group associated the previous second-type checkpoint.

According to exemplary aspects, writing the respective corresponding modified metadata node of the second group associated with the previous second-type checkpoint to the one or more storage devices preferably includes modifying the respective modified metadata node of the second group as stored in the cache memory based on the corresponding reverse delta data as stored in the cache memory.

According to further aspects there may be provided a method for managing a data storage system, comprising: managing one or more metadata tree structures for storing data to one or more storage devices of the data storage system in units of blocks, each metadata tree structure including a root node pointing directly and/or indirectly to blocks, and a leaf tree level having one or more direct nodes pointing to blocks, and optionally including one or more intermediate tree levels having one or more indirect nodes pointing to indirect nodes and/or direct nodes of the respective metadata tree structure; maintaining the root node and/or metadata nodes of at least one tree level of each of at least one metadata structure in a cache memory; and/or managing I/O access to data based on the one or more metadata structures, including obtaining the root node and/or nodes of the at least one tree level of the metadata structure maintained in the cache memory from the cache memory and obtaining at least one node of another tree level of the metadata structure from the one or more storage devices.

In the following, further aspects are described, which may be provided independently of the above aspects or in combination with one or more of the above aspects.

According to exemplary aspects, there may be provided a computer program including instructions to cause a computer to execute a method for managing a data storage system and/or a method for managing a data storage system.

The method may further comprise managing a data structure (such as e.g. allocation management information, a free space object, and/or a free space bit map). Such data structure may preferably be indicative of an allocation status of each of a plurality of blocks of storage, the allocation status of a block preferably being free or used. For example, such data structure may include a plurality of indicators (such as bits, groups of bits, bytes or groups of bytes), wherein each indicator is associated with a respective storage block and each indicator is indicative of an allocation status of its associated storage block.

Preferably, if an allocation status of a block is indicated as "free", the corresponding storage block is preferably available for allocation, e.g. for writing a data block of user data or a metadata node to the storage block upon allocation.

Preferably, if an allocation status of a block is indicated as "used", the corresponding storage block is preferably storing previously written data of a data block of user data or a metadata node to the storage block, thereby not being available for re-allocation, so that the "used" block is preferably not allocated for writing another data block until being freed (e.g. when the previously written data is not needed anymore and the block can be made available again for allocation for writing new data).

Further, in some exemplary embodiments, if the allocation status of a block is indicated as "used", the allocation management information may be further indicative of a reference count of the block. Such reference count may preferably be indicative of a number of how many pointers of other objects, metadata structures and/or metadata nodes of one or more metadata structures point to the respective block. For example, a block can be allocated again once a reference count of a block is decremented to zero, and no other objects, metadata structures and/or metadata nodes point to the respective block.

The method may preferably comprise updating a data structure, such as e.g. allocation management information, a free space object, and/or a free space bit map, indicative of an allocation status of each of a plurality of blocks of storage.

The method may comprise performing, during managing I/O access, allocation operations which may include changing a status of one or more blocks from "free" to "used" and/or incrementing a reference count of one or more blocks from zero to one (or more).

The method may comprise performing, during managing I/O access, non-allocation operations which may include changing a status of one or more blocks from "used" to "free" and/or incrementing and/or decrementing a reference count of one or more blocks.

Preferably, when changing a status of one or more blocks (or, preferably, after changing a status of one or more blocks, for non-allocation operations), the method may include performing an update operation of modifying the data structure (such as e.g. allocation management information, a free space object, and/or a free space bit map) to be indicative of the changed status of the block.

Furthermore, the data structure (such as e.g. allocation management information, a free space object, and/or a free space bit map) may be logically divided into a plurality of regions, each region being preferably associated with a respective group of storage blocks.

The method may further comprise managing, for each of the plurality of regions, respective update operation management information being indicative of one or more non-allocation update operations to be applied to update the data structure (such as e.g. allocation management information, a free space object, and/or a free space bit map).

The method may further include accumulating, for each region, data entries of respective update operation management information associated with the respective region, each data entry being indicative of a non-allocation update operation to be applied to update the respective region of the data structure (such as e.g. allocation management information, a free space object, and/or a free space bit map) before updating the data structure according to the accumulated non-allocation update operations to be applied. Accordingly, a region of the data structure can be updated by applying plural or all of accumulated non-allocation update operations based on the respective update operation management information associated with the respective region.

Preferably, updating the data structure (such as e.g. allocation management information, a free space object, and/or a free space bit map) by applying non-allocation update operations is performed on a region-by-region basis.

Preferably, updating a region of the data structure is performed when an applying criteria is met.

For example, the number of entries and/or the number of accumulated update operation entries in update operation management information per region may be monitored, and when the number of entries and/or the number of accumulated update operation entries in update operation management information exceed a threshold, the accumulated update operations of the respective region can be applied. Then, the applying criteria may be fulfilled when the number of entries and/or the number of accumulated update operation entries in update operation management information exceed a threshold for at least one region.

Also, in addition or alternatively, the applying criteria may involve a periodic update such that the applying criteria is fulfilled whenever a periodic time to update expires, and at that time, the one or more regions being associated with the highest number of entries and/or the highest number of accumulated update operation entries in update operation management information are selected to be updated.

Also, in addition or alternatively, the applying criteria may involve a check of an amount of available free blocks that can be used for allocation according to the allocation management information of the data structure (such as e.g. allocation management information, a free space object, and/or a free space bit map), and when the amount of available free blocks falls below a threshold, one or more regions of the allocation management information are updated, e.g. until the amount of free blocks that can be used for allocation according to the allocation management information of the data structure is sufficiently increased, e.g. until the amount of free blocks exceeds a second threshold. Again, at that time, the one or more regions being associated with the highest number of entries and/or the highest number of accumulated update operation entries in update operation management information can be selected to be updated.

Preferably, applying a non-allocation update operation in a region of the data structure changes an indication of an allocation status of an associated block, e.g. by changing the status of the block from used to free (thereby indicating the block to be available for re-allocation), by changing the status of the block to increment a reference count thereof, or decrement a reference count thereof (e.g. decrementing the reference count to a non-zero value, or decrementing the reference count to zero, thereby indicating the block to be available for re-allocation).

Preferably, the respective update operation management information for one or more or all of the regions of the data structure may be stored in a cache memory. Furthermore, the respective update operation management information for one or more or all of the regions of the data structure may be stored in a cache memory and/or on storage devices.

Such data structure as above (such as e.g. allocation management information, a free space object, and/or a free space bit map) may be managed as data stored to storage blocks, and the data structure may be managed based on a metadata structure similar to metadata structures of data objects in the sense of the present disclosure, e.g. on the basis of a metadata tree structure preferably including a root node pointing directly and/or indirectly to blocks, and a leaf tree level having one or more direct nodes pointing to blocks, and optionally including one or more intermediate tree levels having one or more indirect nodes pointing to indirect nodes and/or direct nodes of the respective metadata tree structure.

When managing I/O access to data based on the one or more metadata structures, the method may comprise allocating one or more blocks for writing user data in units of data blocks and/or metadata nodes in units of data blocks and/or at a size equal or smaller than a block size. Accordingly, such allocation of blocks may occur in connection with writing user data (e.g. in units of blocks to storage blocks), and/or when modifying a metadata structure associated with user data in connection with writing one or more metadata nodes (e.g. in units of blocks to storage blocks).

In the above, the method may preferably be comprising managing I/O access to data based on the one or more metadata structures, including managing one or more metadata tree structures for storing data to one or more storage devices of the data storage system in units of blocks, each metadata tree structure may be preferably including a root node pointing directly and/or indirectly to blocks, and a leaf tree level having one or more direct nodes pointing to blocks, and optionally including one or more intermediate tree levels having one or more indirect nodes pointing to indirect nodes and/or direct nodes of the respective metadata tree structure.

The method may preferably comprise managing I/O access to data based on the one or more metadata structures, including obtaining the root node and/or metadata nodes of one or more tree levels of the metadata structure.

According to further aspects there may be provided data storage system connectable to one or more client computers, comprising a processing unit including a processor and/or a programmable logic device; a cache memory; and one or more storage devices and/or an interface to communicably connect with one or more storage devices; the processing unit being preferably adapted to execute one or more methods according to one or more of the above aspects and/or one or more methods of the present disclosure.

BRIEF DESCRIPTION OF THE DRAWINGS

FIG. 1C exemplarily shows a schematic diagram of another data storage apparatus according to exemplary embodiments;

FIGS. 6A to 6C exemplarily show an exemplary metadata tree structure in connection with further examples of a metadata subtree caching according to further exemplary embodiments;

DETAILED DESCRIPTION OF THE ACCOMPANYING DRAWINGS AND EXEMPLARY EMBODIMENTS

Figure 1A:
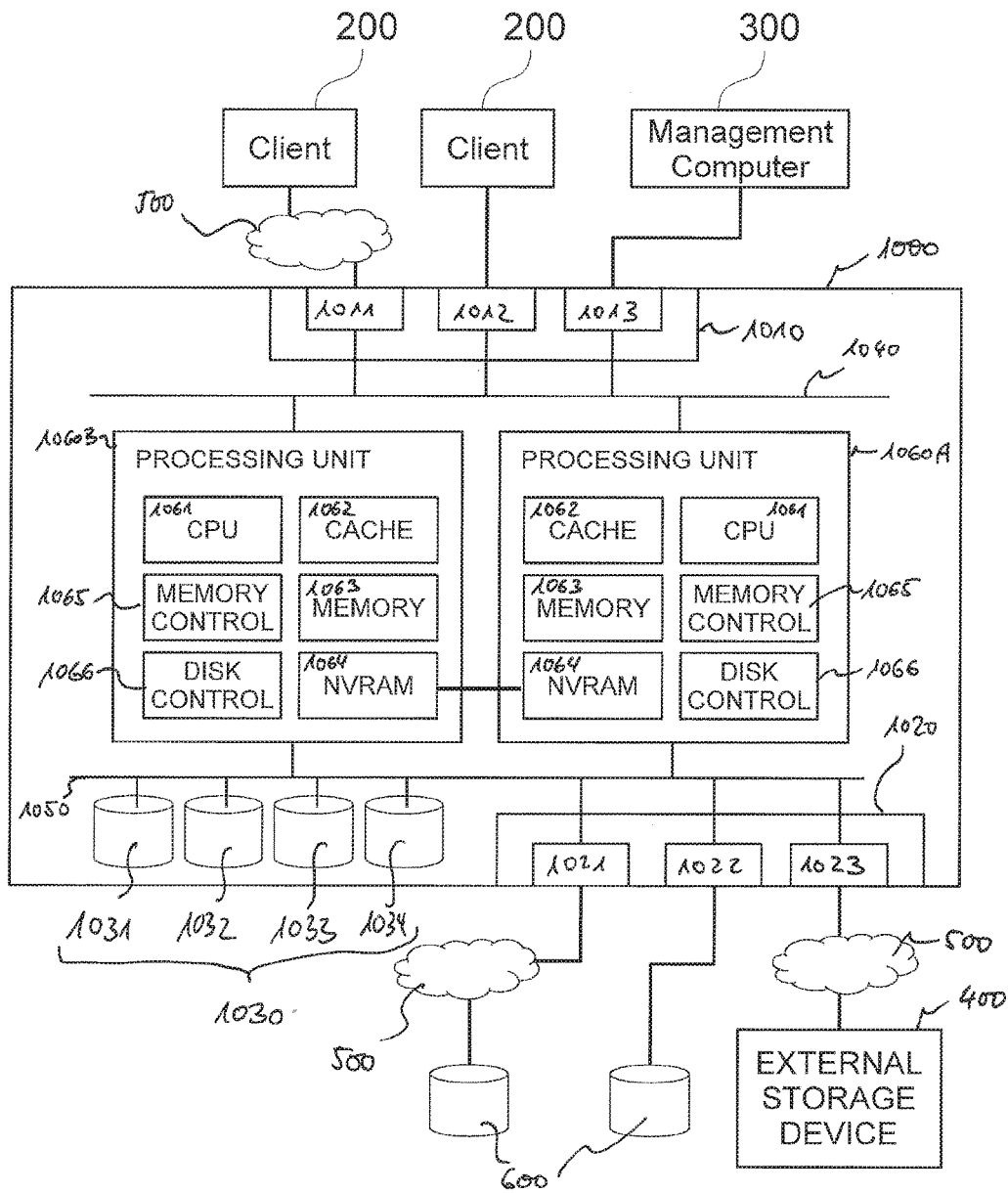
FIG. 1A exemplarily shows a schematic diagram of a data storage apparatus according to exemplary embodiments.

In the following, preferred aspects and exemplary embodiments will be described in more detail with reference to the accompanying figures. Same or similar features in different drawings and embodiments are sometimes referred to by similar reference numerals. It is to be understood that the detailed description below relating to various preferred aspects and preferred embodiments are not to be meant as limiting the scope of the present invention.

Terminology

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk". A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume". Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID", and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs referred to as ranges, stripesets, and spans. File system functionality of a file server may include object management, free space management (e.g. allocation) and/or directory management.

A "block" is generally a unit of storage of predetermined size. A "storage block" may be a unit of storage in the file system that corresponds to portion of physical storage in which user data and/or system data is stored. A file system object (discussed below) generally includes one or more blocks. A "data block" may refer to a unit of data (e.g. user data or metadata) to be written to one storage block. Typically the terms "block", "data block" or "data storage block" may be used interchangeably in the framework of the present disclosure since usually the allocation of a storage block is followed by writing the data to the storage block, hence "data block" may also refer to the unit of storage in the file system that corresponds to portion of physical storage in which user data and/or system data is stored.

Exemplary embodiments of the present invention are described with reference to an exemplary file system of the type used in various file servers e.g. as sold by Hitachi Data Systems and known generally as BLUEARC TITAN™ and MERCURY™ file servers, although it should be noted that various concepts may be applied to other types of data storage systems.

An exemplary file server is described in U.S. Pat. No. 7,457,822, entitled "Apparatus and Method for Hardware-based File System", which is incorporated herein by reference, and PCT application publication number WO 01/28179 A2, published Apr. 19, 2001, entitled "Apparatus and Method for Hardware Implementation or Acceleration of Operating System Functions", which is incorporated herein by reference. Another implementation of an exemplary file server and hardware-implemented file system management is set forth in U.S. application Ser. No. 09/879,798, filed Jun. 12, 2001, entitled "Apparatus and Method for Hardware Implementation or Acceleration of Operating System Functions", which is incorporated herein by reference. An exemplary file storage system is described in WO 2012/071335 and U.S. application Ser. No. 13/301,241 entitled "File Cloning and De-Cloning in a Data Storage System", which was filed on Nov. 21, 2011, which are incorporated herein by reference.

An exemplary file server including various hardware-implemented and/or hardware-accelerated subsystems, for example, is described in U.S. patent application Ser. Nos. 09/879,798 and 10/889,158, which are incorporated by reference herein, and such file server may include a hardware-based file system including a plurality of linked sub-modules, for example, as described in U.S. patent application Ser. Nos. 10/286,015 and 11/841,353, which are incorporated by reference herein.

I. Exemplary Architectures of Data Storage Systems of Exemplary Embodiments

FIG. 1A exemplarily shows a schematic diagram of a data storage apparatus 1000 in a data storage system according to exemplary embodiments. One or more such data storage apparatuses 1000 may be used to realize a functional layer structure of any of FIGS. 2A to 2C below.

The data storage apparatus 1000 exemplarily includes an I/O interface 1010 (e.g. front-end interface) exemplarily having physical ports 1011, 1012 and 1013 and being connectable to one or more input/output devices 200 (such as e.g. the clients 200, and/or a management computer 300). Such I/O interface 1010 functions and/or functional handling thereof may be included in an interface/protocol layer 110 of any of FIGS. 2A to 2C below.

The data storage apparatus 1000 exemplarily further includes an external storage interface 1020 (e.g. back-end interface) exemplarily having physical ports 1021, 1022 and 1023 and being connectable to one or more externally connected storage devices 600 (e.g. one or more storage disks and/or storage flash modules) for storing metadata (e.g. system metadata) and data (e.g. user data) and/or to an external storage system 400 (which may include one or more externally connected storage devices such as storage disks and/or storage flash modules) for storing metadata (e.g. system metadata) and data (e.g. user data). Such external storage interface 1020 functions and/or functional handling thereof may be included in a storage device layer 140 of any of FIGS. 2A to 2C below.

The connections to the above interfaces 1010 and 1020 may be direct, via wired connections or wireless connections, and/or via communication networks, such as e.g. networks 500 in FIG. 1A.

Furthermore, exemplarily, the data storage apparatus 1000 further includes one or more internal storage devices 1031, 1032, 1033 and 1034 (e.g. one or more storage disks and/or storage flash modules), summarized as internal storage devices 1030, for storing metadata (e.g. system metadata) and data (e.g. user data).

In further exemplary embodiments, the data storage apparatus(es) may only include internal storage devices (not being connected to external storage devices/systems) and in further exemplary embodiments, the data storage apparatus(es) may only be connected to external storage devices/systems (not having internal storage devices).

The data storage apparatus 1000 exemplarily further includes a processing unit 1060A and optionally another processing unit 1060B. The processing units 1060A and 1060B exemplarily communicate with the interfaces 1010 and 1020, as well as with the internal storage devices 1030, via internal bus systems 1040 and 1050.

Each of the processing units 1060A and 1060B exemplarily includes a processor 1061 (e.g. central processing unit, or CPU), a memory controller 1065, a disk controller 1066 and memories such as e.g. the cache memory 1062, the system memory 1063 and the non-volatile memory 1064 (e.g. NVRAM). The memory controller 1065 may control one or more of the memories such as e.g. the cache memory 1062, the system memory 1063 and the non-volatile memory 1064 (e.g. NVRAM).

The I/O requests/responses to/from the internal storage devices 1030 and/or to/from the external storage devices/systems 400 and 600 (via the interface 1020) is exemplarily controlled by the disk controller 1066 of the data storage apparatus 1000. Accordingly, the disk controller 1066 and/or its functions and/or functional handling thereof may be included in a storage device layer 140 of any of FIGS. 2A to 2C below.

Exemplarily, e.g. for mirroring purposes, the NVRAMs 1064 of the processing units 1060A and 1060B of the data storage apparatus 1000 are exemplarily connected to each other to transfer data between the NVRAMs 1064. For example, each NVRAM 1064 may be divided into two portions of similar size, and one portion of each NVRAM 1064 is provided to store data and or metadata handled by its respective processing unit 1060 and the other portion of each NVRAM 1064 is provided to store mirrored data from the other NVRAM via the connection, respectively. For example, the connection between the non-volatile memories 1064 may be exemplarily realized as a non-transparent bridge connection, e.g. by PCIe connection.

Further exemplarily, each of the processing units 1060A and 1060B exemplarily includes a system memory 1063 (e.g. for storing processing related data or program data for execution by the respective processing units) and a cache memory 1063 for temporarily storing data such as e.g. cache data related with metadata and/or data for handling I/O access messages.

For controlling the system memory 1063, the cache memory 1064 and/or the non-volatile memory 1064 (NVRAM), each of the processing units 1060A and 1060B exemplarily includes a memory controller 1065.

For processing, handling, converting, and/or encoding headers of messages, requests and/or responses, the data storage apparatus 1000 exemplarily further includes the processor 1061 (or other type of processing unit which may include one or more processors, one or more programmable logic devices such as integrated circuits, Field Programmable Gate Arrays (FPGAs), or the like, and/or one or more processors such as e.g. CPUs and/or microprocessors).

For temporarily storing data (including metadata and/or user data), the data storage apparatus 1000 includes the non-volatile memory 1064 (e.g. one or more NVRAMs). The non-volatile memory and/or NVRAM(s) may also be referred to as "cache memory" in exemplary embodiments, e.g. if the cache memory 1062 is formed as a portion of the non-volatile memory.

For example, in some embodiments, the difference between cache memory and the non-volatile memory may be that the data stored in the non-volatile memory may be mirrored to another non-volatile memory (e.g. one or more NVRAMs of the other processing unit or another connected data storage apparatus).

The processing unit(s) 1060A and/or 1060B and/or its functions and/or functional handling thereof may be included in a metadata layer 120 and/or a data protection layer 130 of any of FIGS. 2A to 2C below.

Figure 1B:
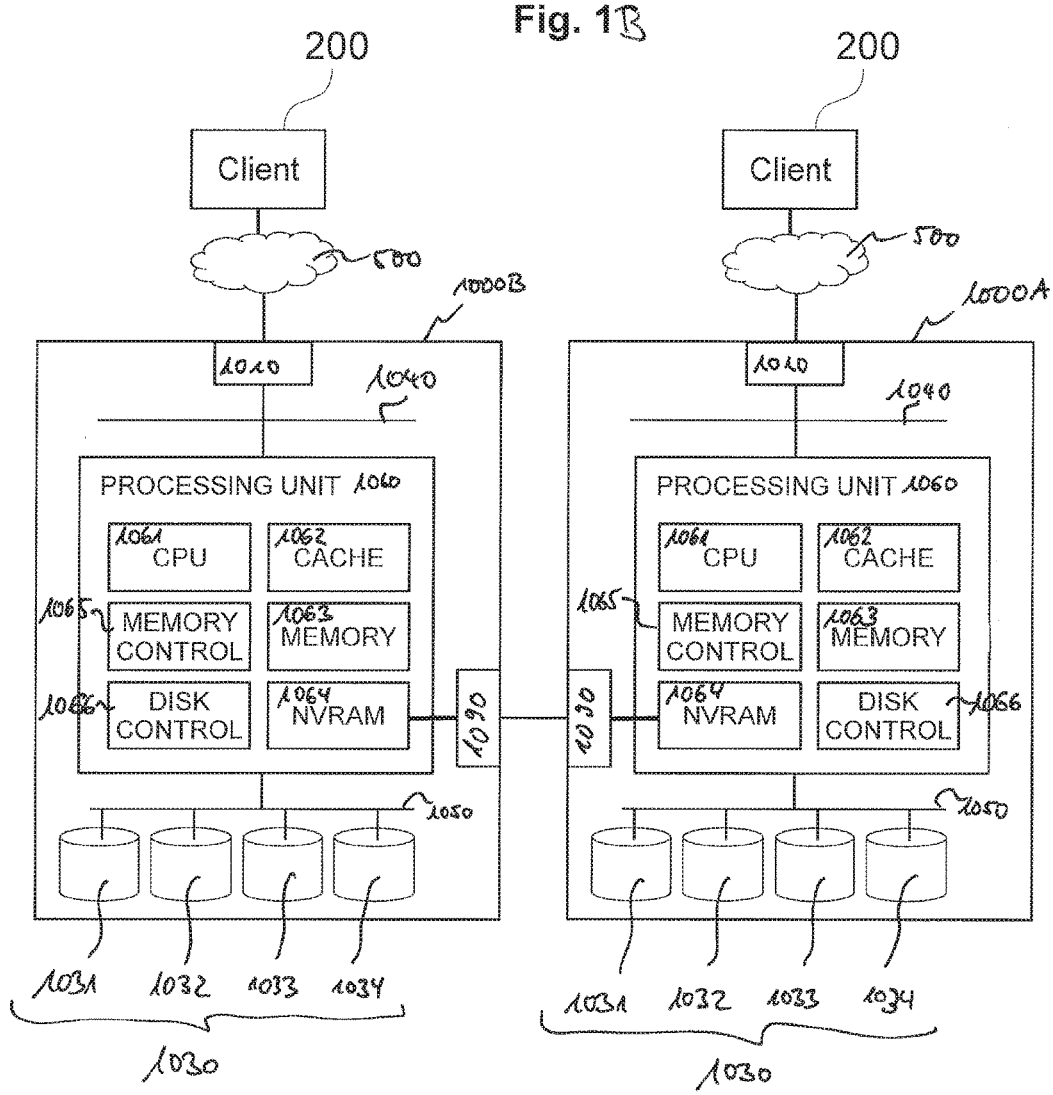
FIG. 1B exemplarily shows a schematic diagram of a data storage system comprising plural data storage apparatuses according to exemplary embodiments.

FIG. 1B exemplarily shows a schematic diagram of a data storage system comprising plural data storage apparatuses 1000A and 1000B in a data storage system according to further exemplary embodiments.

The data storage apparatuses 1000A and 1000B may be realized as node apparatuses in a storage system cluster of plural node apparatuses, which may be communicably connected with each other via the network interfaces 1010 (or via other front-end or back-end interfaces).

A difference to the data storage apparatus 1000 of FIG. 1A is that the non-volatile memory 1064 (e.g. NVRAM) of the respective processing units 1060 of both data storage apparatuses 1000A and 1000B are connected via a connection between the respective interfaces 1090 of the data storage apparatuses 1000A and 1000B, in particular for mirroring data of the non-volatile memory 1064 (e.g. NVRAM) of the data storage apparatus 1000A in the non-volatile memory 1064 (e.g. NVRAM) of the data storage apparatus 1000B, and vice versa.

Exemplarily, the interfaces 1020 of the data storage apparatuses 1000A and 1000B are not shown in FIG. 1B, but additional interfaces 1020 for connection to external storage devices and/or storage systems may be provided.

Exemplarily, e.g. for mirroring purposes, the NVRAMs 1064 of the processing units 1060 of both data storage apparatuses 1000A and 1000B are exemplarily connected to each other to transfer data between the NVRAMs 1064. For example, each NVRAM 1064 may be divided into two portions of similar size, and one portion of each NVRAM 1064 is provided to store data and or metadata handled by its respective processing unit 1060 and the other portion of each NVRAM 1064 is provided to store mirrored data from the other NVRAM via the connection, respectively.

FIG. 1C exemplarily shows a schematic diagram of another data storage apparatus 1000 according to exemplary embodiments.

Exemplarily, in FIG. 1C, in addition to the processing units 1060A and 1060B which may be provided similar as in FIG. 1A, the data storage apparatus 1000 includes, for hardware acceleration purposes, further processing units 1070A and 1070B which may be provided with respective programmable logic devices 1071 (e.g. instead or in addition to processors) for processing data movement, data handling or request/response handling in addition to or in support of the processors 1061 of the processing units 1060A and 1060B.

The programmable logic devices 1071 may be realized by one or more integrated circuits such as e.g. including one or more Field Programmable Gate Arrays (FPGAs). The processing units 1070A and 1070B may include own memories 1073 and non-volatile memories 1074 (e.g. NVRAMs), as well as e.g. their own memory controllers 1072. However, the programmable logic devices 1071 may also be responsible for the control of the memories 1073 and 1074.

Exemplarily, e.g. for mirroring purposes, the NVRAMs 1074 of the processing units 1070A and 1070B of the data storage apparatus 1000 are exemplarily connected to each other to transfer data between the NVRAMs 1074. For example, each NVRAM 1074 may be divided into two portions of similar size, and one portion of each NVRAM 1074 is provided to store data and or metadata handled by its respective processing unit 1070 and the other portion of each NVRAM 1074 is provided to store mirrored data from the other NVRAM via the connection, respectively. For example, the connection between the non-volatile memories 1074 may be exemplarily realized as a non-transparent bridge connection, e.g. by PCIe connection.

In all of the above configurations, the processing unit/units of the data storage apparatus(es) may be configured, by one or more software programs and/or based on hardware implemented processing (e.g. by support of programmable logic devices), to execute, by themselves or in combination with one or more further processing unit(s), the processing and methods of examples of control and management processes described herein.

II. Exemplary Layer Structures of Data Storage Systems of Exemplary Embodiments FIG. 2A exemplarily shows a schematic diagram of a data storage system layer architecture 100 according to exemplary embodiments.

Such functional data storage system layer architecture 100 (which may be provided by software, hardware or any combination thereof) can be realized on any one of the data storage apparatuses 1000 (1000A, 1000B) of FIGS. 1A to 1C.

Some or all respective layers may use shared resources (such as sharing processing units, processors, programmable logic devices, memories such as system memories, cache memories and/or non-volatile memories or NVRAMs, controllers and/or storage devices), or some or all layers may be provided on their own respective resources (e.g. having their own dedicated processing units, processors, programmable logic devices, memories such as system memories, cache memories and/or non-volatile memories or NVRAMs, controllers and/or storage devices). Also, the layers may share some resources with other layers for some functions while they own other resources for other functions by themselves.

The data storage system layer architecture 100 exemplarily includes an interface/protocol layer 110, a metadata layer 120, a data protection layer 130 and a storage device layer 140. The data storage system layer architecture 100 may be realized on one or more servers, file servers, computers, storage devices, storage array devices, cluster node apparatuses etc., in particular exemplarily according to configurations of any of FIGS. 1A to 1C.

The interface/protocol layer 110 can exemplarily be communicably connected to client computers 200 and/or an exemplary optional management computer 300, e.g. via physical ports and/or communication networks (e.g. via front-end interfaces 1010 above, such as network interfaces or the like).

The interface/protocol layer 110 may include one or more physical interfaces including one or more physical ports, physical switches, physical connectors, physical interface boards, wireless interfaces etc. for physical connection, network connection and/or wireless connection to one or more networks, computers (clients, hosts, management computers, etc.), servers, or the like.

Also, the interface/protocol layer 110 may include functions, executed on one or more processing units (e.g. processing units of any of FIGS. 1A to 1C), for example, to receive, process, convert, handle, and/or forward messages, requests, instructions, and/or responses in multiple protocols and I/O access types.

Specifically, the interface/protocol layer 110 is preferably configured to receive, process, convert, and handle one or more (and preferably all) of:

file-access I/O messages (including file-access I/O requests directed to files and/or directories of one or more file systems) according to one or file access protocols (such as e.g. one or more of AFP, NFS, e.g. NFSv3, NFSv4 or higher, or SMB/CIFS or SMB2 or higher);

block-access I/O messages (including block-access I/O requests directed to blocks of virtual, logical or physical block-managed storage areas) according to one or block access protocols (such as e.g. one or more of iSCSI, Fibre Channel and FCoE which means "Fibre Channel over Ethernet"); and object-access I/O messages (including object-access I/O requests directed to objects of an object-based storage) according to one or object-based access protocols (such as e.g. IIOP, SOAP, or other object-based protocols operating over transport protocols such as e.g. HTTP, SMTP, TCP, UDP, or JMS).

The above connection types and communication functions may include different interfaces and/or protocols, including e.g. one or more of Ethernet interfaces, internet protocol interfaces such as e.g. TCPIP, network protocol interfaces such as e.g. Fibre Channel interfaces, device connection bus interfaces such as e.g. PCI Express interfaces, file system protocol interfaces such as NFS and/or SMB, request/response protocol interfaces such as e.g. HTTP and/or HTTP REST interfaces, system interface protocols such as e.g. iSCSI and related interfaces such as e.g. SCSI interfaces, and NVM Express interfaces.

The interface/protocol layer 110 is exemplarily configured to connect to and communicate with client computers 200 and/or the management computer 300 to receive messages, responses, requests, instructions and/or data, and/or to send messages, requests, responses, instructions and/or data from/to the client computers 200 and/or the management computer 300, preferably according to plural different protocols for file access I/Os, block access I/Os and/or object access I/Os.

Accordingly, in some exemplary embodiments, such requests and responses exchanged between the data storage system layer architecture 100 and the client computers 200 may relate to I/O requests to one or more file systems (e.g. based on file access protocol I/O messages) and/or to I/O requests to blocks of physical, logical or virtual storage constructs of one or more storage devices (e.g. based on block access protocol I/O messages) of the data storage system 100. Also, such requests and responses exchanged between the data storage system layer architecture 100 and the client computers 200 may relate to I/O requests to objects of object-based storage (e.g. based on object access protocol I/O messages) provided by the data storage system 100.

The I/O requests on the basis of file access protocols may be including e.g. read requests to read stored data in a file system (including reading file data, reading file system metadata, reading file and/or directory attributes) or write data into a file system (including creating files and/or directories, modifying files, modifying attributes of files and/or directories, etc.).

The I/O requests on the basis of block access protocols may be including e.g. read requests to read stored data in one or more blocks of a block-based storage area (including reading data or metadata from blocks of a virtual, logical or physical storage area divided in blocks based on block addresses such as e.g. logical block addresses LBAs, and/or block number, e.g. reading data blocks of logical units (LUs)) and write data to blocks of a block-based storage area (including writing data blocks to newly allocated blocks of a virtual, logical or physical storage area divided in blocks based on block addresses such as e.g. logical block addresses LBAs, and/or block number, e.g. writing data blocks of logical units (LUs); or modifying data of previously written data blocks in blocks of the block-based storage area).

In the context of block-based storage on virtual, logical and/or physical storage devices organized in one or more storage areas being provided in units of blocks, it is emphasized that the terms "storage block" and "data block" may refer to related aspects, but are generally intended to differentiate between the "storage block" as a construct for storing data as such, e.g. having a certain block size and being configured to store data of an amount according to the block size, and the "data block" shall refer to the unit of data of an amount according to the block size, i.e. to the block sized unit of data that is written to (or can be read from) one "storage block". When using the term "block" as such, this typically may refer to the "storage block" in the sense above.

As mentioned above, the I/O requests/responses exchanged between clients 200 and the interface/protocol layer 110 may include object-related I/O requests/responses relating to data objects of object-based storage (which may also include an object-based managed file system), file-system-related I/O requests/responses relating to files and/or directories of one or more file systems, and/or block-related I/O requests/responses relating to data stored in storage blocks of block-managed storage areas (provided virtually, logically or physically) on storage devices.

The interface/protocol layer 110 communicates with the metadata layer 120, e.g. for sending requests to the metadata layer 120 and receiving responses from the metadata layer 120.

In exemplary embodiments, the communication between interface/protocol layer 110 and metadata layer 120 may occur in an internal protocol which may be file-based, block-based or object-based. However, standard protocols may be used. The interface/protocol layer 110 may receive messages (such as I/O requests) from the clients in many different protocols, and the interface/protocol layer 110 is configured to convert messages of such protocols, or at least headers thereof, to the messages to be sent to the metadata layer 120 according to the protocol used by the metadata layer 120. In some exemplary embodiments, the metadata layer 120 may be configured to handle object-related I/O requests.

The metadata layer 120 may then preferably be configured to convert object-related I/O requests relating to data objects (which may relate to block-based storage areas managed as data objects, to file-based files and/or directories of one or more file systems managed as file system objects, and/or to data objects or groups of data objects managed as data objects) into corresponding block-related I/O requests (according to a block access protocol) relating to data stored in storage blocks of virtually, logically or physically provided storage areas of storage devices, and vice versa.

In some exemplary embodiments, the metadata layer 120 may be configured to hold and manage metadata on a data object structure and on data objects of the data object structure in a metadata structure and/or metadata tree structure according to later described examples and exemplary embodiments.

The metadata layer 120 preferably communicates with the data protection layer 130, e.g. for sending requests to the data protection layer 130 and receiving responses from the data protection layer 130, preferably as block-related I/O requests (according to a block access protocol).

The data protection layer 130 communicates with the storage device layer 140, e.g. for sending requests to the storage device layer 140 and receiving responses from the storage device layer 140, preferably as block-related I/O requests (according to a block access protocol).

The data protection layer 130 may include processing involved in connection with data protection, e.g. management of data replication and/or data redundancy for data protection. For example, the data protection layer 130 may include data redundancy controllers managing redundant data writes, e.g. on the basis of RAID configurations including mirroring, and redundant striping with parity. The data protection layer 130 could then be configured to calculate parities.

The storage device layer 140 may execute reading data from storage devices and writing data to storage devices based on messages, requests or instructions received from the data protection layer 130, and may forward responses based on and/or including read data to the data protection layer 130.

In general, I/O processing may be realized by the layer architecture such that the interface/protocol layer 110 receives an I/O request (file-access, block-access or object-access) and converts the I/O request (or at least the header thereof) to a corresponding I/O request in the protocol used by the metadata layer 120 (e.g. object-based, object access).

The metadata layer 120 uses address information of the received I/O request and converts the address information to the address information used by the data protection layer 130. Specifically, the metadata layer 120 uses address information of the received I/O request and converts the address information to related block addresses used by the data protection layer 130. Accordingly, the metadata layer 120 converts received I/O requests to block access I/O in a block-based protocol used by the data protection layer 130.

The data protection layer 130 receives the block access I/O from the metadata layer 120, and converts the logical block address information to physical block address information of related data (e.g. taking into account RAID configurations, and parity calculations, or other error-code calculations) and issues corresponding block access I/O requests in a block-based protocol to the storage device layer 140 which applies the block access I/O to the storage device (e.g. by reading or writing data from/to the storage blocks of the storage devices).

For response messages, e.g. based on read requests to read user data, the corresponding response (e.g. with the user data to be read) can be passed the other way around, for example, in that the storage device layer 140 returns the read user data in a block-based protocol to the data protection layer 130, the data protection layer 130 returns the read user data in a block-based protocol to the metadata layer 120, the metadata layer 120 returns the read user data preferably in an object-based protocol to the interface/protocol layer 110, and the interface/protocol layer 110 returns the final read response to the requesting client.

However, for the above processing, the metadata layer 120 may make use of large amounts of metadata (which is managed in metadata tree structures according to the preferred embodiments herein), which is also stored to storage devices (i.e. in addition to the actual user data of the object-based storage, file system based storage or block-based storage shown to the client).

Accordingly, when handling I/O request such as write requests and/or read requests, the metadata layer may need to obtain metadata, which may lead to read and write amplifications in the communications between the metadata layer 120 and the data protection layer 130 (or directly with the storage device layer, in exemplary embodiments which store metadata directly on storage devices without additional data protection schemes). Such read and write amplifications shall preferably be avoided or at least be reduced according to an object of the present disclosure.

Figure 2A:
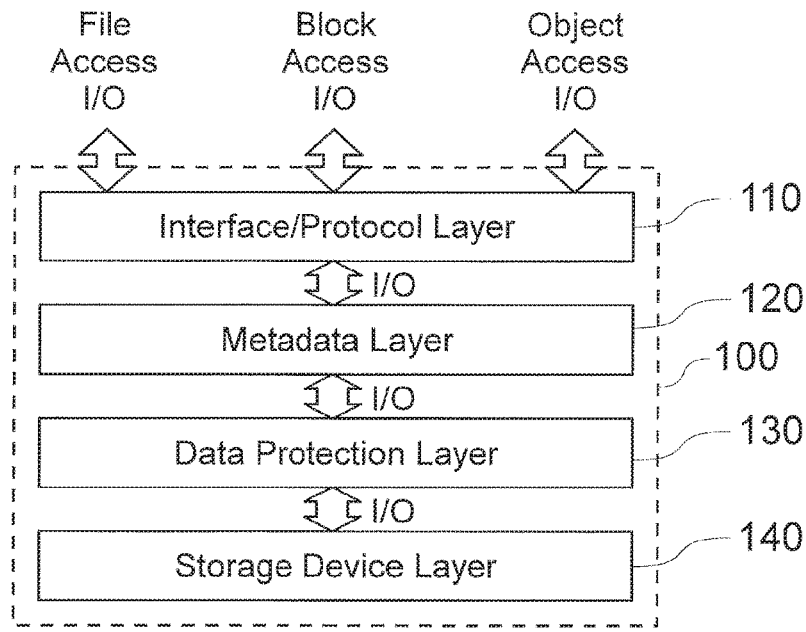
FIG. 2A exemplarily shows a schematic diagram of a data storage system layer architecture according to exemplary embodiments.
Figure 2B:
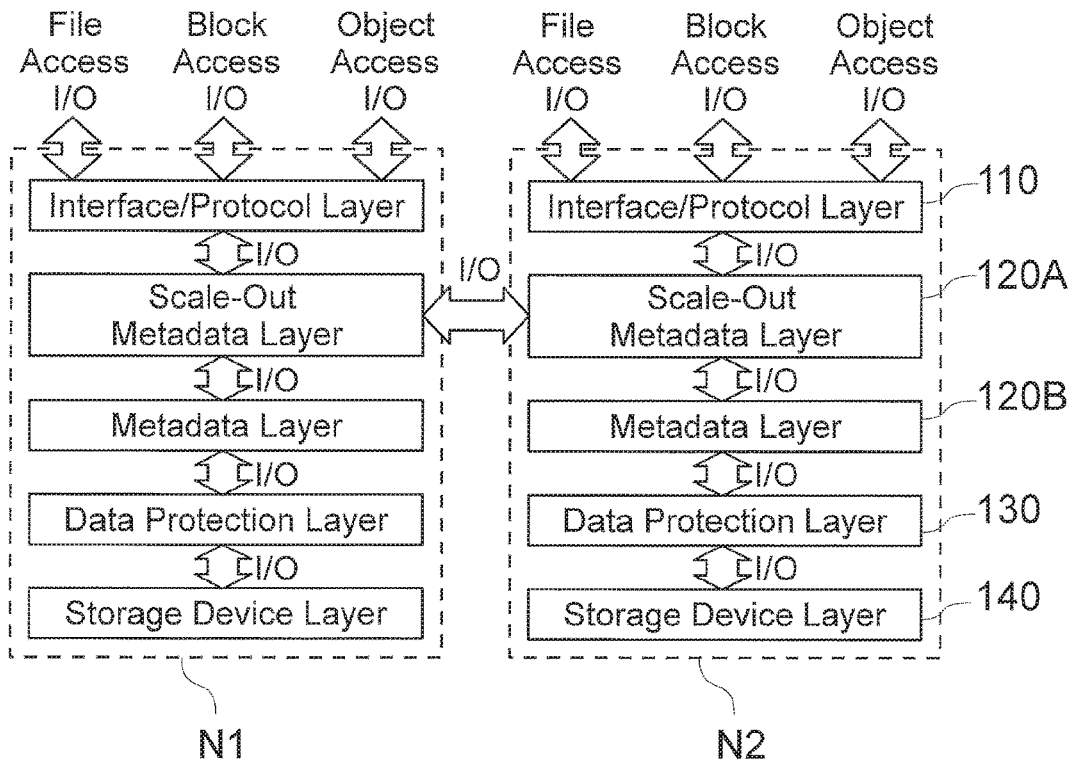
FIG. 2B exemplarily shows a schematic diagram of another data storage system layer architecture according to exemplary embodiments.

FIG. 2B exemplarily shows a schematic diagram of another data storage system layer architecture 100 according to further exemplary embodiments.

Exemplarily, the data storage system layer architecture 100 of FIG. 2B is proposed for scale-out purposes, in which multiple node apparatuses (which may also operate as single data storage apparatus, preferably) may be connected to form a cluster system which may be extended (scale-out) by adding further node apparatuses, when needed.

In this connection, it is indicated that the term "node apparatus" in the present context refers to a device entity which forms a part of a cluster system of inter-connectable "node apparatuses". This needs to be distinguished from "metadata nodes", (e.g. "root nodes", "direct nodes" or "indirect nodes") as described later, as such "metadata nodes" from data constructs (data elements) which are units of metadata managed in metadata tree structures as described below. Sometimes, "metadata nodes" are also referred to as onodes or inodes.

Exemplarily, FIG. 2B shows two node apparatuses N1 and N2 included in a cluster of two or more node apparatuses (i.e. including at least N1 and N2), each node apparatus having an interface/protocol layer 110, a metadata layer 120B (similar to the metadata layer 120 above), a data protection layer 130 and a storage device layer 140, similar to the exemplary embodiment of FIG. 2A.

However, in order to scale out the request/response handling to the cluster node apparatuses, preferably between the interface/protocol layer 110 of the data storage system layer architecture 100 and the metadata layers 120B of the node apparatuses N1 and N2, the data storage system layer architecture 100 of FIG. 2B further includes a scale-out metadata layer 120A preferably provided between the interface/protocol layer 110 and the metadata layer 120B, to communicate I/O access messages (e.g. I/O requests or responses) between the scale-out metadata layers 120A of the node apparatuses of the cluster.

By such structure, the clients can send I/O requests to each of the node apparatuses (i.e. to which one or more node apparatuses they are connected themselves) independent of which node apparatus actually stores the target data of the I/O access or actually manages the storage device(s) storing the target data, and the scale-out metadata layers 120A respectively handle metadata managing mapping information locating the target data on the cluster.

Accordingly, the client may issue the I/O access request to either one of the cluster node apparatuses, and the scale-out metadata layer 120A of the receiving node apparatus identifies the node apparatus storing the target data based on scale-out metadata (which may also be stored in storage devices), and issues a corresponding I/O access request to the scale-out metadata layer 120A of the identified node apparatus.

The identified node apparatus handles the I/O request and responds to communicate an I/O response to the scale-out metadata layer 120A of the initial receiving node apparatus to return a corresponding response via the interface/protocol layer 110 of the initial receiving node apparatus to the requesting client.

Other layers in FIG. 2B may have functions similar to the corresponding layers of the layer architecture of FIG. 2A.

Figure 2C:
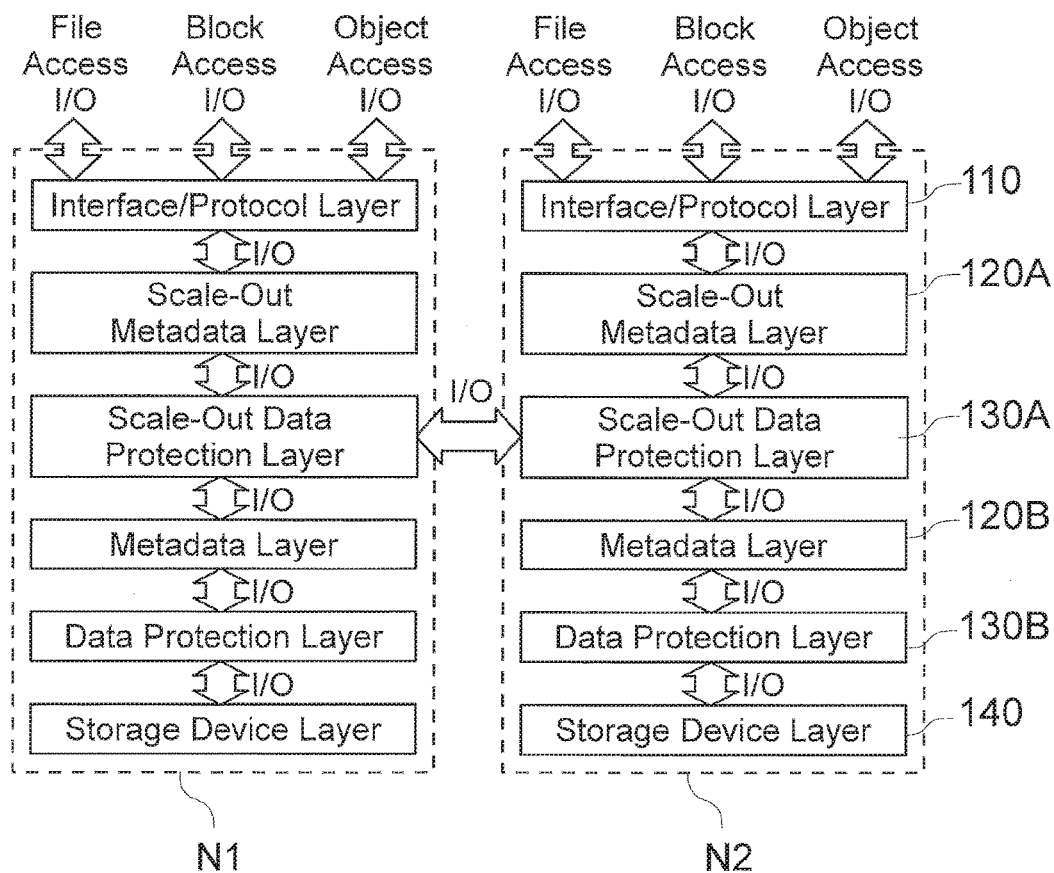
FIG. 2C exemplarily shows a schematic diagram of another data storage system layer architecture according to exemplary embodiments.

FIG. 2C exemplarily shows a schematic diagram of another data storage system layer architecture 100 according to further exemplary embodiments.

Again, the data storage system layer architecture 100 of FIG. 2C is proposed for scale-out purposes, in which multiple node apparatuses (which may also operate as single data storage apparatus, preferably) may be connected to form a cluster system which may be extended (scale-out) by adding further node apparatuses, when needed.

However, in addition to the layers of FIG. 2B, the layer architecture of FIG. 2C exemplarily further includes another scale-out data protection layer 130A between the scale-out metadata layer 120A and the metadata layer 120B (which communicates with the data protection layer 130B), wherein the scale-out data protection layers 130A to communicate I/O access messages (e.g. I/O requests or responses) between the scale-out data protection layers 130A of the node apparatuses of the cluster. This may include another data protection scheme in which data may be redundantly stored on multiple node apparatuses as managed by the data protection layers 130A of the node apparatuses of the cluster, according to data protection schemes.

In the above exemplary configurations, the metadata layer 120 (and/or 120B) may make use of large amounts of metadata (which is managed in metadata tree structures according to the preferred embodiments herein), which is also stored to storage devices (i.e. in addition to the actual user data of the object-based storage, file system based storage or block-based storage shown to the client).

Accordingly, when handling I/O request such as write requests and/or read requests, the metadata layer may need to obtain metadata, which may lead to read and write amplifications in the communications between the metadata layer 120 and the data protection layer 130 (or directly with the storage device layer, in exemplary embodiments which store metadata directly on storage devices without additional data protection schemes). Such read and write amplifications shall preferably be avoided or at least be reduced according to an object of the present disclosure.

III. Exemplary Metadata Tree Structure Management (e.g. at a Metadata Layer)

III.1 Exemplary Metadata Tree Structure

Figure 3A:
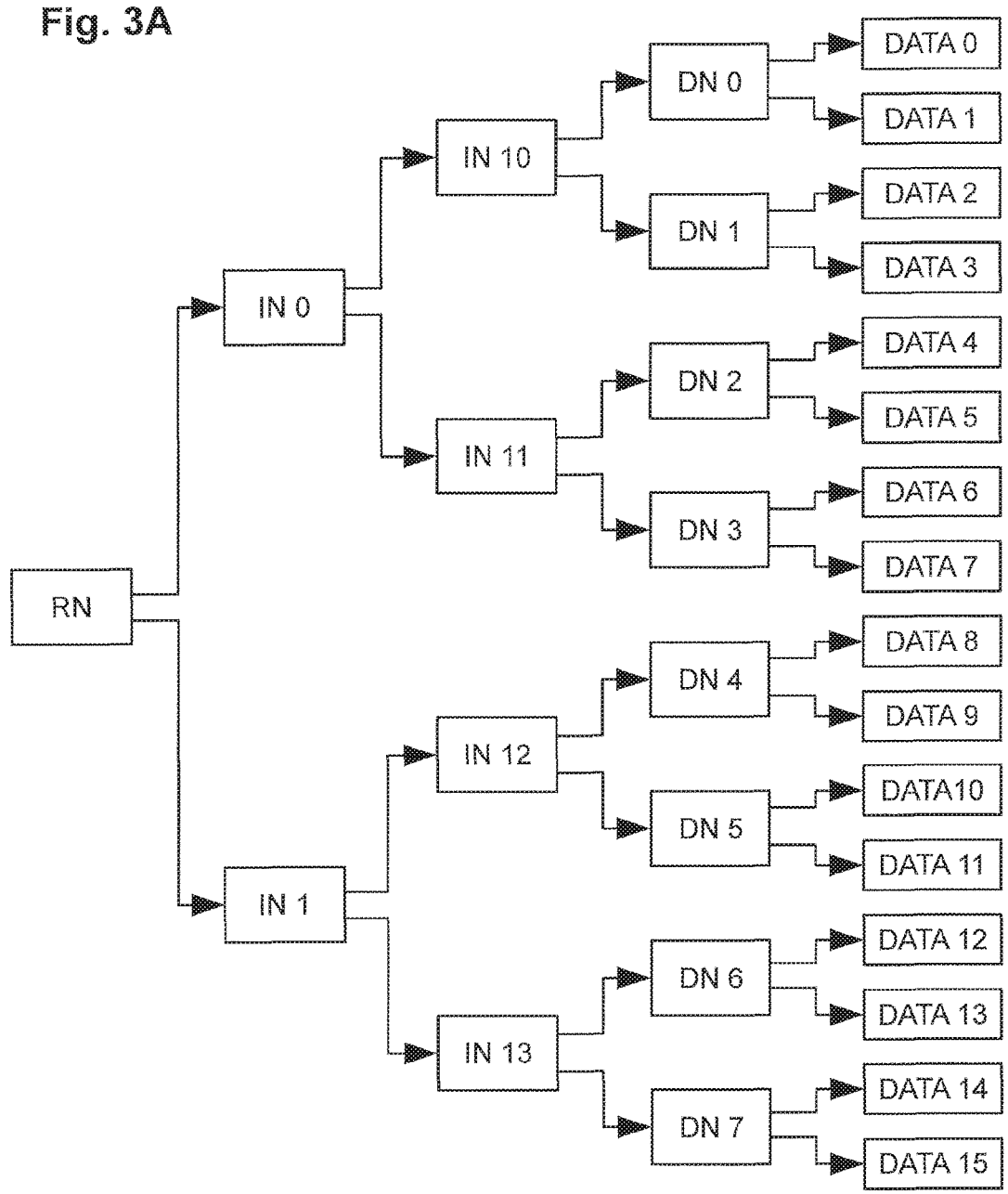
FIG. 3A exemplarily shows a schematic diagram of an exemplary metadata tree structure, and FIGS. 3B and 3C exemplarily illustrate occurrences of read amplifications in data read operations and read and write amplifications in data write operations based on such exemplary metadata tree structure.

FIG. 3A exemplarily shows a schematic diagram of an exemplary metadata tree structure as may, for example, be handled by a data storage apparatus 1000, a file server managing metadata of one or more file systems, and/or by a metadata layer of one of the above exemplary embodiments.

For example, in connection with file-based I/O access from clients, in a file system including one or more file-system objects such as files and directories, each file system object (such as file objects related with files of the file system and/or system objects related to metadata and/or management data of the file system) may be managed by a corresponding metadata tree structure associated with the file system object. Accordingly, a file system object (such as a file or a directory) may be associated with a data object being managed on the basis of such metadata tree structure(s).

Furthermore, in connection with object-based I/O access from clients, data objects or groups of data objects accessed by the clients may be associated with a data object being managed on the basis of such metadata tree structure(s).

Furthermore, in connection with block-based I/O access from clients, virtual, logical or physical storage areas, being divided into plural blocks, accessed by the clients may be associated with a data object being managed on the basis of such metadata tree structure(s). For example, a data object may be associated with a block-managed logical unit (LU).

For example, for all of the above, if the metadata layer receives an object-related I/O request (from the interface/protocol layer based on a client's file access I/O, block access I/O or object access I/O) relating to a data object, the metadata layer may refer to the metadata tree structure associated with the respective data object to find one or more block addresses of data storage corresponding to the data addressed in the object-related I/O request on storage devices (as handled by the data protection layer and/or the storage device layer, for example).

Accordingly, for each data object, the corresponding metadata tree structure provides information on a relationship between the data object and its data and block addresses of blocks storing data blocks of the data of the data object.

Exemplarily, for each data object, there may be provided a root node RN (which may include a header) and pointers of the root node RN may point to indirect nodes of the corresponding metadata tree structure, such as e.g. the indirect nodes IN 0 and IN 1 in FIG. 3A.

Pointers of indirect nodes may, for example, point to other indirect nodes of a lower generation (tree level) or to direct nodes (also referred to as "leaf nodes" of a leaf tree level). Direct nodes are metadata nodes that include pointers pointing to data blocks including the actual data of the corresponding data object.

Typically, such metadata tree structure may include multiple tree levels starting with a root node tree level downwards to a direct node tree level, optionally having one or more intermediate indirect node tree levels in between.

Exemplarily, in FIG. 3A, Pointers of the indirect nodes IN 0 and IN 1 exemplarily include pointers pointing to the lower generation (tree level) of indirect nodes IN 10, IN 11, IN 12, and IN 13. The pointers of the indirect nodes IN 10, IN 11, IN 12, and IN 13 respectively point to a corresponding pair of the direct nodes DN 0 to DN 7. The pointers of the direct nodes DN 0 to DN 7 respectively point to a corresponding pair of blocks storing data blocks of data referred to as DATA 0 to DATA 15, exemplarily.

Of course, the example having only two pointers in each of the root node, indirect nodes and direct nodes according to FIG. 3A is purely for exemplary purposes, and each node may include two or more pointers.

Also, root nodes, indirect nodes and direct nodes may include different numbers of pointers.

III.2 Read Amplifications in Handling Object-Related Read Requests

Figure 3B:
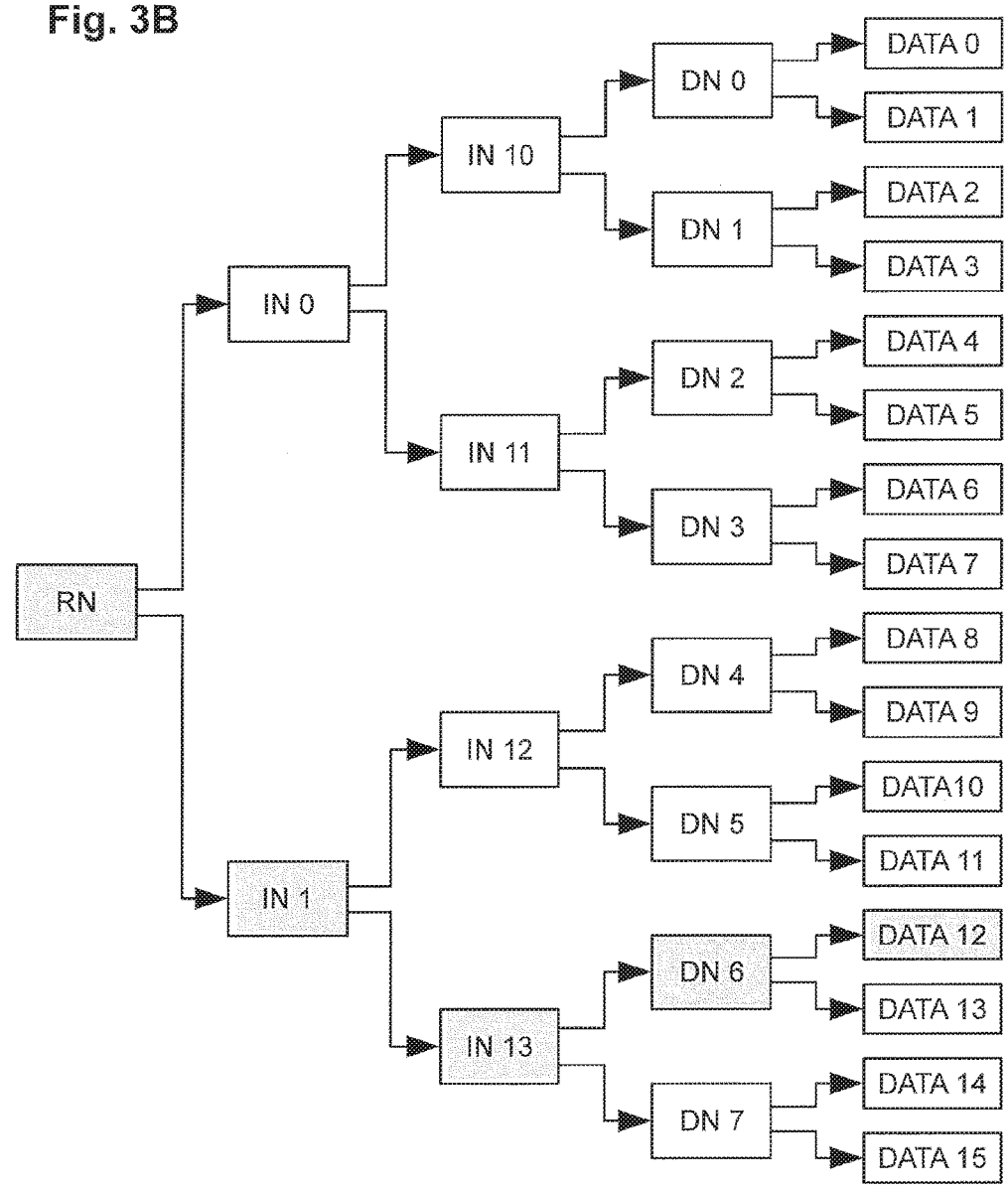
Figure 3B:
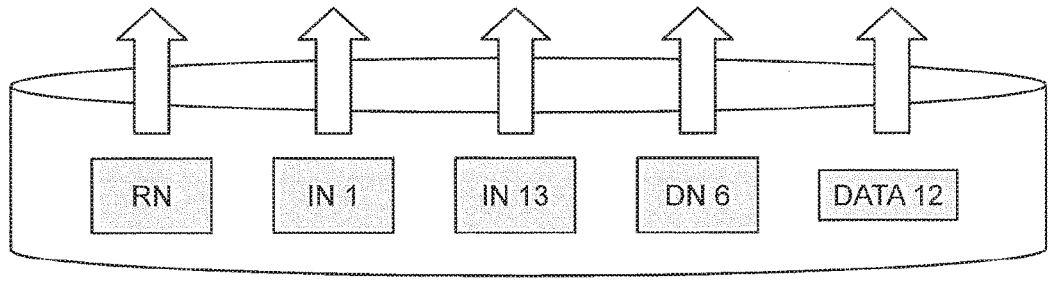

FIG. 3B exemplarily illustrates occurrences of read amplifications in data read operations based on such exemplary metadata tree structure of FIG. 3A.

Exemplarily, it is assumed that the metadata layer receives an object read request directed to the data object being associated with the metadata tree structure of FIG. 3A, e.g. to read the data of data block DATA 12 thereof.

In such situation, the metadata layer may be configured to refer to the root node RN of the metadata tree structure, based on the object read request being directed to data of the associated data object.

Based on address information (e.g. based on an indication relating to an offset of the position of data to be read), the metadata layer may refer to a pointer in the root node RN being related to data of data blocks DATA 8 to DATA 15, including the target data of block DATA 12. By such reference to the corresponding pointer in the root node RN, the metadata layer may refer to the indirect node IN 1 referenced by such corresponding pointer.

Based on address information (e.g. based on an indication relating to an offset of the position of data to be read), the metadata layer will refer to a pointer in the indirect node IN 1 being related to data of data blocks DATA 12 to DATA 15, including the target data of block DATA 12. By such reference to the corresponding pointer in the indirect node IN 1, the metadata layer may refer to the indirect node IN 13 referenced by such corresponding pointer.

Based on address information (e.g. based on an indication relating to an offset of the position of data to be read), the metadata layer will refer to a pointer in the indirect node IN 13 being related to data of data blocks DATA 12 to DATA 13, including the target data of block DATA 12. By such reference to the corresponding pointer in the indirect node IN 13, the metadata layer may refer to the direct node DN 6 referenced by such corresponding pointer.

Based on address information (e.g. based on an indication relating to an offset of the position of data to be read), the metadata layer will refer to a pointer in the direct node DN 6 being related to the target data of block DATA 12. By such reference to the corresponding pointer in the direct node DN 6, the metadata layer may refer to block DATA 12 referenced by such corresponding pointer, to then issue to the data protection layer (or to the storage device layer in other embodiments) a block-related read request to read the data stored at block address of block DATA 12 in the storage device.

However, from the above, it becomes clear that the read operation of reading the data of block DATA 12, since this requires to read pointers in any of the nodes RN, IN 1, IN 13 and DN 6, in total the read operation to read the data of block DATA 12 of the associated data object on the basis of a single object-related read request received at the metadata layer, leads to an operations exemplarily including five (random) read operations to read data from the storage device(s) in the present example, namely to read the data of the root nodes RN, IN 1, IN 13 and DN 6 from the storage device(s), e.g. in connection with five block-related read requests to read the corresponding data in the storage device(s).

Such increase of a number of read operations is referred to as read amplifications in the present disclosure, and exemplary embodiments are provided to achieve reducing corresponding read amplifications.

Figure 3C:
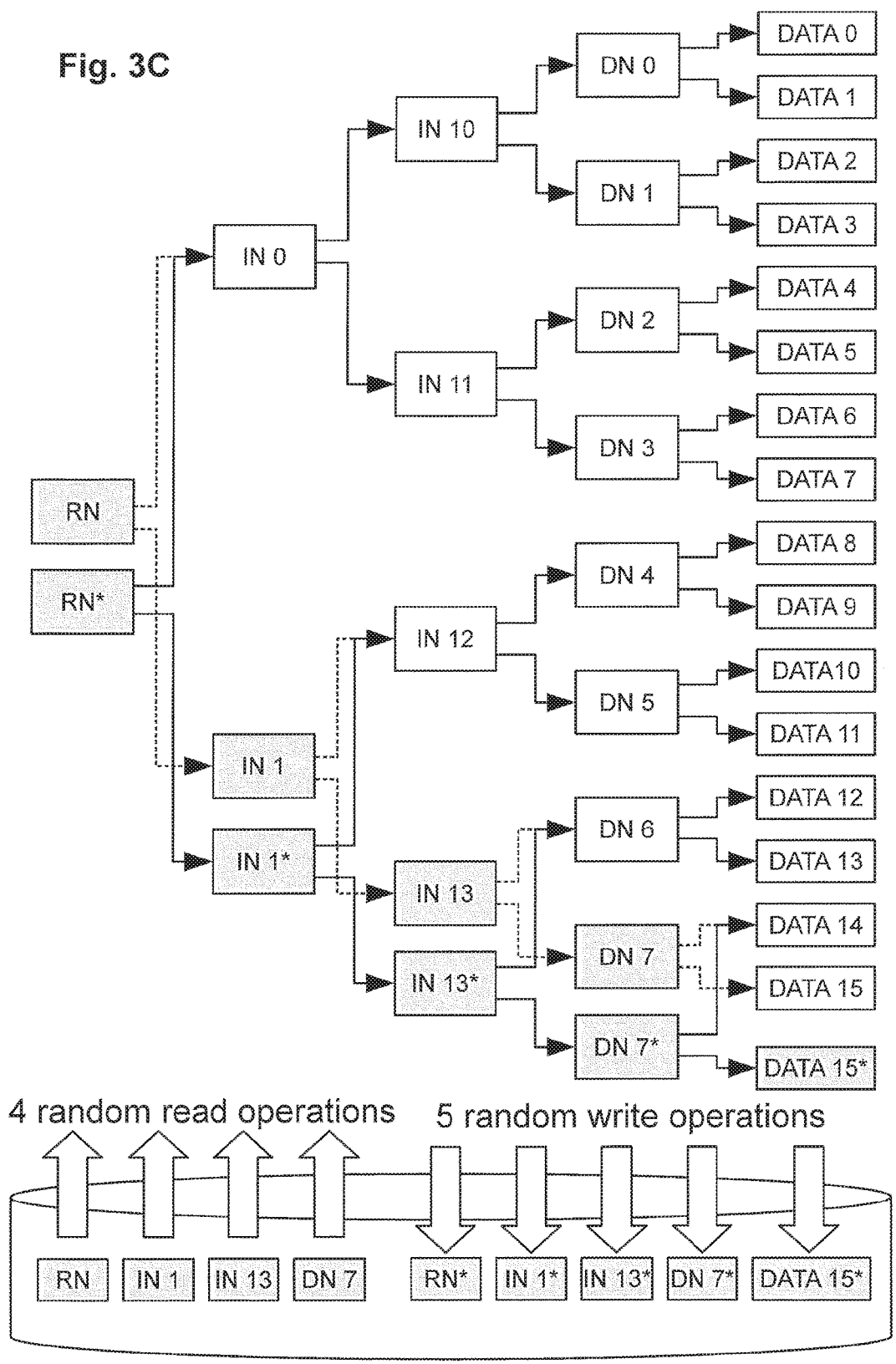

III.3 Read and Write Amplifications in Handling Object-Related Write Requests FIG. 3C exemplarily illustrate occurrences of read and write amplifications in data write operations based on such exemplary metadata tree structure.

Exemplarily, it is assumed that the metadata layer receives an object write request directed to the data object being associated with the metadata tree structure of FIG. 3A, e.g. to write new data to data stored in block of DATA 15 (i.e. to modify the data block DATA 15).

According to a log write method, instead of modifying the already written data block such modified data block is written to a newly allocated storage block, i.e. the new data DATA 15* is written to a newly allocated block, and the metadata tree structure is updated to reflect the new situation, in that related nodes of the metadata tree structure are updated.

However, this first involves identification of the block storing the old data DATA 15, by referring to the metadata nodes as follows.

In such situation, the metadata layer may be configured to refer to the root node RN of the metadata tree structure, based on the object write request being directed to data of the associated data object.

Based on address information (e.g. based on an indication relating to an offset of the position of data to be written), the metadata layer will refer to a pointer in the root node RN being related to data of data blocks DATA 8 to DATA 15, including the target data of block DATA 15. By such reference to the corresponding pointer in the root node RN, the metadata layer may refer to the indirect node IN 1 referenced by such corresponding pointer.

Based on address information, the metadata layer will refer to a pointer in the indirect node IN 1 being related to data of data blocks DATA 12 to DATA 15, including the target data of block DATA 15. By such reference to the corresponding pointer in the indirect node IN 1, the metadata layer may refer to the indirect node IN 13 referenced by such corresponding pointer.

Based on address information, the metadata layer will refer to a pointer in the indirect node IN 13 being related to data of data blocks DATA 14 to DATA 15, including the target data of block DATA 15. By such reference to the corresponding pointer in the indirect node IN 13, the metadata layer may refer to the direct node DN 7 referenced by such corresponding pointer.

So, similar to read amplifications occurring in connection with a read request as discussed above, the processing of an object-related write request leads to read amplifications. For example, in the present example, writing new data DATA 15* involves four (random) read operations namely to read the data of the root nodes RN, IN 1, IN 13 and DN 7 from the storage device(s), e.g. in connection with four block-related read requests to read the corresponding data in the storage device.

However, in addition to writing the new data DATA 15* to a newly allocated block of storage areas of the storage device(s), for updating the metadata tree accordingly, such write operation further includes writing of new metadata nodes to newly allocated blocks of storage areas of the storage device(s) to write the modified nodes including writing the root node RN* pointing to indirect node IN 0 and newly written indirect node IN 1*, writing the indirect node IN 1* pointing to indirect node IN 12 and newly written indirect node IN 13*, writing the indirect node IN 13* pointing to direct node DN 6 and newly written direct node DN 7*, and writing direct node DN 7* pointing to data blocks of DATA 14 and newly written DATA 15*.

However, from the above, it becomes clear that the write operation of writing the data of block DATA 15*, since this requires to also write the modified metadata nodes of the corresponding branch of the metadata tree structure, in total the write operation to write the data of block DATA 15* of the associated data object on the basis of a single object-related write request received at the metadata layer, leads to operations exemplarily including exemplarily five (random) write operations to write data to storage device(s) in the present example, namely to write the data of the root nodes RN*, IN 1*, IN 13* and DN 7* in addition to DATA 15* to the storage device(s), e.g. in connection with five block-related write requests to write the corresponding data in the storage device.

So, in addition to generating read amplifications occurring in connection with a write request, the processing of an object-related write request further leads to write amplifications.

Summarizing the above, processing object-related read request leads to read amplifications of block-related read requests and processing object-related write request leads to read amplifications of block-related read requests and to write amplifications of block-related write requests, exemplarily exchanged between a metadata layer and a data protection layer (and/or storage device layer).

Such amplifications may further lead to amplifications of I/O requests and parity calculations in the data protection layer and/or the storage device layer.

IV. Metadata Subtree Caching

IV.1 Upper Tree Levels Subtree Caching

According to some exemplary embodiments, the metadata layer may manage metadata of one or more data objects in metadata tree structures, each exemplarily including a root node pointing to one or more storage blocks storing data blocks, to one or more indirect nodes, and/or to one or more direct nodes, and optionally including one or more indirect nodes pointing to one or more indirect nodes and/or to one or more direct nodes, and/or optionally including one or more direct nodes pointing to one or more storage blocks.

According to some exemplary embodiments, while some portions of a metadata and/or of metadata tree structures may be stored on storage devices, at least a part (portion) of metadata and/or of metadata tree structures is preferably stored in a cache memory such as e.g. in a volatile cache memory (and/or a non-volatile memory such as e.g. one or more NVRAMs) of the configurations of any of FIGS. 1A to 1C above, specifically providing the benefits that read and/or write amplifications as discussed above may be avoided or at least be significantly reduced, thereby making handling of object-related I/O requests significantly more efficient in systems handling many clients and many data objects and high amounts of metadata to handle a very high number of I/O requests.

At the same time, since not all of the metadata needs to be kept in cache memory, it is possible to limit the required cache memory capacity, which allows provision of a very scalable system with reasonable cache capacity per node apparatus.

Figure 4A:
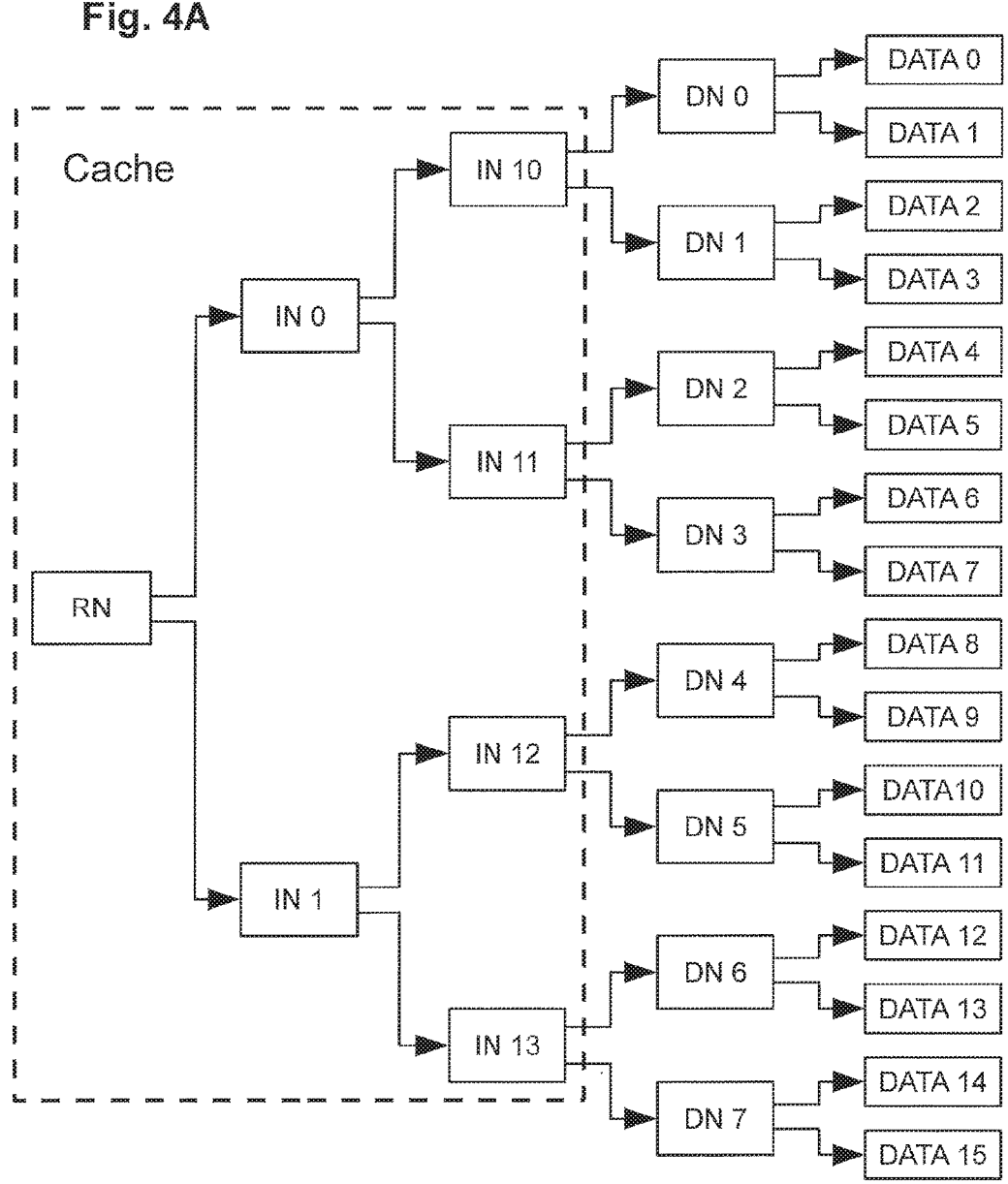
FIG. 4A exemplarily shows a schematic diagram of an exemplary metadata tree structure in connection with an example of a metadata subtree caching, and FIGS. 4B and 4C exemplarily illustrate reduction of occurrences of read amplifications in data read operations and read and write amplifications in data write operations based on such exemplary metadata tree structure according to some exemplary embodiments.
Figure 4B:
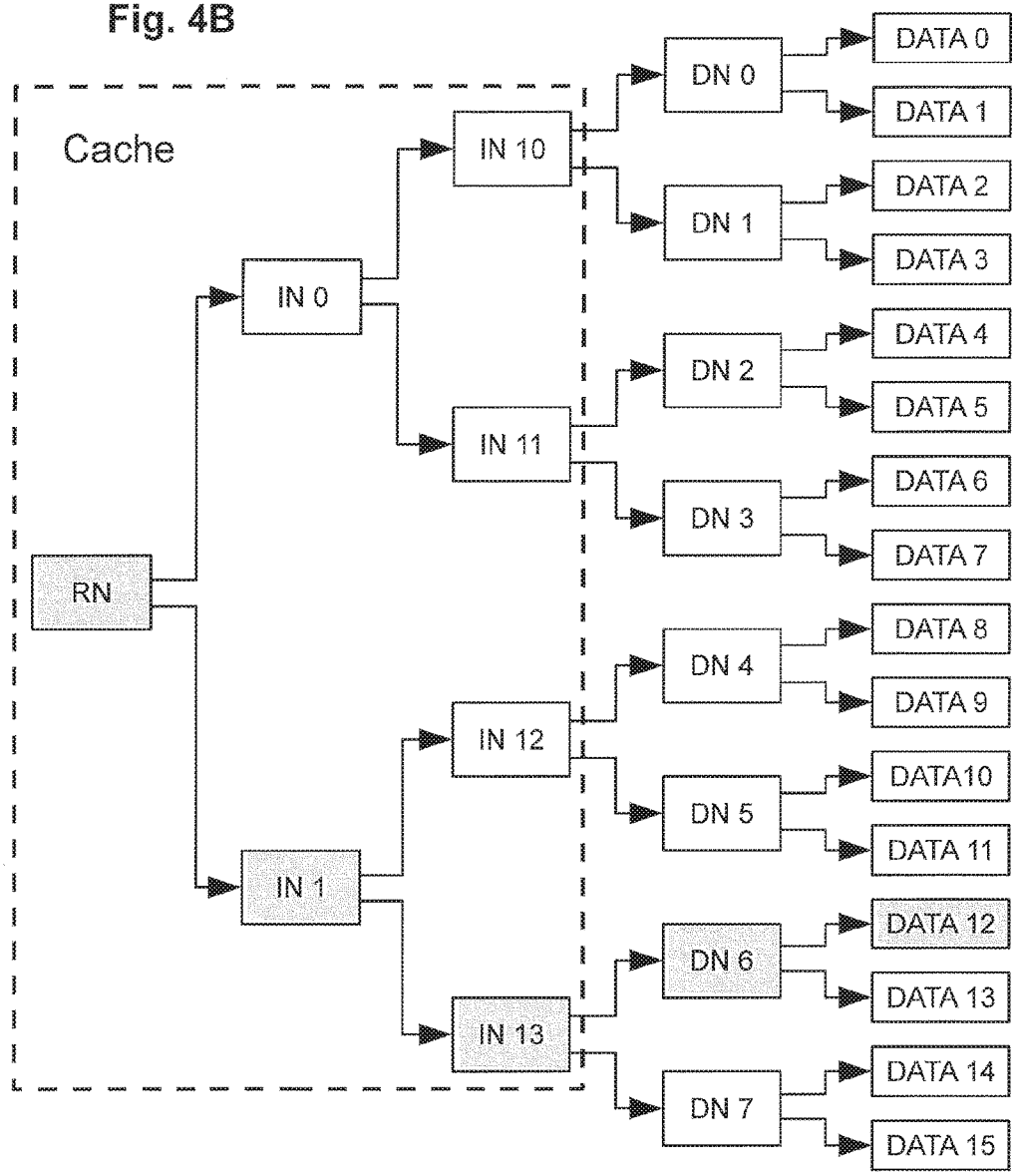
Figure 4B:
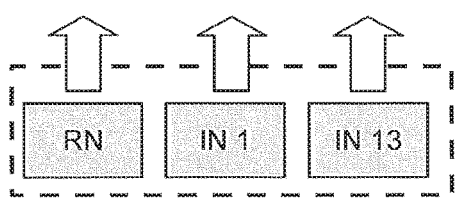
Figure 4B:
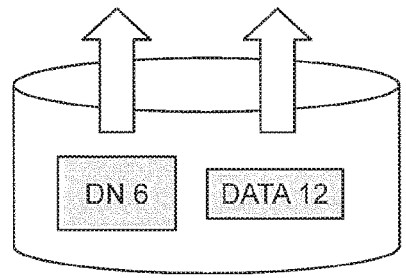
Figure 4C:
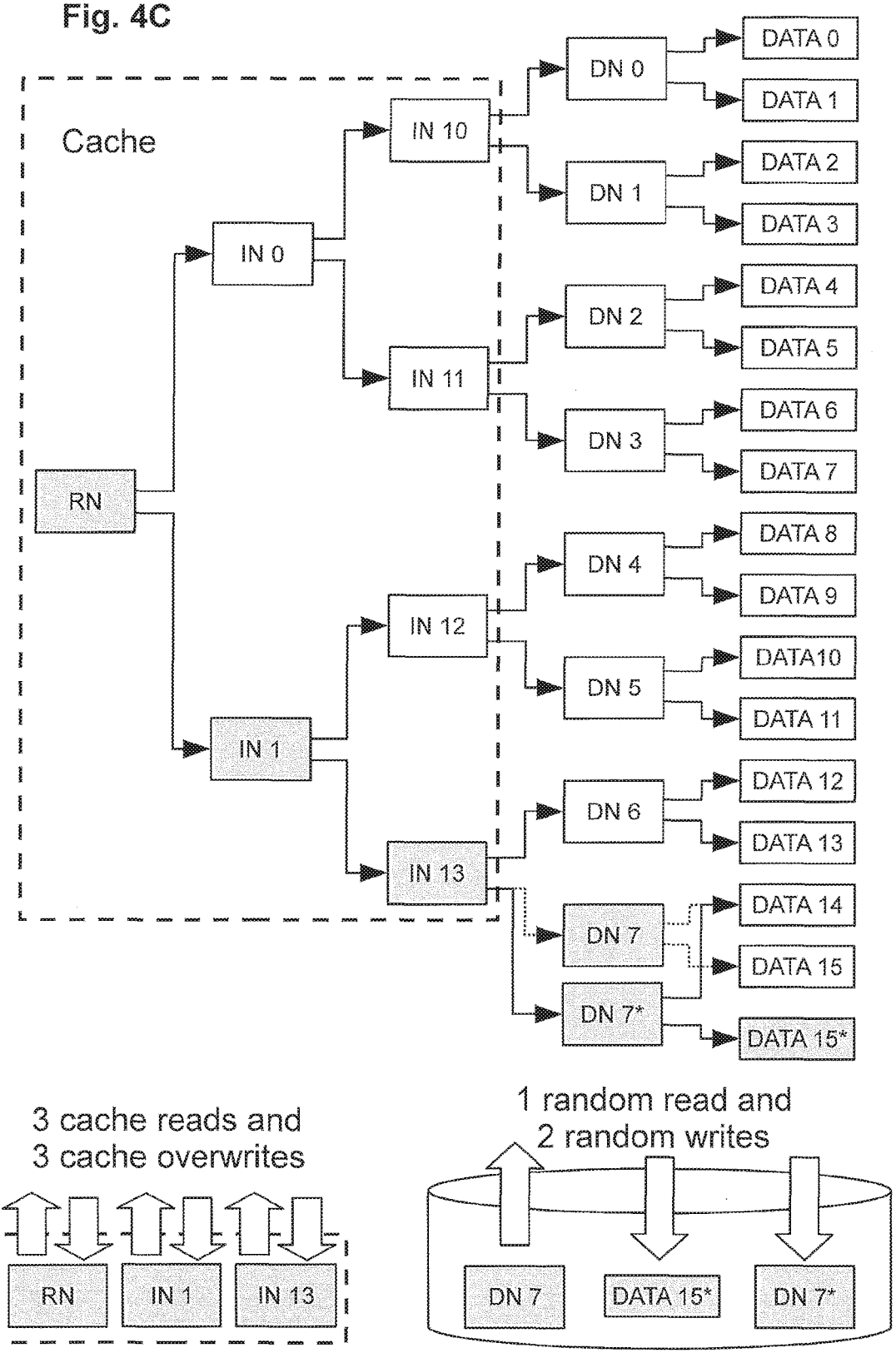

FIG. 4A exemplarily shows a schematic diagram of an exemplary metadata tree structure in connection with an example of metadata subtree caching, and FIGS. 4B and 4C exemplarily illustrate reduction of occurrences of read amplifications in data read operations and read and write amplifications in data write operations based on such exemplary metadata tree structure according to exemplary embodiments.

Exemplarily, for one or more or all data objects, the metadata layer may hold (maintain) all metadata nodes of a certain metadata tree structure node tree level and all metadata nodes of metadata tree structure node tree levels above the certain tree level in cache (such as e.g. in volatile cache and/or the non-volatile memory, such as e.g. one or more NVRAMs).

Exemplarily, in FIG. 4A, all metadata nodes above the direct node tree level of a metadata tree structure similar to FIG. 3A may be held in cache memory (and/or in NVRAM) for efficient access. That is, exemplarily all the metadata nodes of the upper three tree level, including the root node RN, the indirect nodes IN 0 and IN 1 of the upmost indirect node tree level and the indirect nodes IN 10 to IN 13 of the next lower indirect node tree level are held/maintained in the cache memory (and/or in NVRAM).

FIG. 4B exemplarily illustrates reduced occurrences of read amplifications in data read operations based on such exemplary metadata tree structure of FIG. 4A, which will be seen to be significantly reduced compared to read amplifications occurring by processing as described in connection with FIG. 3B.

Exemplarily, it is assumed that the metadata layer receives an object read request directed to the data object being associated with the metadata tree structure of FIG. 3A, to read DATA 12 thereof.

Then, instead of reading the root node RN and the indirect nodes IN 1 and IN 13 of the tree branch leading to the block of the target data block DATA 12 by random reads from storage device(s), the root node RN and the indirect nodes IN 1 and IN 13 of the tree branch leading to the block of the target data block DATA 12 can efficiently be read from cache memory (without requiring any random read request to the data protection layer or storage device(s)).

Such processing significantly reduces the read amplification, in that only the data of the direct node DN6 of the tree branch of the target block and the data of the block of DATA 12 needs to be read from the storage device(s) by random read operations. In addition, only efficient cache reads to read the data of the root node RN and the indirect nodes IN 1 and IN 13 is required. Accordingly, by subtree caching of the upper node generation tree levels (e.g. caching a root node and the nodes of one or more intermediate tree levels below the root node level), a significant reduction of read amplifications in handling of object-related read requests can be achieved.

FIG. 4C exemplarily illustrates reduced occurrences of read and write amplifications in data read operations based on such exemplary metadata tree structure of FIG. 4A, which will be seen to be significantly reduced compared to read and write amplifications occurring by processing as described in connection with FIG. 3C.

Exemplarily, it is assumed that the metadata layer receives an object write request directed to the data object being associated with the metadata tree structure of FIG. 4A, to write new data to data stored in block of DATA 15.

According to a log write method, such data is written to a newly allocated block, i.e. the new data DATA 15* is written to a newly allocated block, and the metadata tree structure is updated to reflect the new situation, in that related nodes of the metadata tree structure are updated.

However, this first involves identification of the block storing the old data DATA 15, by referring to the nodes as follows.

In such situation, the metadata layer may be configured to refer to the root node RN of the metadata tree structure, based on the object write request being directed to data of the associated data object, and the root node RN can be read efficiently from cache memory.

Then, similar to FIG. 3C, the process continues to walk down the target branch leading to the target block of data block DATA 15, by following the pointer information and reading the next lower node of the tree branch, to successively read indirect nodes IN 1 and IN 13. However, in the example of FIG. 4C, since the upper two tree levels of the indirect nodes below the root node level are exemplarily held/maintained in cache memory, the indirect nodes IN 1 and IN 13 can be efficiently read from cache memory instead of requiring random reads, and only data of the direct node DN 7 needs to read from the storage device by random read.

So, similar to the reduction of read amplifications occurring in connection with a read request as discussed above, the processing of an object-related write request leads to a significant reduction of the number of read amplifications.

To modify the data block, similar as in FIG. 3C, also the data of block DATA 15 may be read by random read to be modified as requested, and the modified data block DATA 15* shall be written to a new place. That is, after allocating a new storage block, the modified data block DATA 15* is written to a newly allocated block and the metadata nodes of the target branch are modified to have updated pointer information according to the new target branch to the block having the newly written data block DATA 15*.

Accordingly, similar to FIG. 3C above, the modified direct node DN 7* is written to storage device (preferably to another newly allocated storage block) by random write.

However, instead of also writing the other modified nodes directly via random write, the indirect node IN 13, the indirect node IN 1 and the root node RN are overwritten in the cache memory (e.g. with the updated pointers), thereby avoiding random writes to storage device(s).

Summarizing the above, read and write amplifications occurring in processing object-related read request exemplarily exchanged between a metadata layer and a data protection layer may be significantly reduced by subtree caching of metadata nodes of one or more upper node tree generations/levels, here exemplarily the upper most three node tree levels (exemplarily all metadata nodes of tree levels above the lowest tree level, being the direct node tree level).

Accordingly, by subtree caching of one or more upper tree levels of the metadata structure(s) (e.g. caching the root nodes and the indirect nodes), a significant reduction of read and write amplifications in handling of object-related read and write requests can be achieved.

IV.2 Direct Node Subtree Caching

According to some exemplary embodiments, the metadata layer may manage metadata of one or more data objects in metadata tree structures, each exemplarily including a root node pointing to one or more storage blocks storing data blocks, to one or more indirect nodes, and/or to one or more direct nodes, and optionally including one or more indirect nodes pointing to one or more indirect nodes and/or to one or more direct nodes, and/or optionally including one or more direct nodes pointing to one or more storage blocks.

According to some exemplary embodiments, while some portions of a metadata and/or of metadata tree structures may be stored on storage devices, at least a part (portion) of metadata and/or of metadata tree structures is preferably stored in a cache memory such as e.g. in a volatile cache memory (and/or a non-volatile memory such as e.g. one or more NVRAMs) of the configurations of any of FIGS. 1A to 1C above, specifically providing the benefits that read and/or write amplifications as discussed above may be avoided or at least be significantly reduced, thereby making handling of object-related I/O requests significantly more efficient in systems handling many clients and many data objects and high amounts of metadata to handle a very high number of I/O requests.

At the same time, since not all of the metadata needs to be kept in cache memory, it is possible to limit the required cache memory capacity, which allows provision of a very scalable system with reasonable cache capacity per node apparatus.

Figure 5A:
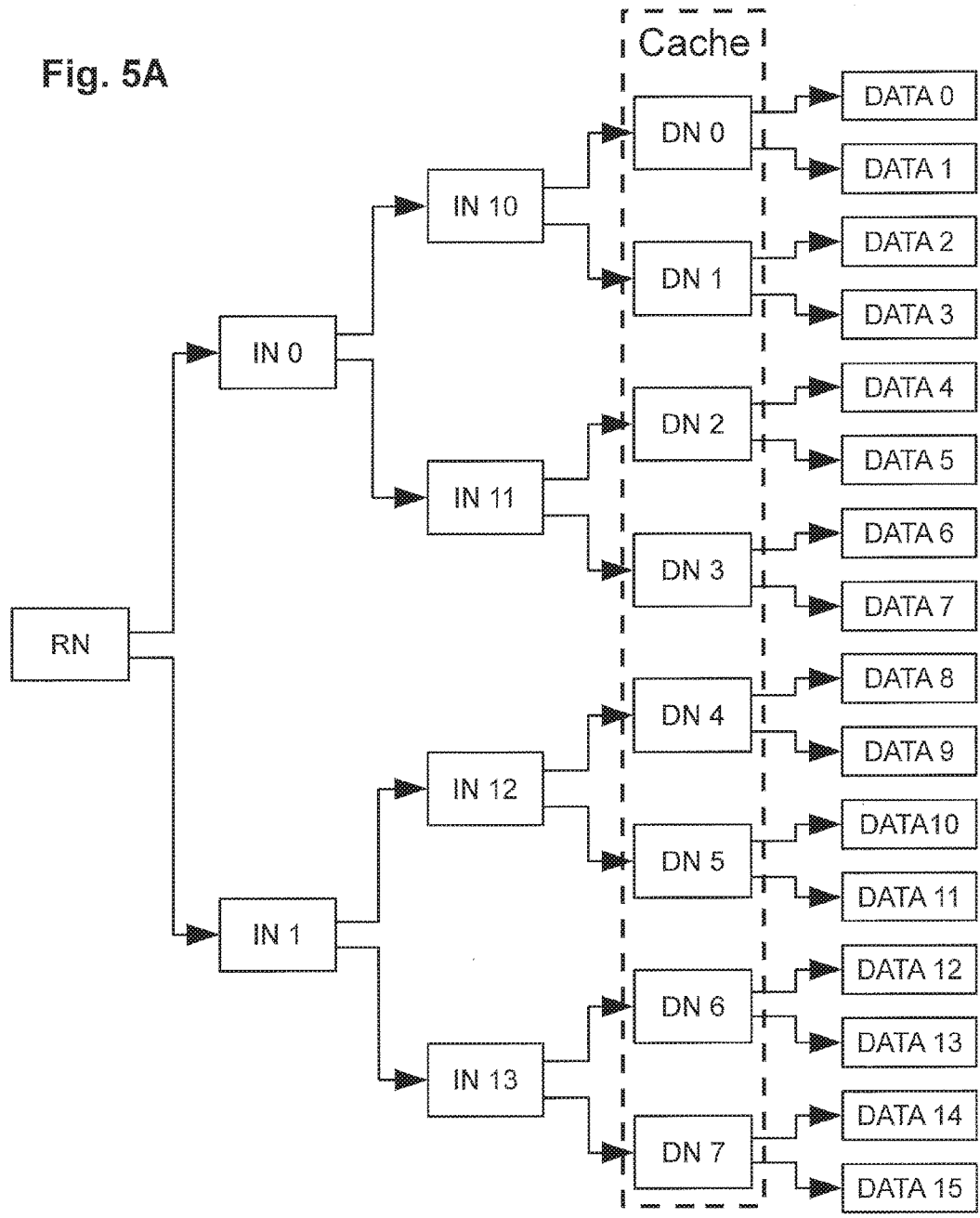
FIG. 5A exemplarily shows a schematic diagram of an exemplary metadata tree structure in connection with an example of a metadata subtree caching, and FIGS. 5B and 5C exemplarily illustrate reduction of occurrences of read amplifications in data read operations and read and write amplifications in data write operations based on such exemplary metadata tree structure according to some exemplary embodiments.
Figure 5B:
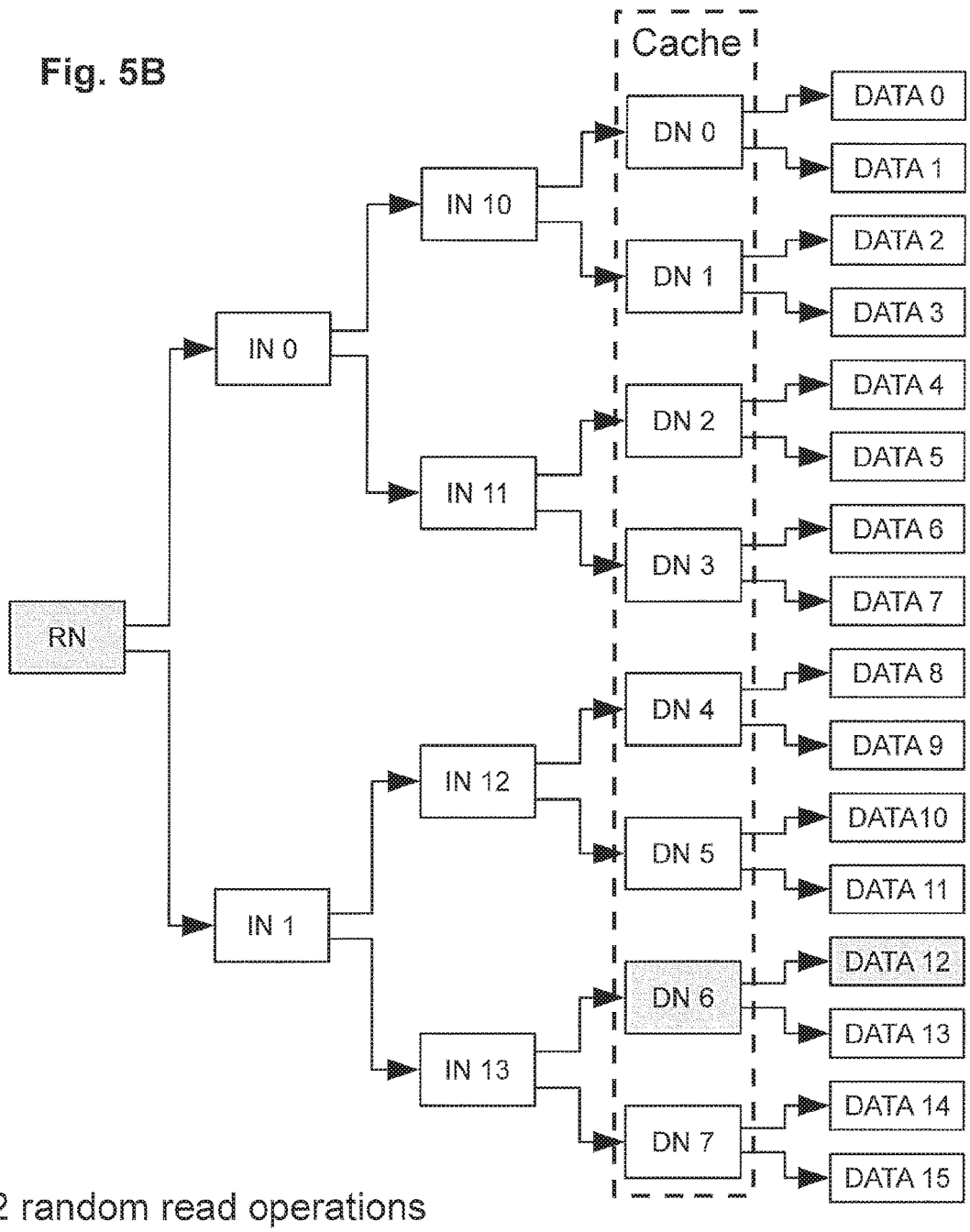
Figure 5B:
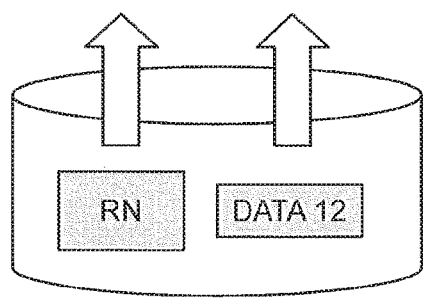
Figure 5B:
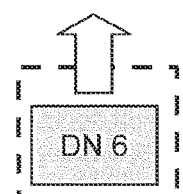
Figure 5C:
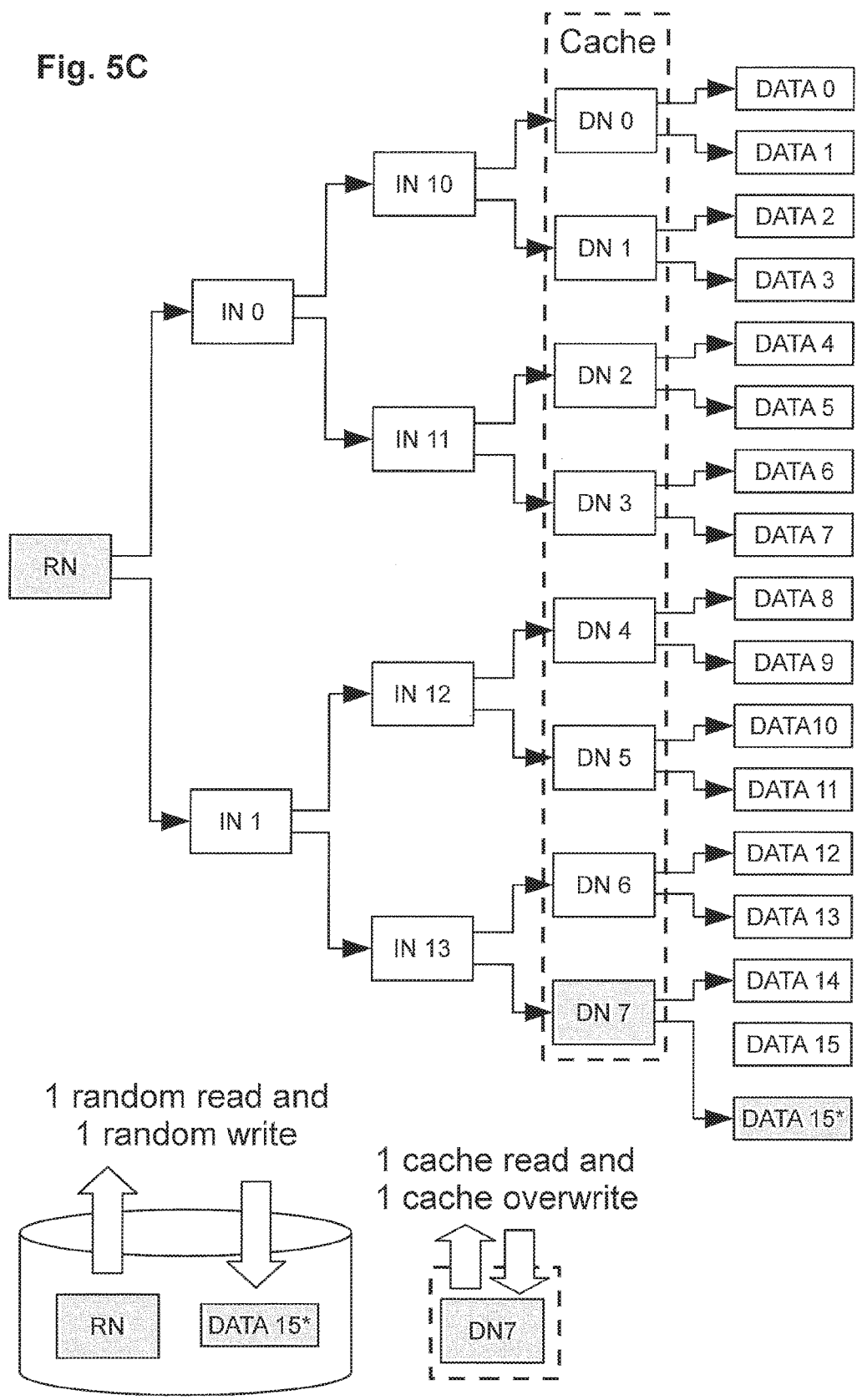

FIG. 5A exemplarily shows a schematic diagram of an exemplary metadata tree structure in connection with an example of metadata subtree caching, and FIGS. 5B and 5C exemplarily illustrate reduction of occurrences of read amplifications in data read operations and read and write amplifications in data write operations based on such exemplary metadata tree structure according to exemplary embodiments.

Exemplarily, for one or more data objects, the metadata layer may hold all nodes of a certain metadata tree structure node tree level in cache (such as e.g. in volatile cache and/or the non-volatile memory, such as e.g. one or more NVRAMs).

Exemplarily, in FIG. 5A, all direct nodes DN 0 to DN 7 of a metadata tree structure similar to FIG. 3A may be held in cache memory for efficient access.

FIG. 5B exemplarily illustrates reduced occurrences of read amplifications in data read operations based on such exemplary metadata tree structure of FIG. 5A, which will be seen to be significantly reduced compared to read amplifications occurring by processing as described in connection with FIG. 3B.

Exemplarily, it is assumed that the metadata layer receives an object read request directed to the data object being associated with the metadata tree structure of FIG. 5A, to read DATA 12 thereof.

In such situation, the metadata layer may be configured to refer to the root node RN of the metadata tree structure, based on the object read request being directed to data of the associated data object. This may require a block-related read request to read the data of the corresponding root node RN in the storage device. In other exemplary embodiments, the root node RN may also be preliminarily stored in the cache memory, which would avoid such read operation from storage device to read the corresponding root node RN.

In this example, since all direct nodes are exemplarily held/maintained in cache memory, based on address information (e.g. based on an indication relating to an offset of the position of data to be read), the metadata layer may directly refer to a direct node in cache memory which corresponds to the address information for the associated data object on the basis of pointer information of the root node RN.

Specifically, based on the address information, the metadata layer may directly refer to direct node DN 6 stored in the cache memory, and the metadata layer will refer to a pointer in the direct node DN 6 being related to the target data of block DATA 12.

By such reference to the corresponding pointer in the direct node DN 6 stored in cache memory, the metadata layer may refer to block DATA 12 referenced by such corresponding pointer, to then issue to the data protection layer (or to the storage device layer in other embodiments) a block-related read request to read the data stored at block address of block DATA 12 in the storage device.

Such processing significantly reduces the read amplification, in that only the data of the root node RN and the data of the block of DATA 12 needs to be read from the storage device(s) by random read operations.

In addition, only one efficient cache read to read the data of direct node DN 6 is required. If the data of the root node RN is additionally stored in cache memory, even only one random read operation to read the data of the block of DATA 12 is required in connection with two efficient cache reads to read the data of the root node RN and the direct node DN 6 is required.

Accordingly, by subtree caching of a lowest node generation (i.e. caching the direct nodes), potentially combined with also holding the root nodes in cache, a significant reduction of read amplifications in handling of object-related read requests can be achieved.

FIG. 5C exemplarily illustrates reduced occurrences of read and write amplifications in data read operations based on such exemplary metadata tree structure of FIG. 5A, which will be seen to be significantly reduced compared to read and write amplifications occurring by processing as described in connection with FIG. 3C.

Exemplarily, it is assumed that the metadata layer receives an object write request directed to the data object being associated with the metadata tree structure of FIG. 5A, to modify data stored in storage block of DATA 15.

According to a log write method, such modified data block is written to a newly allocated storage block, i.e. the new data DATA 15\* is written to a newly allocated block, and the metadata tree structure is updated to reflect the new situation, in that related nodes of the metadata tree structure are updated.

However, this first involves identification of the block storing the old data DATA 15, by referring to the nodes as follows.

In such situation, the metadata layer may be configured to refer to the root node RN of the metadata tree structure, based on the object write request being directed to data of the associated data object. This may require a block-related read request to read the data of the corresponding root node RN in the storage device. In other exemplary embodiments, the root node RN may also be preliminarily stored in the cache memory, which would avoid such read operation from storage device to read the corresponding root node RN.

Based on address information (e.g. based on an indication relating to an offset of the position of data to be read), the metadata layer may directly refer to a direct node in cache memory which corresponds to the address information for the associated data object on the basis of pointer information of the root node RN.

Specifically, based on the address information, the metadata layer may directly refer to direct node DN 7 stored in the cache memory, and the metadata layer will refer to a pointer in the direct node DN 7 being related to the target data of block DATA 15.

So, similar to the reduction of read amplifications occurring in connection with a read request as discussed above, the processing of an object-related write request leads to a significant reduction of the number of read amplifications.

In addition to writing the new data DATA 15\* to a newly allocated block of storage areas of the storage device(s), for updating the metadata tree accordingly, such write operation further includes writing of new metadata nodes. However, in the present example this exemplarily only requires a cache overwrite of the direct node DN 7 stored in cache so that it points to the formerly referenced data block of DATA 14 and to the newly written data block of DATA 15\*.

However, the upper node generation tree levels of the root node RN and the indirect nodes IN 0, IN 1 and IN 10 to IN 13, do not need to be updated since their pointers are still valid. Specifically, the pointer in indirect node IN 13 pointing to direct node DN 7 in cache memory does not need to be modified since the pointer is still valid due to the DN node 7 being overwritten in cache memory.

However, according to checkpoint processing discussed in further exemplary embodiments below, also the upper level metadata nodes may be updated on storage devices at certain times, e.g. when a checkpoint is taken. Such processing may be combined with writing "deltas" to non-volatile memory such as e.g. the NVRAM.

In the above example, instead of four random read operations and five random write operations as in FIG. 3C, only one random read (to read root node RN from storage device(s)), one random write (to write the new data of DATA 15\* to storage device(s)), and one cache read and one cache overwrite in connection with direct node DN 7 are required, thereby significantly reducing the read and write amplifications occurring in the processing according to FIG. 3C.

If the data of the root node is additionally held in cache memory, this would even only require one random write (to write the new data of DATA 15\* to storage device(s)) and two cache reads (to read data of root node RN and of direct node DN 7 from cache) and one cache overwrite (to overwrite direct node DN 7 in cache).

Summarizing the above, read and write amplifications occurring in processing object-related read request exemplarily exchanged between a metadata layer and a data protection layer may be significantly reduced by subtree caching of metadata nodes of a node generation/tree level.

Accordingly, by subtree caching of a lowest node generation (i.e. caching the direct nodes), potentially combined with also holding the root nodes in cache, a significant reduction of read and write amplifications in handling of object-related read and write requests can be achieved.

IV.3 Root Node and Direct Node Subtree Caching

As discussed above, further reductions of read and write amplifications can be achieved by additionally holding the root nodes of metadata tree structure of data objects in cache memory.

FIG. 6A exemplarily shows an exemplary metadata tree structure in connection with another example of a metadata subtree caching according to further exemplary embodiments.

Exemplarily, for one or more data objects, the metadata layer may hold all nodes of a certain metadata tree structure node tree level in cache (such as e.g. in cache memory and/or the non-volatile memory, such as e.g. one or more NVRAMs).

Exemplarily, in FIG. 6A, all direct nodes DN 0 to DN 7 of a metadata tree structure similar to FIG. 3A may be held in cache memory for efficient access, and in addition, the root node RN of such metadata tree structure may be held in cache memory for efficient access.

Accordingly, random read operations to read the root node RN from storage device(s) in FIGS. 5B and 5C above can additionally be avoided, and the root node RN can instead be efficiently read from the cache memory in handling read or write operations from/to the associated data object.

IV.4 Root Node and Indirect Node Subtree Caching

Figure 6B:
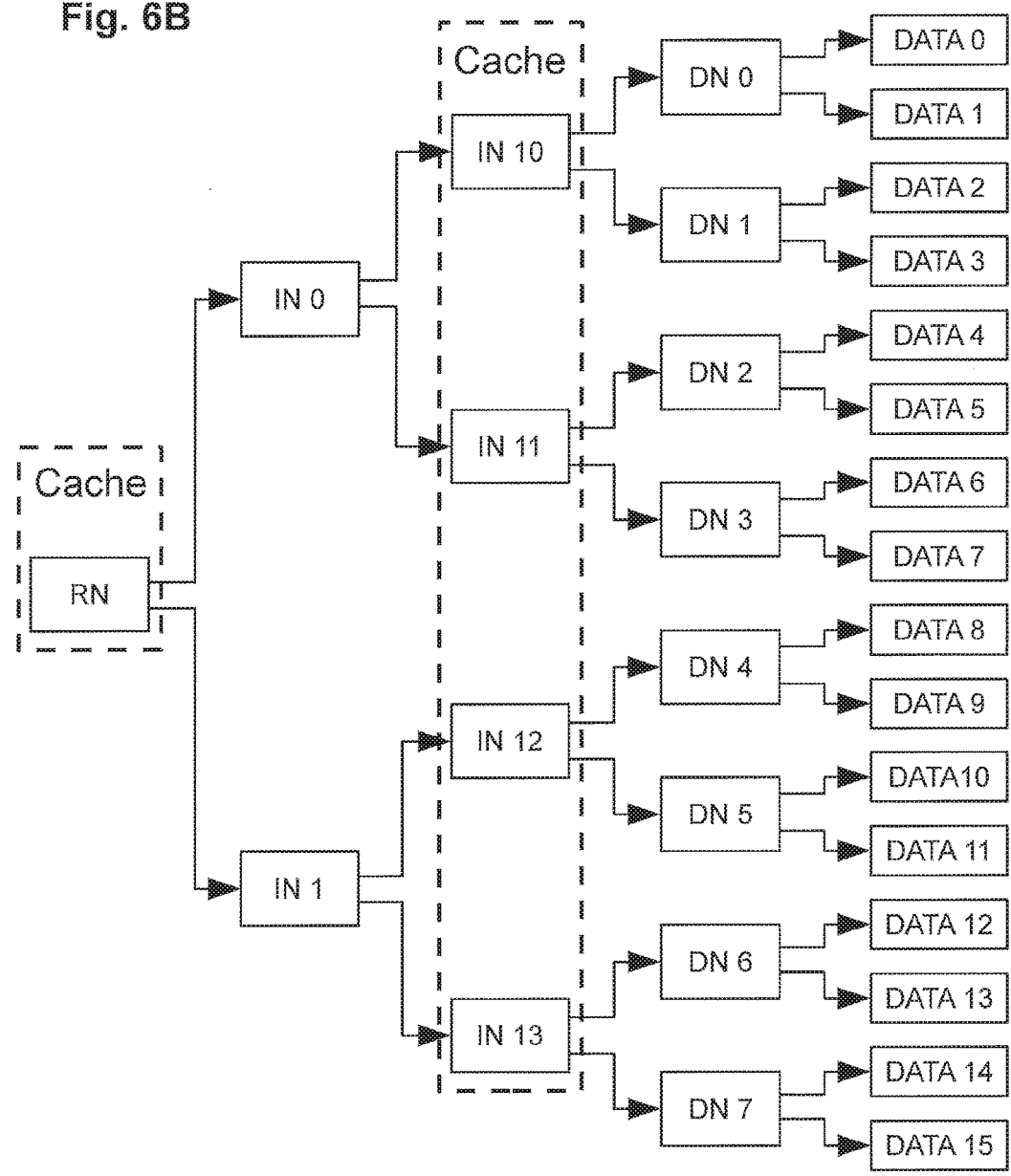
Figure 6C:
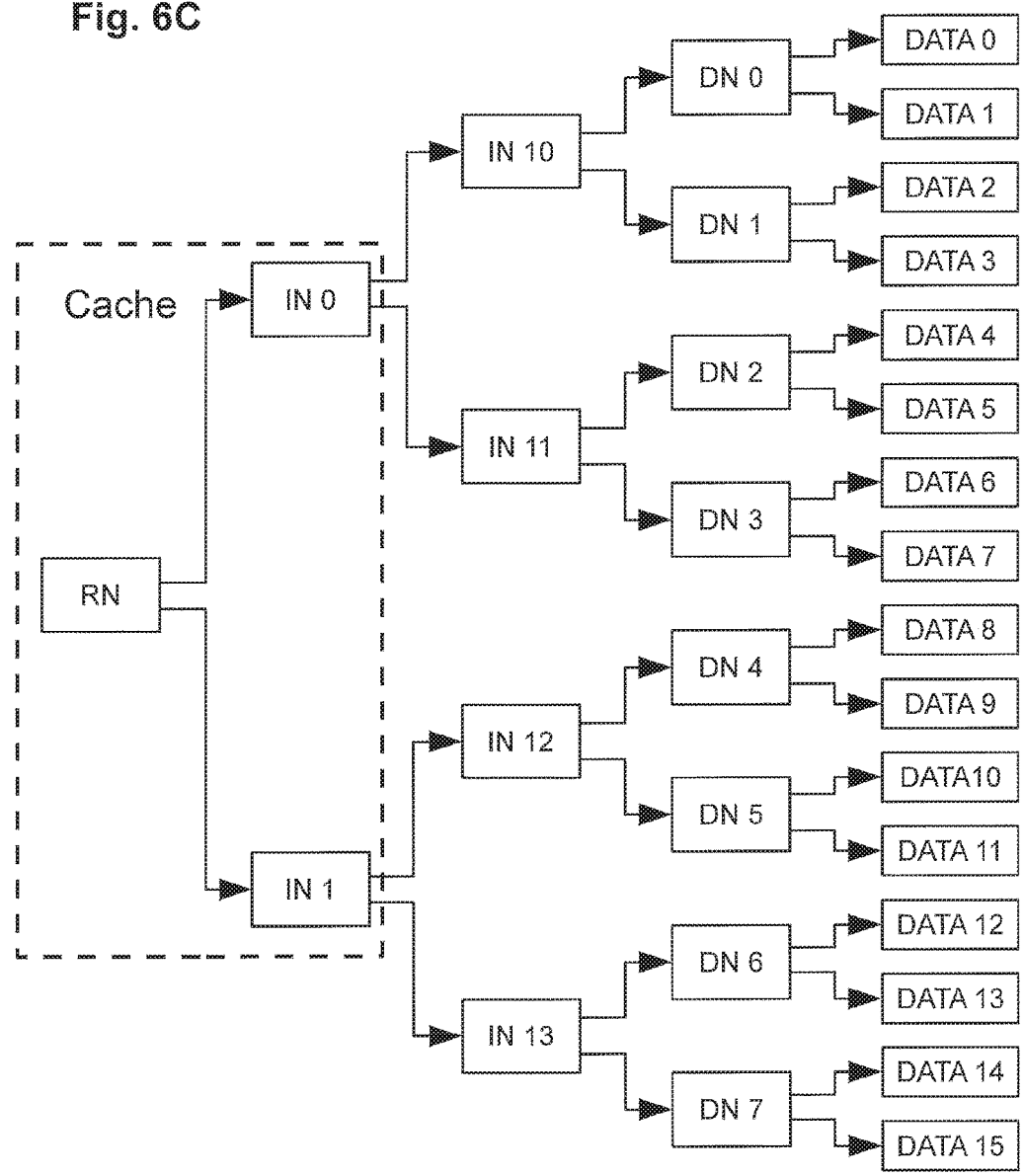

FIGS. 6B and 6C exemplarily show an exemplary metadata tree structure in connection with further examples of a metadata subtree caching according to further exemplary embodiments.

In FIG. 6B, exemplarily the indirect nodes IN 10 to IN 13 of the lower node tree level of indirect nodes is stored in cache memory in addition to the root node RN.

This means that in read operations to read data of the associated data object, at least read amplifications due to random reads of the root node RN and one or more of the indirect nodes IN 0 and IN 1 of the upper (higher) level of indirect nodes as well as of the indirect nodes IN 10 to IN 13 of the lower node level of indirect nodes can be avoided, so as to significantly reduce the occurrence of read amplifications in handling read requests and write requests.

In addition, for write requests the respective modified indirect node among the indirect nodes IN 10 to IN 13 of the lower node level of indirect nodes can be achieved by cache overwrite, and only the respective corresponding direct node pointing to the newly written data block needs to be written newly by random write, so that also write amplifications in handling write requests can be significantly reduced.

In FIG. 6C, exemplarily the indirect nodes IN 0 and IN 1 of the upper node level of indirect nodes is stored in cache memory in addition to the root node RN.

This means that in read operations to read data of the associated data object, at least read amplifications due to random reads of the root node RN and one or more of the indirect nodes IN 0 and IN 1 of the upper (higher) level of indirect nodes can be avoided, so as to significantly reduce the occurrence of read amplifications in handling read requests and write requests.

In addition, for write requests the respective modified indirect node among the indirect nodes IN 0 and IN 1 of the upper node tree level of indirect nodes can be achieved by cache overwrite, and only the respective corresponding indirect node of the lower level and the respective corresponding direct node pointing to the newly written data block needs to be written newly by random writes, so that also write amplifications in handling write requests can be significantly reduced.

IV.5 Further Examples of Subtree Caching

Figure 7A:
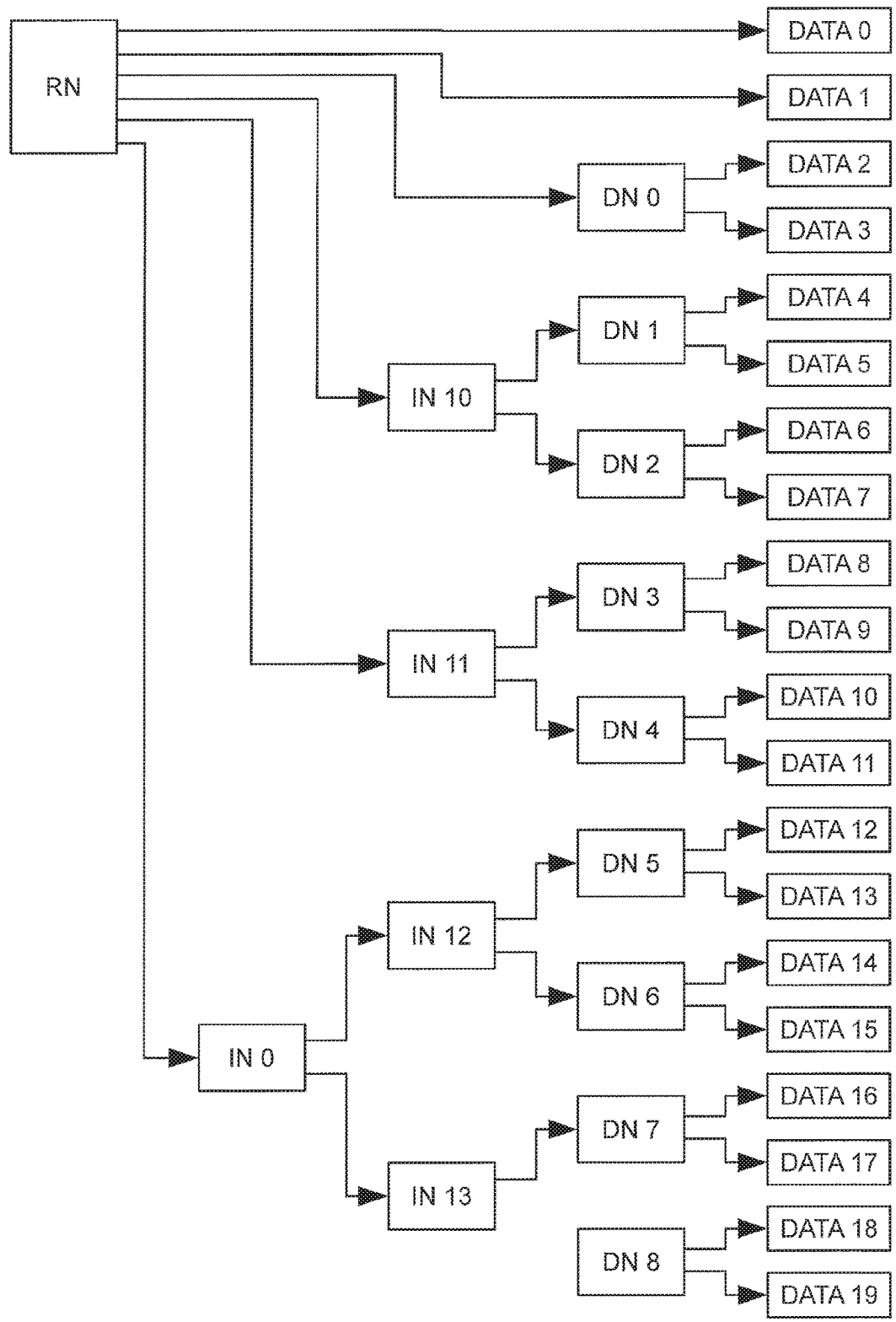
FIG. 7A exemplarily shows a schematic diagram of another exemplary metadata tree structure, and FIG. 7B to 7E exemplarily show an exemplary metadata tree structure in connection with further examples of a metadata subtree caching according to further exemplary embodiments.
Figure 7B:
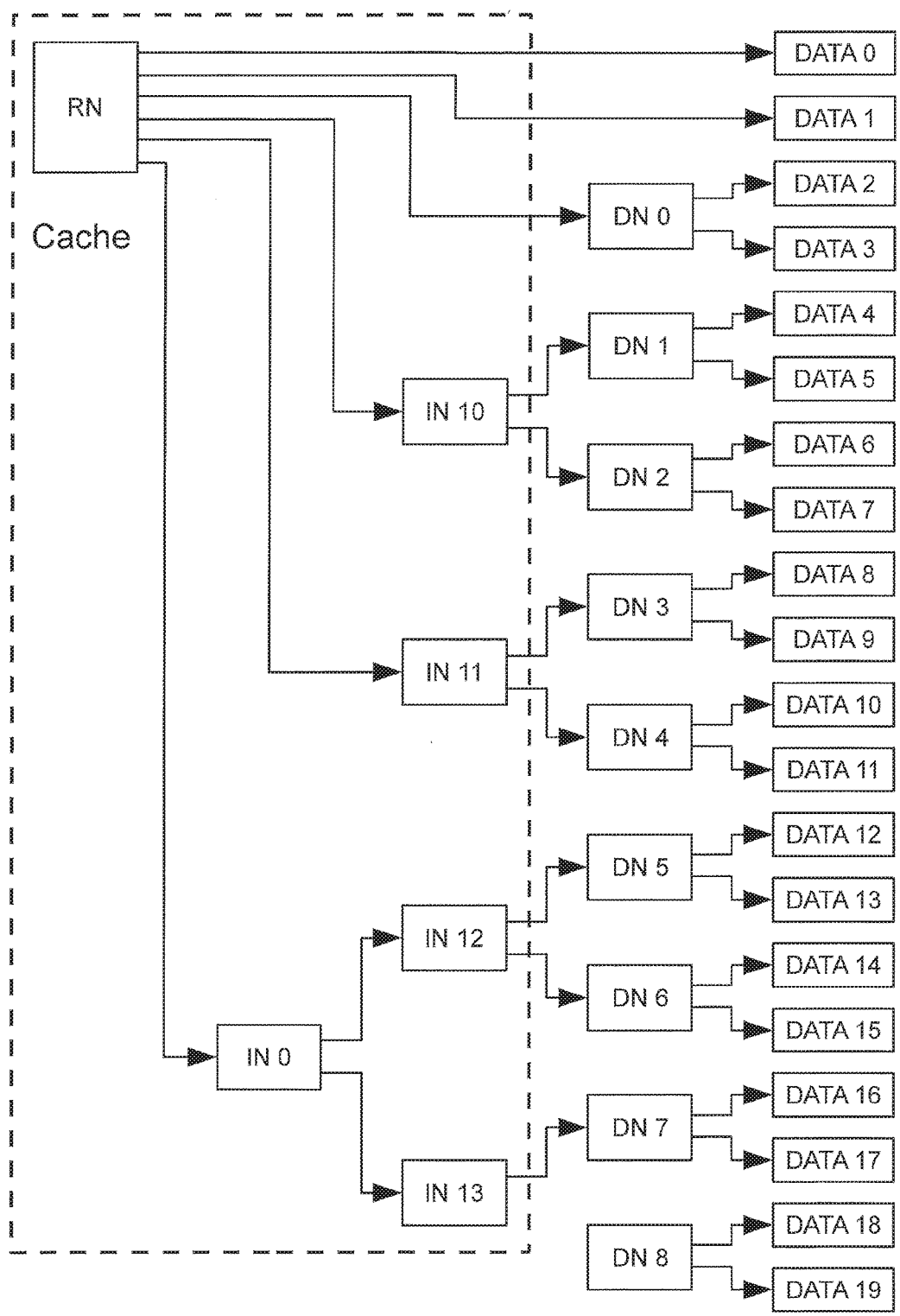
Figure 7C:
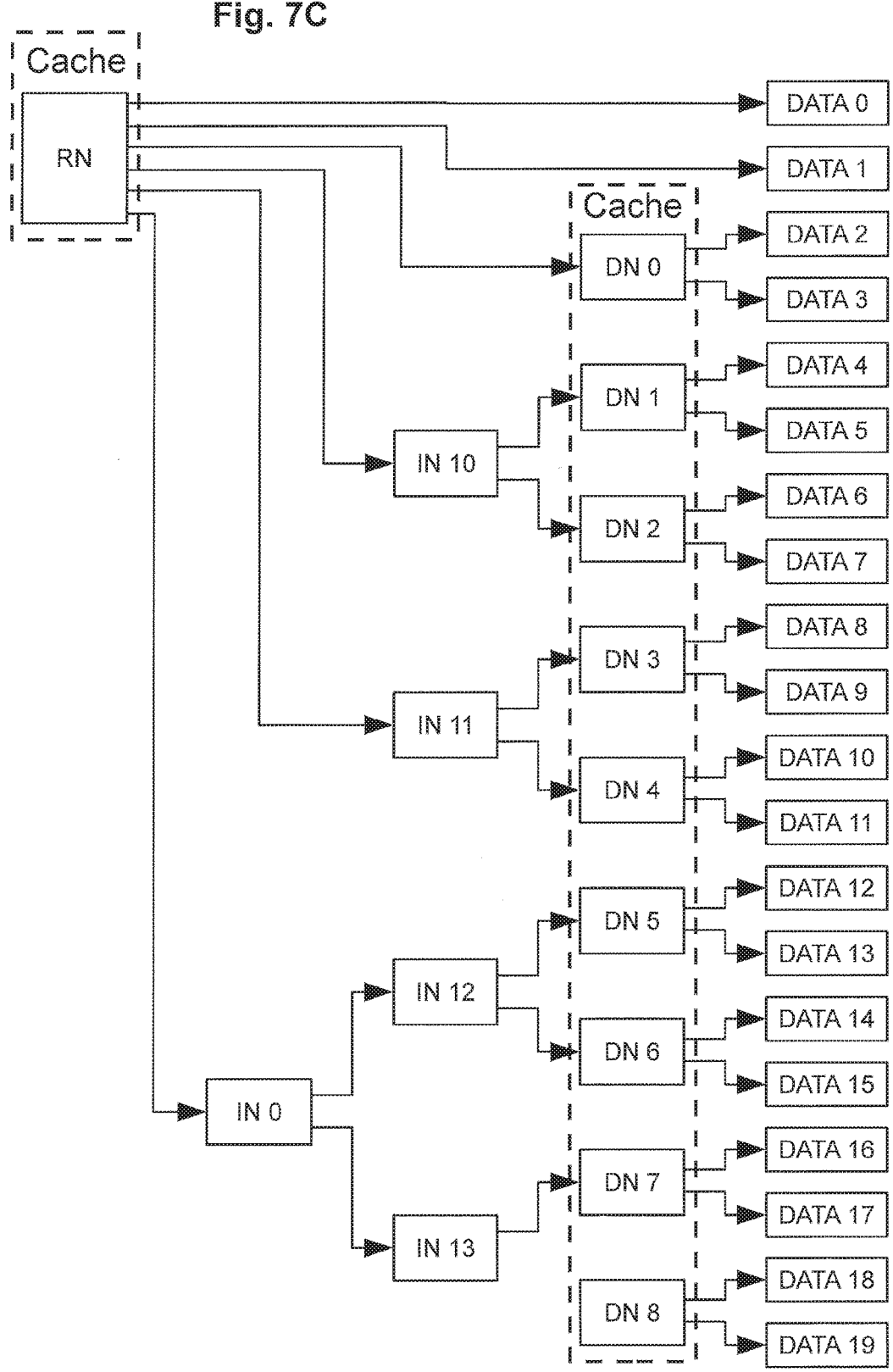
Figure 7D:
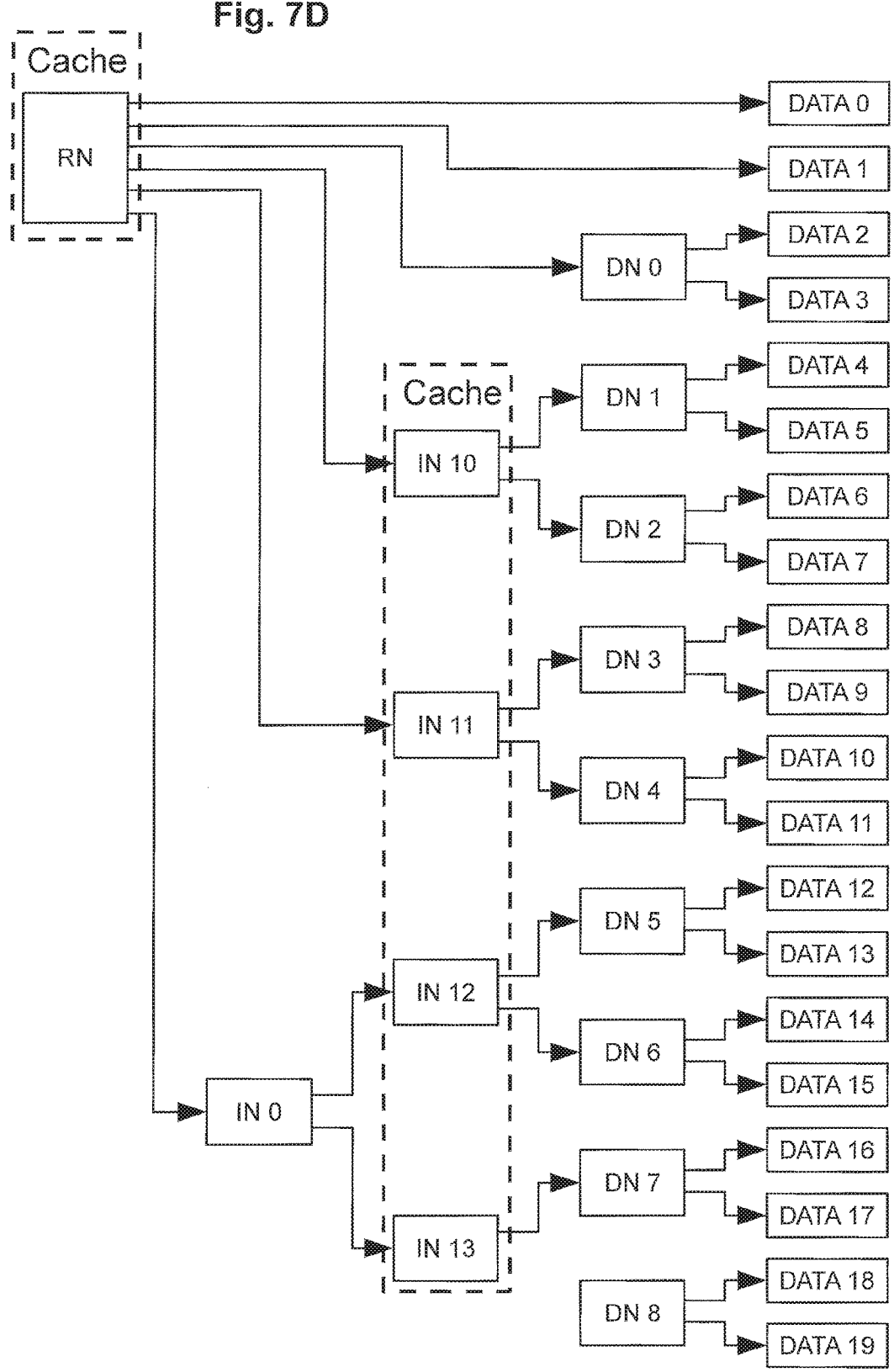
Figure 7E:
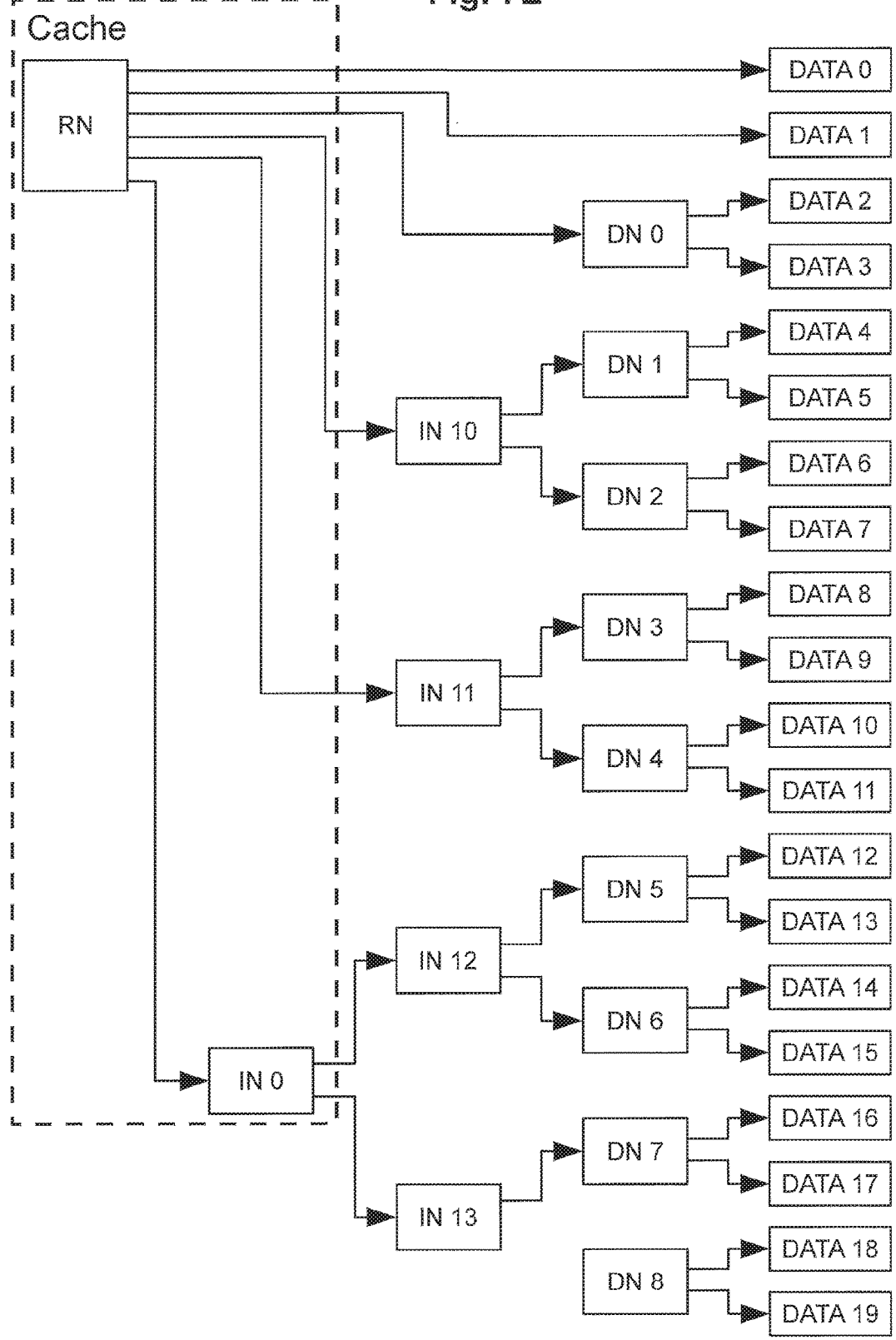

FIG. 7A exemplarily shows a schematic diagram of another exemplary metadata tree structure, and FIG. 7B to 7D exemplarily show an exemplary metadata tree structure in connection with further examples of a metadata subtree caching according to further exemplary embodiments.

The metadata tree structure of FIG. 7A differs from the above in that the root node RN may directly point to data blocks, direct nodes and indirect nodes, while optional indirect nodes still point to direct nodes and/or indirect nodes and direct nodes still point to data blocks.

In FIG. 7B, exemplarily, the root node RN and the direct nodes DN 0 to DN 8 of the metadata structure associated with the data object are held in cache memory, to significantly reduce read and write amplifications at least in connection with avoiding random reads and random writes in connection with the root node, the indirect nodes and the direct nodes.

In FIG. 7C, exemplarily, the root node RN and the indirect nodes IN 10 to IN 13 of the lower node level of indirect nodes of the metadata structure associated with the data object are held in cache memory, to significantly reduce read and write amplifications at least in connection with avoiding random reads and random writes in connection with the root node and the indirect nodes.

In FIG. 7D, exemplarily, the root node RN and the indirect node IN 0 (and further indirect nodes) of the upper node level of indirect nodes of the metadata structure associated with the data object are held in cache memory, to significantly reduce read and write amplifications at least in connection with avoiding random reads and random writes in connection with the root node and the indirect nodes of the upper node level of indirect nodes.

V. Checkpoint Processing Including Subtree Caching V.1 Major and Minor Node Management for Checkpoint Processing FIG. 8A exemplarily shows a schematic diagram of another exemplary metadata tree structure, and FIG. 8B exemplarily illustrates the metadata tree structure of FIG. 8A being grouped in a cached upper metadata tree portion and a lower metadata portion in connection with checkpoint processing based on such exemplary metadata tree structure according to some exemplary embodiments.

Exemplarily, while the checkpoint processing of below examples and exemplary embodiments may be performed in connection with examples of subtree caching as discussed above, the metadata tree structure of FIG. 8A exemplarily has at least two object layers, in that a first object (exemplarily referred to as "index object") is exemplarily provided with a metadata tree structure having a root node RN pointing to optionally plural indirect node tree levels (exemplarily with three indirect node tree levels) which point to a tree level of direct nodes (exemplarily in the $4^{th}$ metadata tree level).

However, instead of pointing to blocks storing data of the data object in data blocks, the direct nodes of the "index object" point to root nodes RN of plural data objects in a second object layer. This allows for more efficient management of a high amount of data objects in a single metadata tree structure including the metadata tree structure of the index object and the respective metadata structures of the data objects.

Each data object may again include a root node RN pointing to optionally plural indirect node tree levels (exemplarily with two indirect node tree levels) which point to a tree level of direct nodes (exemplarily in the $8^{th}$ metadata tree level). Similar to the above examples, the direct nodes DN of the data objects point to blocks of data of the respective data objects at the data block level (e.g. including user data).

Figure 8A:
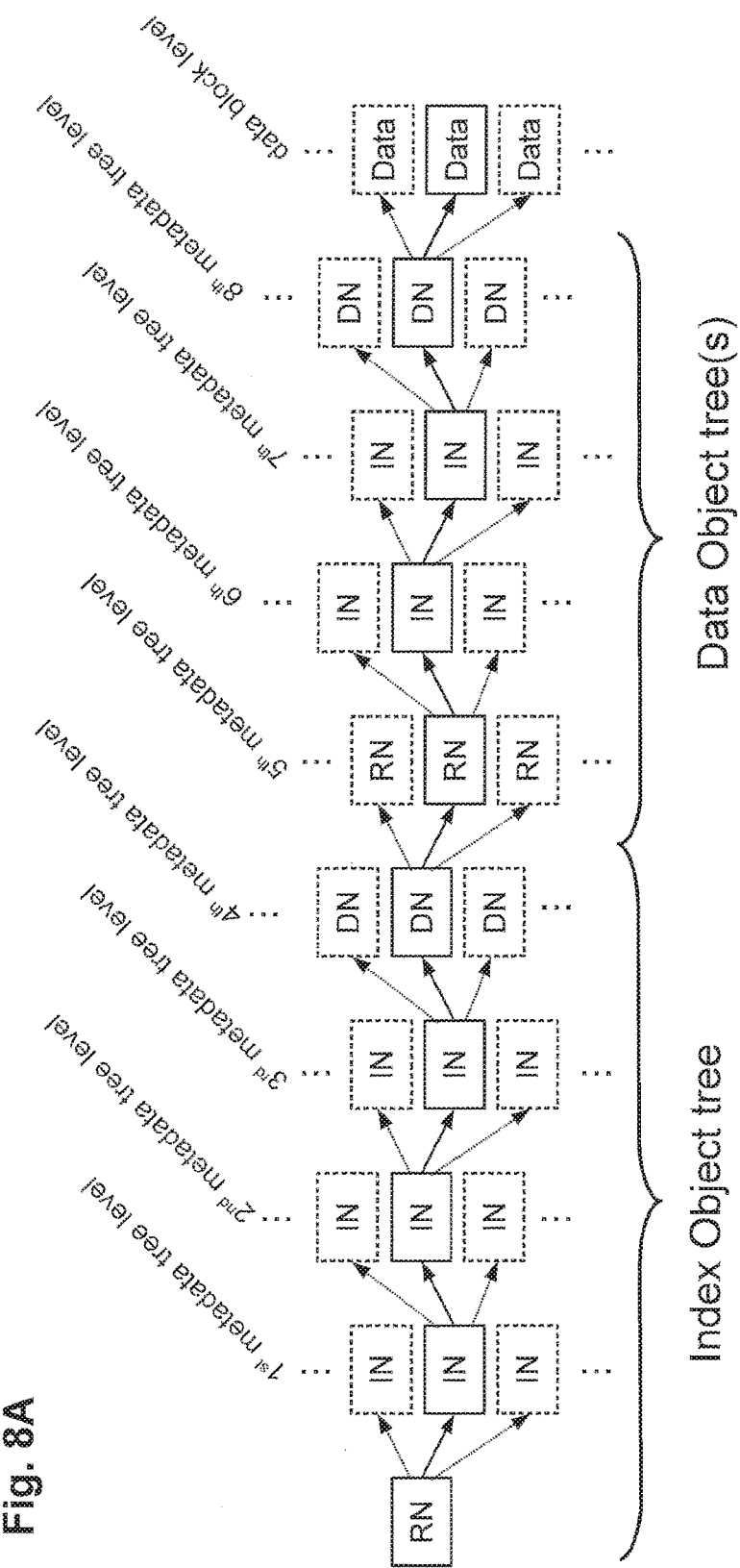
FIG. 8A exemplarily shows a schematic diagram of another exemplary metadata tree structure, and FIG. 8B exemplarily illustrates the metadata tree structure of FIG. 8A being grouped in a cached upper metadata tree portion and a lower metadata portion in connection with checkpoint processing based on such exemplary metadata tree structure according to some exemplary embodiments.
Figure 8B:
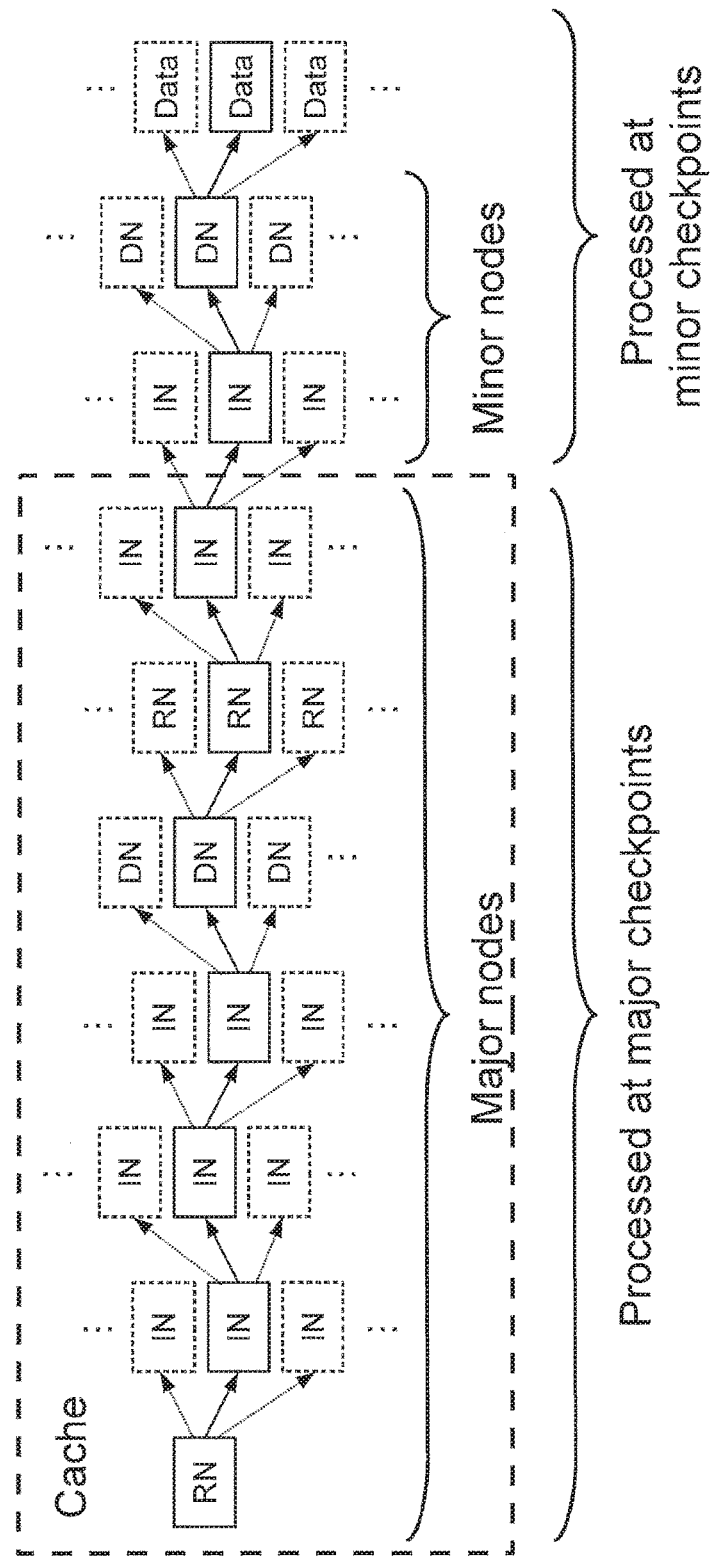
FIGS. 8C and 8D exemplarily illustrate the metadata tree structure of FIG. 8A being grouped in a cached upper metadata tree portion and a lower metadata portion in connection with checkpoint processing based on such exemplary metadata tree structure according to some further exemplary embodiments.

Exemplarily, in FIG. 8B, the two lowest tree levels of the metadata structure (i.e. exemplarily the direct nodes of the data objects and the next higher tree level of metadata nodes (lower or minor tree levels), here exemplarily indirect nodes of the $7^{th}$ metadata tree level) are exemplarily referred to as minor nodes (minor metadata nodes), which may exemplarily be stored on storage devices and which may exemplarily be not generally be maintained in cache memory.

On the other hand, the upper tree portion metadata nodes, e.g. the root node RN of the index object and the metadata nodes of the $1^{st}$ to $6^{th}$ metadata tree level (upper or major tree levels) are exemplarily held in cache memory, and such metadata nodes are exemplarily referred to as major nodes (major metadata nodes).

Such arrangement is similar to at least the configuration of FIGS. 4A and 6C, having an upper cached metadata tree structure portion of tree levels (major nodes) and a lower metadata tree structure portion of tree levels (minor nodes).

Figure 8C:
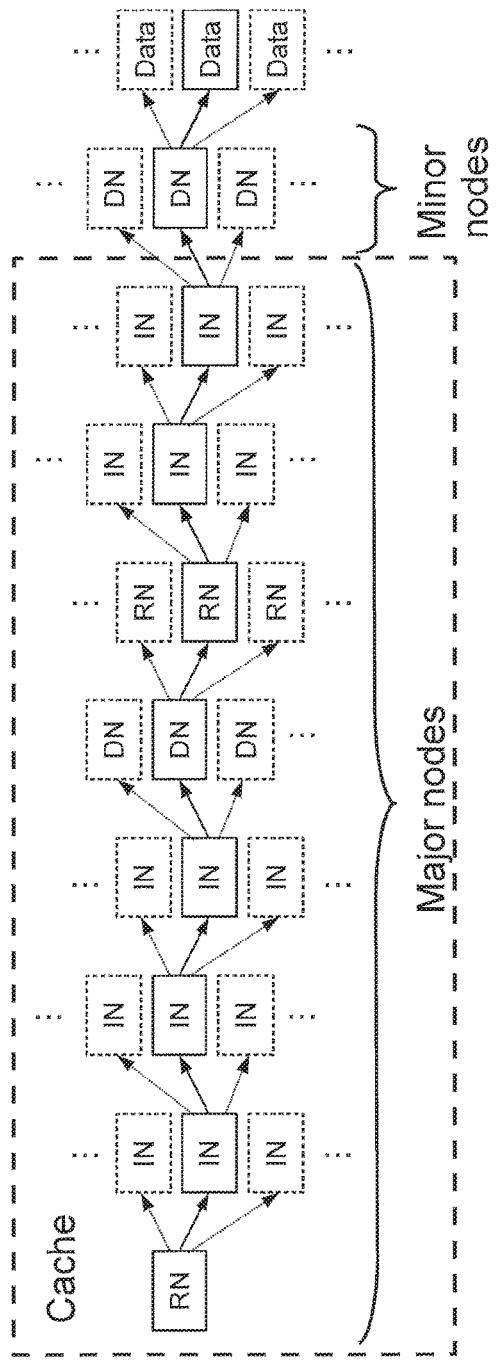
Figure 8D:
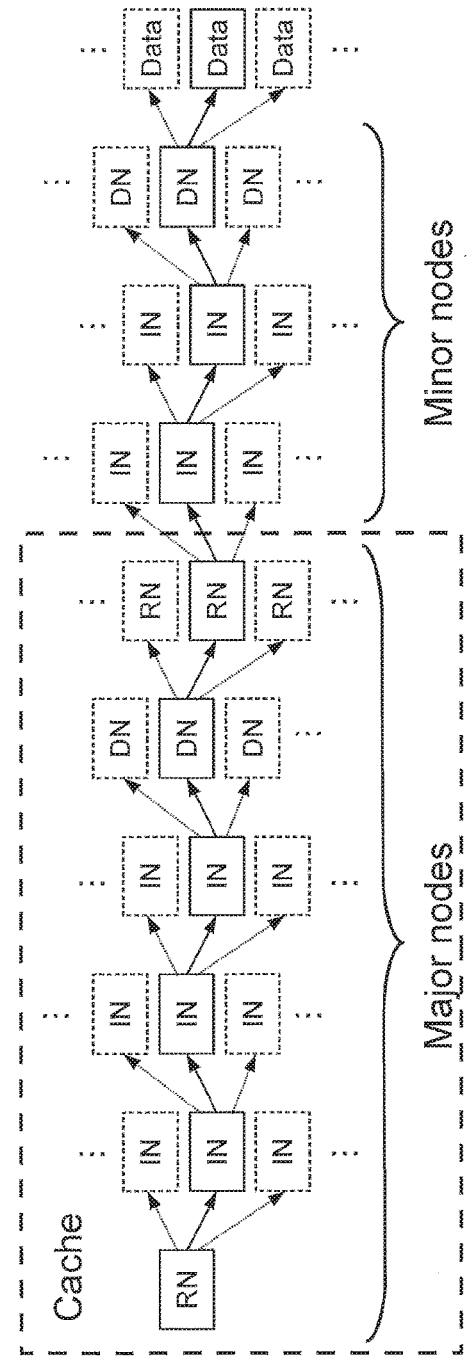

FIGS. 8C and 8D exemplarily illustrate the metadata tree structure of FIG. 8A being grouped in a cached upper metadata tree portion and a lower metadata portion in connection with checkpoint processing based on such exemplary metadata tree structure according to some further exemplary embodiments.

Exemplarily, in FIG. 8C, only the lowest tree level of the metadata structure (i.e. exemplarily the direct nodes of the data objects) are exemplarily referred to as minor nodes (minor metadata nodes), which may exemplarily be stored on storage devices and which may exemplarily be not generally be maintained in cache memory.

On the other hand, the upper tree portion metadata nodes, e.g. the root node RN of the index object and the metadata nodes of the $1^{st}$ to $7^{th}$ metadata tree level (upper or major tree levels) are exemplarily held in cache memory, and such metadata nodes are exemplarily referred to as major nodes (major metadata nodes).

Exemplarily, in FIG. 8D, the three lowest tree levels of the metadata structure (i.e. exemplarily the direct nodes of the data objects and the two next higher tree level of metadata nodes (lower or minor tree levels), here exemplarily indirect nodes of the $6^{th}$ and $7^{th}$ metadata tree levels) are exemplarily referred to as minor nodes (minor metadata nodes), which may exemplarily be stored on storage devices and which may exemplarily be not generally be maintained in cache memory.

On the other hand, the upper tree portion metadata nodes, e.g. the root node RN of the index object and the metadata nodes of the $1^{st}$ to $5^{th}$ metadata tree level (upper or major tree levels) are exemplarily held in cache memory, and such metadata nodes are exemplarily referred to as major nodes (major metadata nodes).

In general, such subtree caching may preferably include one or more lowest tree levels (including at least the tree level of the direct nodes) may represent minor metadata nodes, which may exemplarily be stored on storage devices and which may exemplarily be not generally be maintained in cache memory (only if such nodes are read in read/write operations, such minor nodes may temporarily be loaded to cache memory, but such minor nodes are preferably not held systematically in cache memory).

Furthermore, such subtree caching may preferably include one or more higher tree levels above the tree levels of the minor metadata nodes (including at least one tree level of indirect nodes) may represent minor metadata nodes which are exemplarily held/maintained systematically in cache memory.

V.2 Read and Write Request Processing in Connection with Checkpoint Processing

Figure 9A:
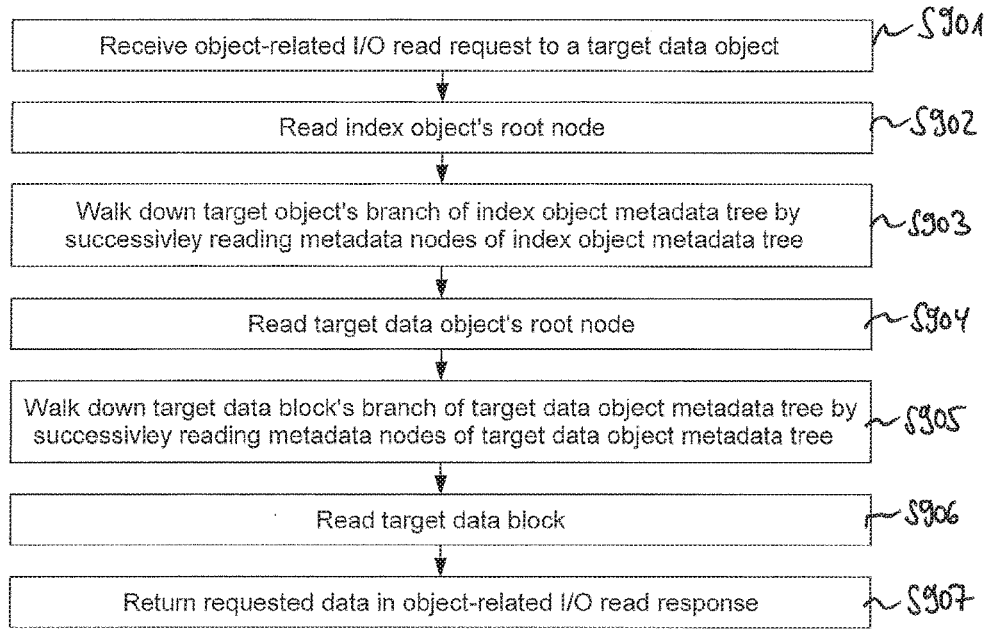
FIG. 9A exemplarily illustrates a flow chart of processing a read request in connection with checkpoint processing according to some exemplary embodiments, and FIG. 9B exemplarily illustrates a flow chart of processing walking down a tree branch of a metadata tree structure according to some exemplary embodiments.

FIG. 9A exemplarily illustrates a flow chart of processing a read request in connection with checkpoint processing according to some exemplary embodiments.

In step S901, an object-related I/O read request to a target data object is received at the metadata layer, and, based on an object identifier (e.g. an object number) indicated in the object-related I/O read request, the process may walk down a target branch of the metadata structure of the index object leading to the root node of the respective target data object.

For this purpose, the step S902 includes reading the root node RN of the index object. By referring to the pointer of the root node RN associated with the target data object, the process successively reads the next lower node of the target branch and refers to its pointer associated with the target data object leading to the next lower node of the target branch until the root node of the target object is identified and can be read.

By this processing, the process performs step S903 of walking down the target object's branch of the index object metadata tree structure by successively reading the metadata nodes of the target object's branch of the index object metadata tree structure.

After reading the respective direct node of the index object metadata tree structure of the target object's branch and referring to its pointer to the root node of the target data object, the process continues with step S904 to read the target data object's root node RN.

Based on further address information (e.g. a block identifier such as e.g. an offset or a logical block number of the target block) indicated in the object-related I/O read request, the process may walk down a target branch of the metadata structure of the target data object leading to the target block.

For this purpose, the step S904 includes reading the root node RN of the target data object. By referring to the pointer of the root node RN of the target data object associated with the target block, the process successively reads the next lower node of the target branch and refers to its pointer associated with the target data block leading to the next lower node of the target branch until the direct node pointing to the target block is identified.

By this processing, the process performs step S905 of walking down the target block's branch of the target data object metadata tree structure by successively reading the metadata nodes of the target branch of the target data object metadata tree structure.

After reading the respective direct node of the target object metadata tree structure of the target branch and referring to its pointer to the target data block, the process continues with step S906 to read the target data block (e.g. by random read).

Upon reading the target data block, step S907 includes returning the requested user data including the read data of the data block in an object-related I/O read response.

In the above, the process reads plural major metadata nodes which can efficiently be read from cache memory, since all major metadata nodes are systematically maintained in the cache memory, and only minor metadata nodes of the whole large metadata structure may need to be read from storage device(s), thereby significantly reducing read amplifications.

Figure 9B:
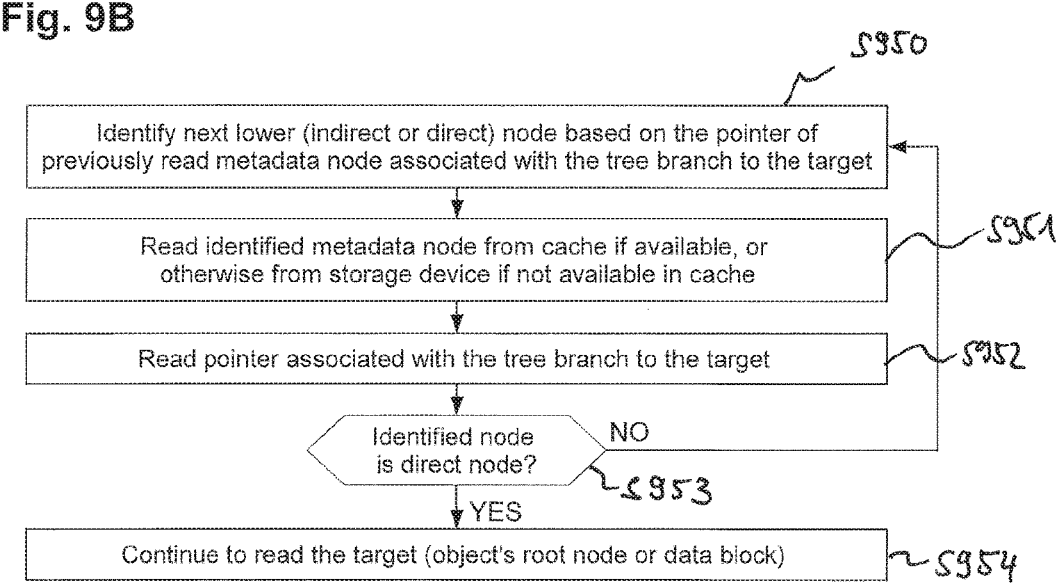

FIG. 9B exemplarily illustrates a flow chart of processing walking down a tree branch of a metadata tree structure according to some exemplary embodiments. This may be applied in steps S903 and/or S905 of the above processing of FIG. 9A.

The process includes (potentially in a loop while walking down the target branch) the step S950 of identifying the next lower (indirect or direct) metadata node based on a pointer of a previously read metadata node associated with the tree branch to the target (e.g. the root node of the target data object or the target data block of the target data object).

The process further includes the step S951 of reading the identified metadata node from cache memory, if available in cache memory (e.g. when the metadata node is a major metadata node systematically held/maintained in cache memory, or in some exemplary embodiments when the metadata node is a minor metadata node that is coincidentally available in the cache memory), or otherwise reading the identified metadata node by random read from the storage device if the metadata node is a minor metadata node that is not available in cache memory. Of course the latter may only occur for the lowest tree levels of minor metadata nodes.

Upon reading the identified metadata node, step S952 reads the node's pointer associated with the target tree branch (leading to the target data object and/or leading to the target block), and if the metadata node identified in step S950 is a direct node (step S953 gives YES), then the process includes step S954 of continuing with reading the target (which is either the target data object's root node or the target data block).

Otherwise, if the metadata node identified in step S950 is not a direct node (step S953 gives NO), then the process repeats step S950 for the next lower metadata node, until step S953 gives YES.

Figure 10:
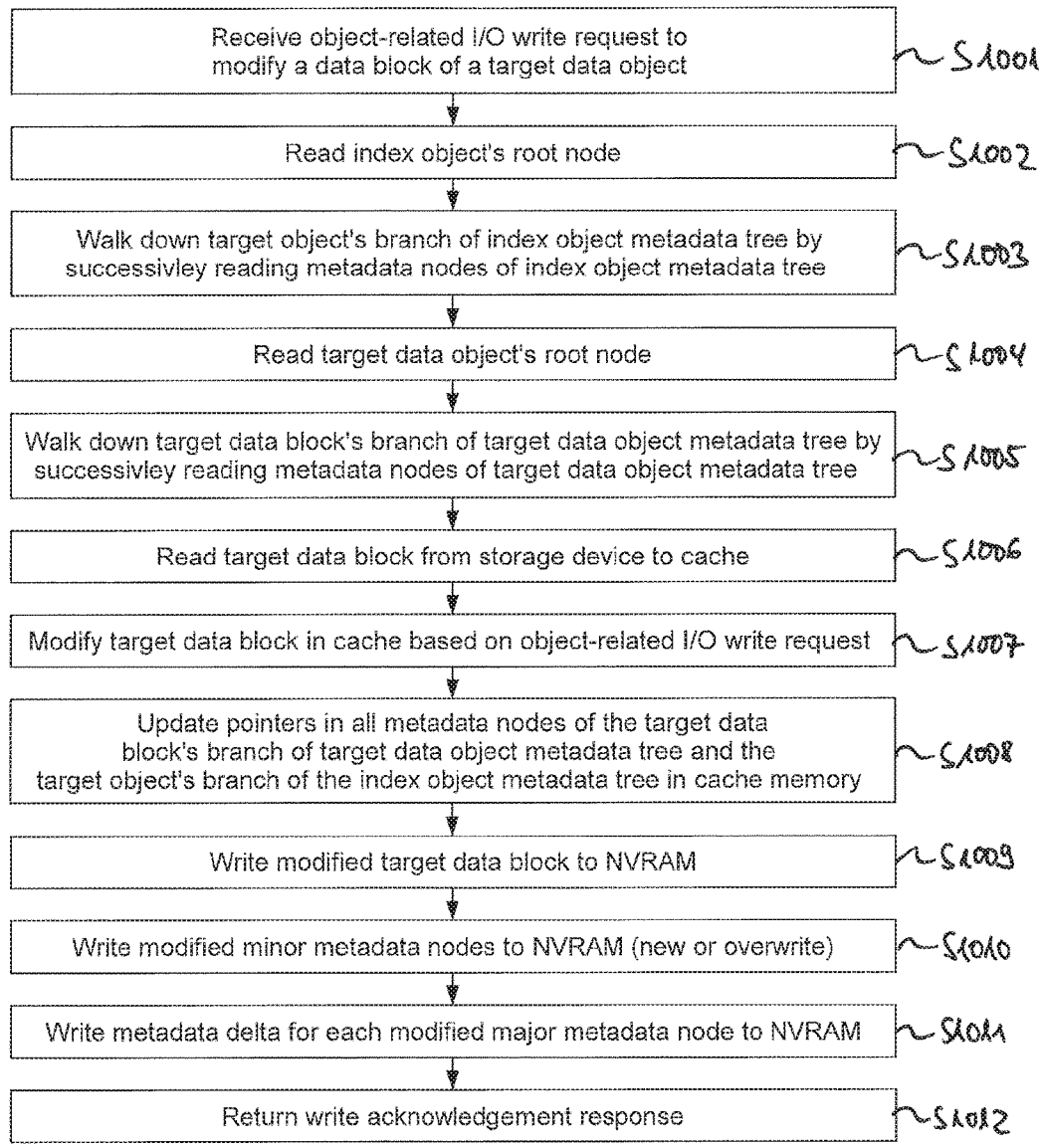
FIG. 10 exemplarily illustrates a flow chart of processing a write request in connection with checkpoint processing according to some exemplary embodiments.

FIG. 10 exemplarily illustrates a flow chart of processing a write request in connection with checkpoint processing according to some exemplary embodiments.

In step S1001, an object-related I/O write request to modify a data block of a target data object is received at the metadata layer (may also be referred to as a modifying request), and, based on an object identifier (e.g. an object number) indicated in the object-related I/O write request, the process may walk down a target branch of the metadata structure of the index object leading to the root node of the respective target data object.

For this purpose, the step S1002 includes reading the root node RN of the index object. By referring to the pointer of the root node RN associated with the target data object, the process successively reads the next lower node of the target branch and refers to its pointer associated with the target data object leading to the next lower node of the target branch until the root node of the target object is identified and can be read.

By this processing, the process performs step S1003 of walking down the target object's branch of the index object metadata tree structure by successively reading the metadata nodes of the target object's branch of the index object metadata tree structure, e.g. exemplarily similar to the process of FIG. 9B.

After reading the respective direct node of the index object metadata tree structure of the target object's branch and referring to its pointer to the root node of the target data object, the process continues with step S1004 to read the target data object's root node RN.

Based on further address information (e.g. a block identifier such as e.g. an offset or a logical block number of the target block) indicated in the object-related I/O read request, the process may walk down a target branch of the metadata structure of the target data object leading to the target block.

For this purpose, the step S1004 includes reading the root node RN of the target data object. By referring to the pointer of the root node RN of the target data object associated with the target block, the process successively reads the next lower node of the target branch and refers to its pointer associated with the target data block leading to the next lower node of the target branch until the direct node pointing to the target block is identified.

By this processing, the process performs step S1005 of walking down the target block's branch of the target data object metadata tree structure by successively reading the metadata nodes of the target branch of the target data object metadata tree structure, e.g. exemplarily similar to the process of FIG. 9B.

After reading the respective direct node of the target object metadata tree structure of the target branch and referring to its pointer to the target data block, the process continues with step S1006 to read the target data block (e.g. by random read) to cache memory, and step S1007 of modifying the target block in cache memory based on the received object-related I/O write request to modify the data block.

By steps S1003 and S1005, preferably all minor nodes have been temporarily loaded to cache memory so that temporarily all metadata nodes of the target branch of the metadata structure (including the systematically maintained major nodes, and the only temporarily loaded minor nodes) are available in cache memory, and the process includes a step S1008 of updating the pointers in all metadata nodes of the target data block's branch of the metadata structure (preferably including nodes of the index object metadata tree and the target object metadata tree), e.g. upon allocating a new block for the modified data block and the allocation of new blocks for the updated metadata nodes.

However, in other exemplary embodiments, the allocation of new blocks for the metadata nodes of the target branch may be performed upon taking the respective checkpoints (see below examples). However, if the blocks for the updated metadata nodes are allocated at the time of step S1008, the blocks for major metadata nodes are preferably allocated in different storage regions than the blocks allocated for minor metadata nodes, to allow for efficient sequential writes for minor metadata nodes and for major metadata nodes, when minor metadata nodes and major metadata nodes are written to the allocated blocks on the storage device(s) at different times based on different checkpoint types (see e.g. major and minor checkpoints in exemplary embodiments below).

In step S1009, the modified target data block is written to the non-volatile memory (e.g. NVRAM, which is preferably mirrored) and the modified (updated) minor metadata nodes are written to the non-volatile memory in step S1010. If the minor nodes are already stored in the non-volatile memory, these are preferably overwritten with the updated modified minor metadata nodes (preferably without allocating new blocks for such minor metadata nodes).

In step S1011, the process continues to write metadata deltas for each updated modified major metadata node to the non-volatile memory. This has the benefit that not the full data of the modified major metadata node (e.g. unit of a block size) needs to be written to the non-volatile memory but only the smaller-sized "delta" needs to be written. Here, since the respective unmodified major metadata node is still stored in the storage device, the respective metadata delta is a smaller sized data unit only describing the currently updated difference between the unmodified major metadata node still stored in the storage device and the respective updated modified major metadata node. In exemplary embodiments, the deltas stored in the non-volatile memory may only be required for recovery purposes.

In step S1012, the process continues to return a write acknowledgement once the updated data (updated data block, updated minor metadata nodes and respective deltas for the updated major metadata nodes) is stored in the non-volatile memory (preferably mirrored in a second non-volatile memory).

However, since the actual write operations to storage devices are not yet performed and at least all of the major metadata nodes were efficiently read from cache memory, since all major metadata nodes are systematically maintained in the cache memory and only minor metadata nodes of the whole large metadata structure may need to be read from storage device(s), such processing allows to significantly reduce read and write amplifications between the metadata layer and the data protection layer (or storage device layer).

V.3 Minor Checkpoint Processing

Figure 11A:
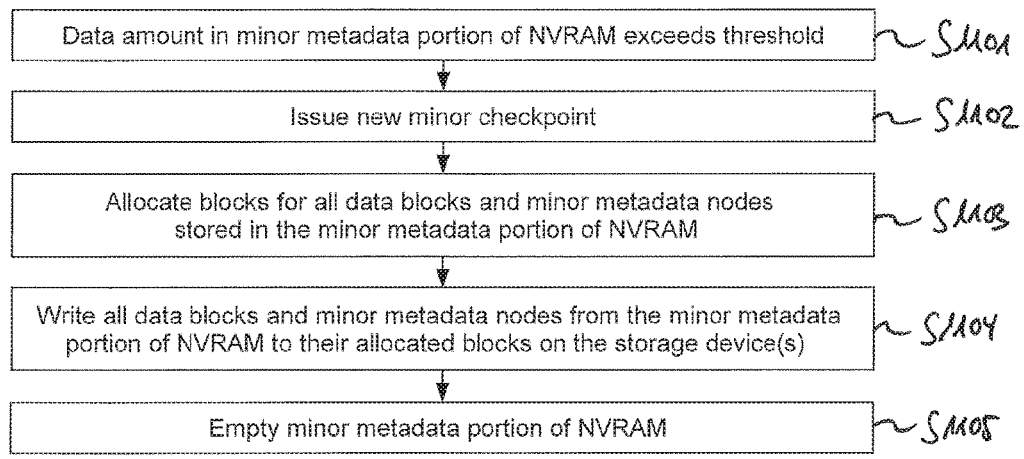
FIG. 11A exemplarily illustrates a flow chart of processing of taking a first-type checkpoint (minor checkpoint) according to some exemplary embodiments, and FIG. 11B exemplarily illustrates a flow chart of processing of taking a second-type checkpoint (major checkpoint) according to some exemplary embodiments.

FIG. 11A exemplarily illustrates a flow chart of processing of taking a first-type checkpoint (minor checkpoint) according to some exemplary embodiments.

As mentioned above, by step S1010, upon write processing (in connection with writing data blocks to new blocks) the respective updated modified minor metadata nodes are stored in the non-volatile memory.

In step S1101 it is checked whether the data amount of updated minor nodes stored in a minor node metadata portion of the non-volatile memory exceed a threshold (e.g. once the capacity of the predetermined size of the minor node metadata portion of the non-volatile memory is used to a predetermined threshold ratio or is fully used, or once the amount exceeds a previously set threshold, which may be configurable).

When the data amount of updated minor nodes stored in the minor node metadata portion of the non-volatile memory exceeds the threshold, a new minor checkpoint is issued in step S1102. This may be including e.g. writing a new incremented minor checkpoint number to minor metadata nodes which will be updated after issuing the new minor checkpoint. The updated minor nodes already stored in the minor node metadata portion of the non-volatile memory may be associated with the previous minor checkpoint number.

Step S1103 then exemplarily allocates blocks for all modified data blocks and updated minor metadata nodes stored in the non-volatile memory (e.g. being associated with the previous minor checkpoint number) in regions of the storage device(s) which are preferably sequentially arranged (or at least allow for one or more sequential writes of updated minor metadata nodes). In alternative exemplary embodiments, the allocation of blocks for the modified data blocks and/or updated minor metadata nodes may also already be performed at the respective times of updating the respective minor metadata nodes and storing them to the non-volatile memory, e.g. in connection with step S1010 above.

In step S1104, all modified data blocks and updated minor metadata nodes of the previous minor checkpoint are written from the minor node metadata portion of the non-volatile memory (or alternatively from cache memory) to the allocated blocks on storage device(s), preferably by sequential writes.

In step S1105, upon writing the data blocks and updated minor metadata nodes of the previous minor checkpoint to storage device(s), the minor node metadata portion of the non-volatile memory may be emptied for new updated minor metadata nodes and modified data blocks of the new minor checkpoint, and the process may repeat monitoring whether the data amount of updated minor nodes stored in the minor node metadata portion of the non-volatile memory exceed the threshold to issue the next new minor checkpoint according to the above steps.

V.4 Major Checkpoint Processing

Figure 11B:
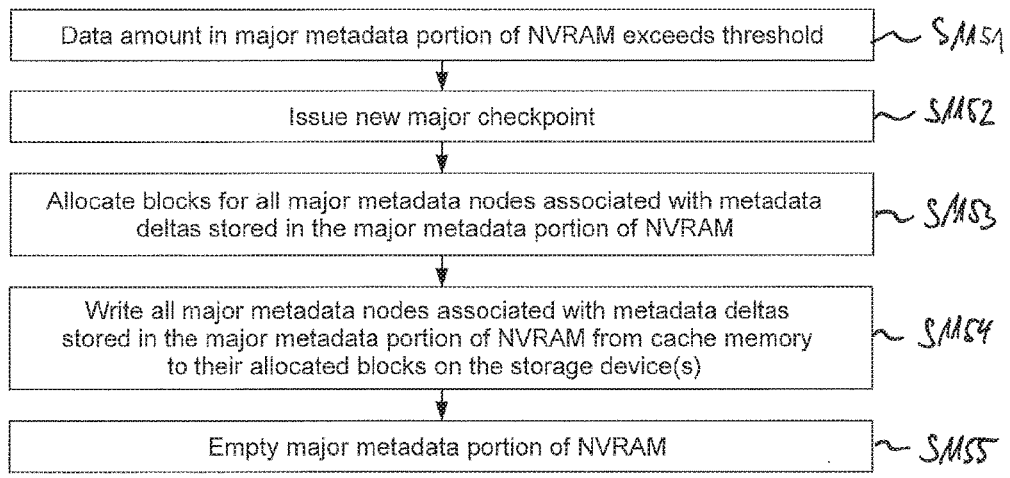

FIG. 11B exemplarily illustrates a flow chart of processing of taking a second-type checkpoint (major checkpoint) according to some exemplary embodiments.

As mentioned above, by step S1011, upon write processing (in connection with writing data blocks to new blocks) the respective deltas of the updated modified major metadata nodes are stored in the non-volatile memory.

In step S1151 it is checked whether the data amount of deltas of updated major nodes stored in a major node metadata portion of the non-volatile memory exceed a threshold (e.g. once the capacity of the predetermined size of the major node metadata portion of the non-volatile memory is used to a predetermined threshold ratio or is fully used, or once the amount exceeds a previously set threshold, which may be configurable).

Here, the benefit may be achieved that the major metadata nodes of the metadata structure are written to storage devices upon a second-type (major) checkpoint less frequent than writing the updated minor metadata nodes and modified data blocks by taking the first-type (minor) checkpoint, and the read and write amplification may be reduced even further by less frequent update of major nodes to storage devices.

According to exemplary embodiments, this may be advantageously achieved by writing the deltas of smaller size for major nodes to the non-volatile memory so that more updates for major nodes can be written to the non-volatile memory before a new major checkpoint is taken.

In other alternative embodiments, or in most preferred exemplary embodiments additionally to the aspect of writing deltas, the threshold of step S1151 may be set larger than the threshold applied in step S1101 for minor checkpoints above, e.g. by providing the major node metadata portion of the non-volatile memory at a larger size than the minor node metadata portion of the non-volatile memory.

By doing so, the benefit of having the minor checkpoints being issued more frequent than the major checkpoints may be achieved by writing the smaller sized deltas for the updated major metadata nodes to the non-volatile memory (e.g. instead of writing the complete data of the updated major metadata nodes) and/or by assigning a larger capacity for the major node metadata portion of the non-volatile memory compared to the smaller capacity of the minor node metadata portion of the non-volatile memory. In the latter case, used as an exemplary alternative, the benefit of having the minor checkpoints being issued more frequent than the major checkpoints may be achieved even if complete updated major metadata nodes were written to non-volatile memory in step S1011.

When the data amount of deltas of updated major nodes stored in the major node metadata portion of the non-volatile memory exceeds the threshold, a new major checkpoint is issued in step S1152. This may be including e.g. writing a new incremented major checkpoint number to major metadata nodes which will be updated after issuing the new major checkpoint. The deltas of the updated major nodes already stored in the major node metadata portion of the non-volatile memory may be associated with the previous major checkpoint number.

Step S1153 then exemplarily allocates blocks for all updated major metadata nodes for which deltas are stored in the non-volatile memory (e.g. being associated with the previous major checkpoint number) in regions of the storage device(s) which are preferably sequentially arranged (or at least allow for one or more sequential writes of updated major metadata nodes). In alternative exemplary embodiments, the allocation of blocks for the updated major metadata nodes may also already be performed at the respective times of updating the respective major metadata nodes and storing their respective deltas to the non-volatile memory, e.g. in connection with step S1011 above.

In step S1154, all updated major metadata nodes of the previous major checkpoint are written from the cache memory to the allocated blocks on storage device(s), preferably by sequential writes. This has the advantage that the deltas do not need to be applied, and these may only be needed for recovery purposes, as explained in further exemplary embodiments below.

In step S1155, upon writing the updated major metadata nodes of the previous major checkpoint to storage device(s), the major node metadata portion of the non-volatile memory may be emptied for deltas of new updated major metadata nodes of the new major checkpoint, and the process may repeat monitoring whether the data amount of deltas of updated major nodes stored in the major node metadata portion of the non-volatile memory exceed the threshold to issue the next new major checkpoint according to the above steps.

V.5 Recovery Processing Based on Major and Minor Checkpoints

Figure 12A:
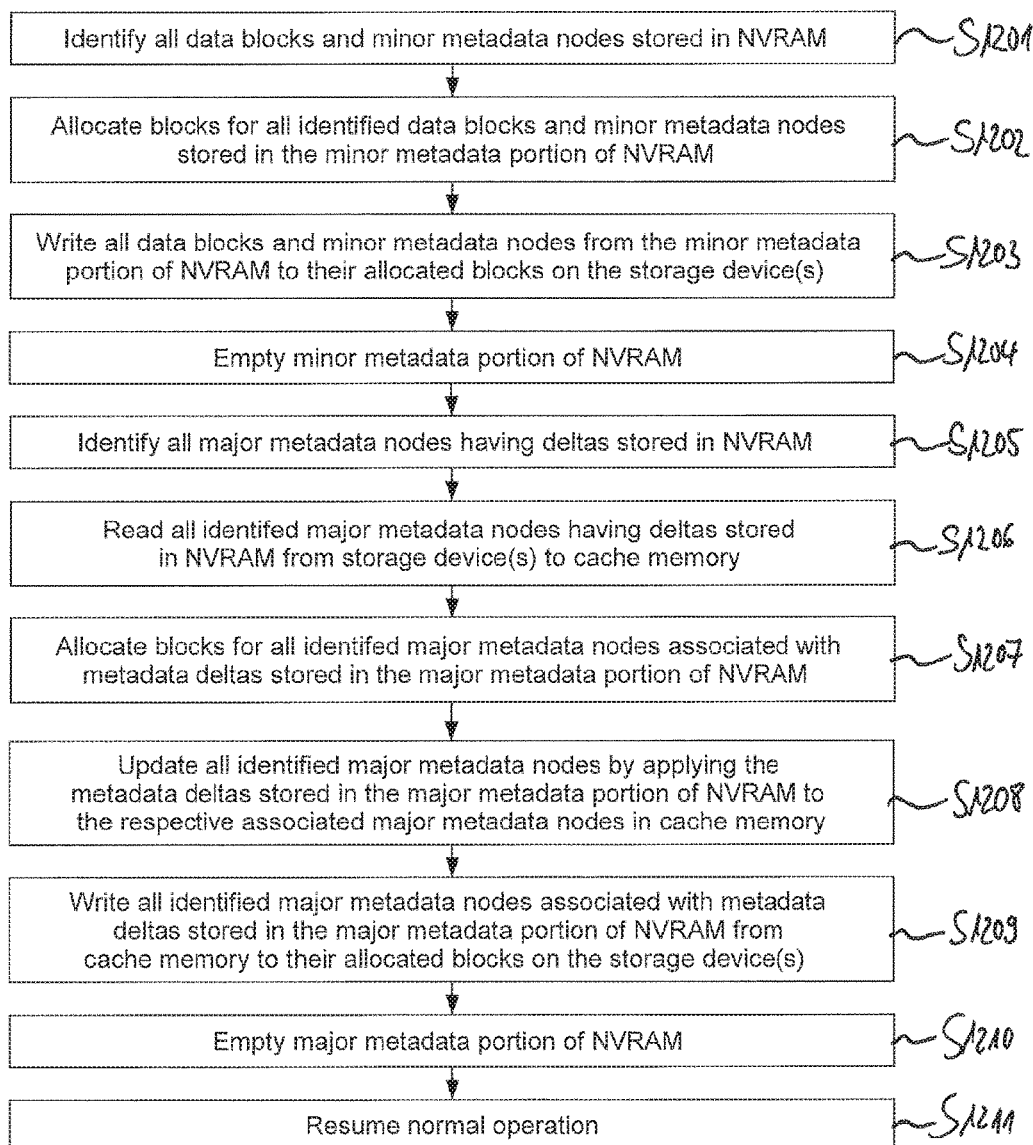
FIG. 12A exemplarily illustrates a flow chart of processing a recovery operation according to some exemplary embodiments, and FIG. 12B exemplarily illustrates a flow chart of processing a recovery operation according to further exemplary embodiments.

FIG. 12A exemplarily illustrates a flow chart of processing a recovery operation according to some exemplary embodiments.

In the process of FIG. 12A, it is assumed that the operation of the data storage apparatus has been interrupted by way of a failure, and the data of the cache memory previously stored is lost or may need to be assumed to be corrupted. Then, based on the recovery processing, normal operation can resume exemplarily after recovery processing.

In step S1201 (e.g. upon restoring the mirrored data from another mirror non-volatile memory, or based on the situation that the non-volatile memory still stores the data of a time prior to the failure as non-volatile type memory), all data blocks and minor metadata nodes stored in the non-volatile memory (e.g. in the minor node metadata portion of the non-volatile memory) are identified.

Upon allocating storage blocks for all identified data blocks and minor metadata nodes stored in the non-volatile memory in step S1202, the data blocks and minor metadata nodes stored in the non-volatile memory are written from the non-volatile memory to the respective allocated blocks on the storage device(s) in step S1203 and the minor node metadata portion of the non-volatile memory is emptied in step S1204.

In step S1205, all major metadata nodes associated with deltas stored in the non-volatile memory (e.g. in the major node metadata portion of the non-volatile memory) are identified and all identified metadata nodes associated with deltas stored in the non-volatile memory are read from storage device (i.e. in the non-updated version) and loaded to cache memory in step S1206.

Alternatively, all major nodes of the metadata tree structure can be loaded into cache, and only the ones for which delta(s) exist are updated based on the respective delta(s) in cache memory. This has the advantage that all major metadata nodes are again maintained systematically in the cache memory for normal operation, e.g. according to exemplary embodiments of subtree caching above.

Upon allocating storage blocks for all identified major metadata nodes for which deltas are stored in the non-volatile memory in step S1207, the (non-updated) major metadata nodes stored in the non-volatile memory are respectively updated by using the respective delta(s) associated with the respective major metadata node to be applied to (non-updated) major metadata nodes to updated the respective major metadata nodes based on the respective delta(s) in step S1208.

Then, the updated major metadata nodes can be written from the cache memory to the respective allocated blocks on the storage device(s) in step S1209 and the major node metadata portion of the non-volatile memory can be emptied in step S1210, and normal operation can resume (step S1211).

Figure 12B:
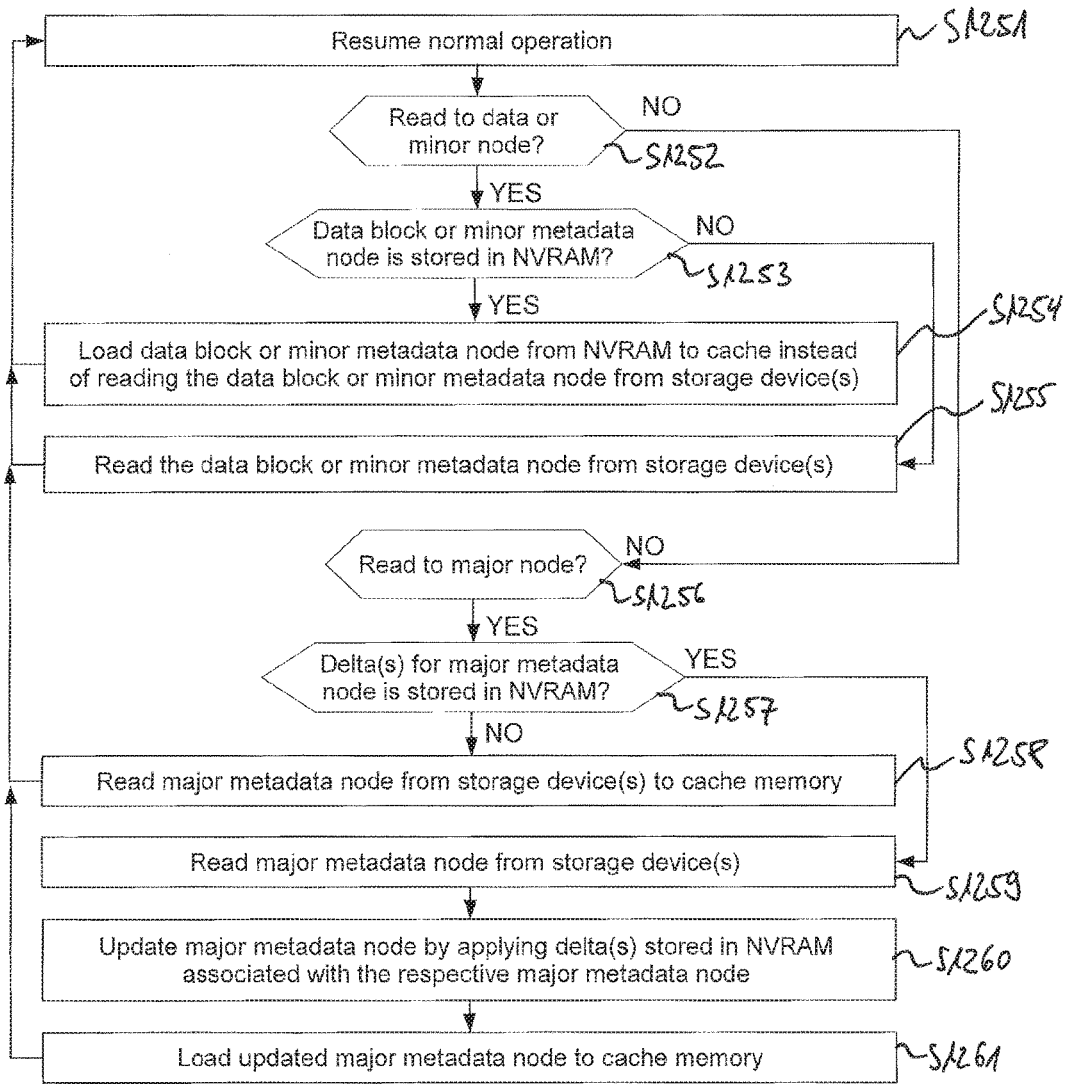

FIG. 12B exemplarily illustrates a flow chart of processing a recovery operation according to further exemplary embodiments. As a difference to FIG. 12A, FIG. 12B is a recovery process that advantageously allows to immediately resume normal operation in step S1251 prior to completing the recovery process, to update metadata nodes from non-volatile memory only when involved in I/O request, i.e. only when needed (preferably accompanied by an additional background process according to some steps of FIG. 12A to update all metadata nodes prior to taking a new major or minor checkpoint, respectively).

In step S1251, normal operation is resumed after a failure.

Then, when a read is issued to a data block or minor metadata node in connection with processing a current I/O request (step S1252 gives YES), it is checked whether a corresponding data block or minor metadata node is stored in the non-volatile memory in step S1253.

If step S1253 gives NO (i.e. the corresponding data block or minor metadata node does not need to be updated), the corresponding data block or minor metadata node is read from storage device in step S1255 (e.g. temporarily to cache memory and for further use in the I/O process as discussed for read/write processing in examples above) and the process proceeds with normal operation; step S1251.

However, if step S1253 gives YES (i.e. the corresponding data block or minor metadata node exists in non-volatile memory as an updated version from before the failure), the corresponding data block or minor metadata node is instead loaded from the non-volatile memory as the updated version in step S1254 (e.g. temporarily to cache memory and for further use in the I/O process as discussed for read/write processing in examples above) and the process proceeds with normal operation; step S1251.

However, when a read is issued to a major metadata node in connection with processing a current I/O request (step S1256 gives YES), it is checked whether a corresponding delta associated with the respective major metadata node is stored in the non-volatile memory in step S1257.

If step S1257 gives NO (i.e. the corresponding major metadata node does not need to be updated), the corresponding major metadata node is read from storage device in step S1258 to be loaded and maintained in cache memory and for further use in the I/O process as discussed for read/write processing in examples above) and the process proceeds with normal operation; step S1251.

However, if step S1257 gives YES (i.e. the corresponding major metadata node has one or more deltas existing in non-volatile memory from before the failure and needs to be updated based on the delta(s)), the corresponding (non-updated) major metadata node is read from storage device in step S1259 and then updated by applying the associated delta(s) loaded from non-volatile memory in step S1260 to obtain the corresponding updated major metadata node based on the associated delta(s), and the updated major metadata node is then loaded and maintained in the cache memory in step S1261 for further use in the I/O process as discussed for read/write processing in examples above, and the process proceeds with normal operation; step S1251.

V.6 Dirty List Information Processing for Major and/or Minor Checkpoints

Figure 13:
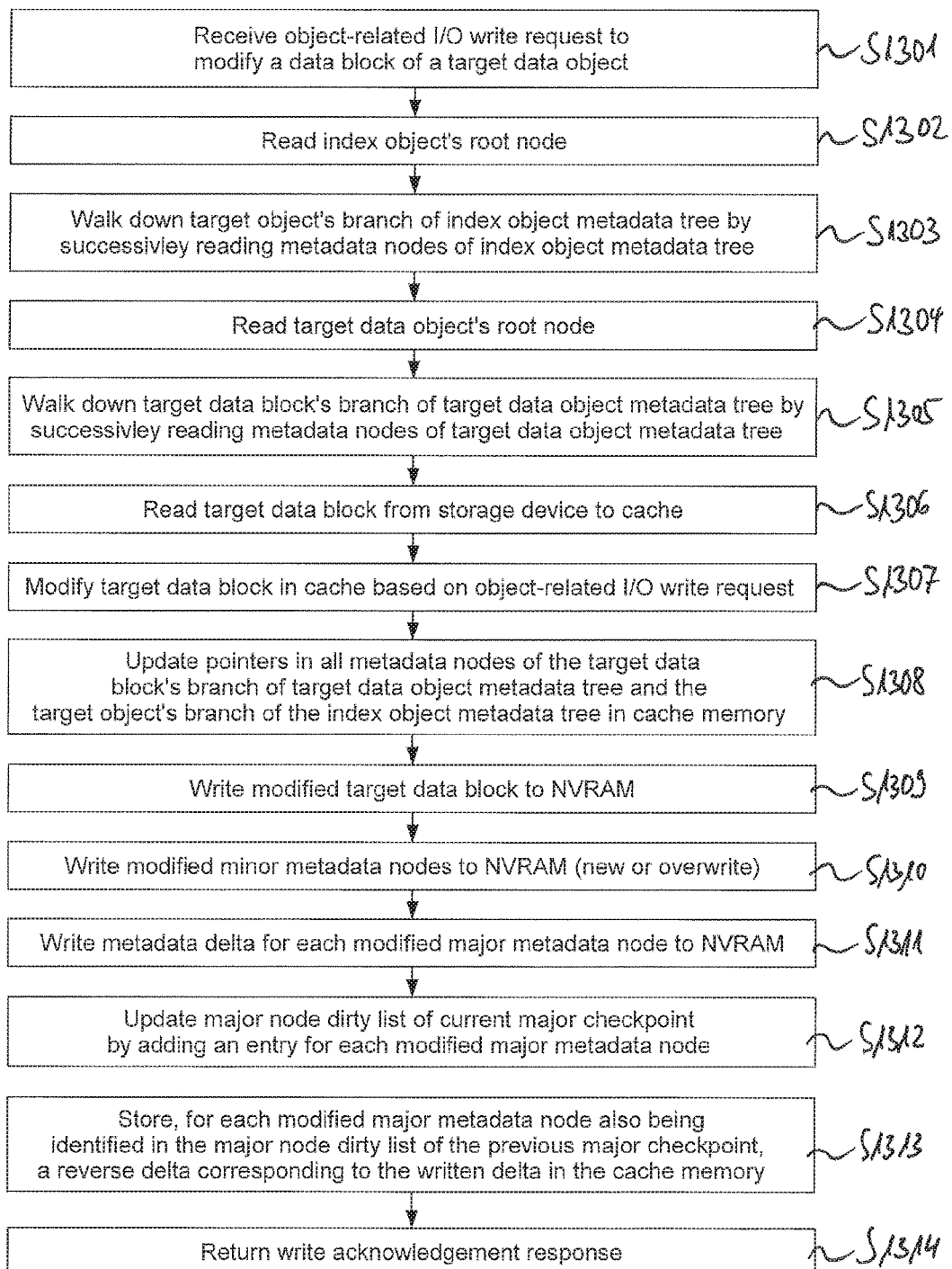
FIG. 13 exemplarily illustrates a flow chart exemplarily illustrates a flow chart of processing a write request in connection with checkpoint processing according to some further exemplary embodiments.

FIG. 13 exemplarily illustrates another flow chart of processing a write request in connection with checkpoint processing according to some further exemplary embodiments, e.g. alternative to FIG. 10 above. Specifically, the steps S1301 to S1311 may be performed similar to steps S1001 to S1011 of FIG. 10 above.

The additional exemplary processing of FIG. 13 allows efficiently continuing handling of I/O requests for a new major checkpoint even when processing writing of major metadata nodes of a previous major checkpoint to the storage device(s).

In an additional step S1312, the process includes updating a major node dirty list of a current major checkpoint by adding an entry for each currently modified major metadata node of step S1308. That is, the process maintains management information indicating dirty major nodes (being major metadata nodes that have been modified in the cache memory but have not yet been written to storage device(s)).

When processing the issuance of a new major checkpoint and writing major nodes dirtied in the last major checkpoint to the storage device(s), the maintained management information such as e.g. a major node dirty list of a then previous major checkpoint may be processed entry by entry.

Accordingly, preferably such management information such as e.g. a major node dirty list maintained for a previous major checkpoint and another major node dirty list maintained for a current major checkpoint. Similar management information can be also maintained for minor metadata nodes such as e.g. a minor node dirty list maintained for a previous minor checkpoint and another minor node dirty list maintained for a current minor checkpoint However, it may occur that a major node is dirtied (updated) again in the new major checkpoint before the major node has been written to storage device(s) for the previous major checkpoint, i.e. when the major node dirty list maintained for a previous major checkpoint still includes an entry for the respective major node and their delta(s) of the previous major checkpoint are still stored in non-volatile memory.

Such situation may be solved by, for example: (1) writing the major node to storage device(s) for the previous major checkpoint and removing the previous associated delta(s), before storing the new delta from the new modification of the current checkpoint to the non-volatile memory (e.g. by writing only the respective major node or by writing also neighboring allocated major nodes in a more efficient sequential write to storage device(s)); or (2) or copying the cached major node to another cache page and modify only one copy in cache for the current major checkpoint as a live version, while the non-modified cache page thereof may be used when writing the respective major node to storage device(s) for the previous checkpoint, which requires more cache capacity.

However, in a most preferable exemplary embodiment, such situation may be solved by storing reverse deltas in cache memory (and/or non-volatile memory) according to the below process.

Hence, the process exemplarily includes a step S1313 of storing, for each updated major metadata node of step S1312 being also still identified in the major node dirty list of the previous major checkpoint, a reverse delta corresponding to the delta written to non-volatile memory in step S1311 in the cache memory (or in non-volatile memory). Such reverse delta may have the same size and format as the previously mentioned delta, only for reversing a corresponding change according to a delta. Accordingly, while applying the corresponding delta(s) to a metadata node results in the updated metadata node, applying the corresponding reverse delta(s) to the updated metadata node would result again in the non-modified metadata node.

In step S11314, the process continues to return a write acknowledgement once the updated data (updated data block, updated minor metadata nodes and respective deltas for the updated major metadata nodes) is stored in the non-volatile memory (preferably mirrored in a second non-volatile memory).

Figure 14:
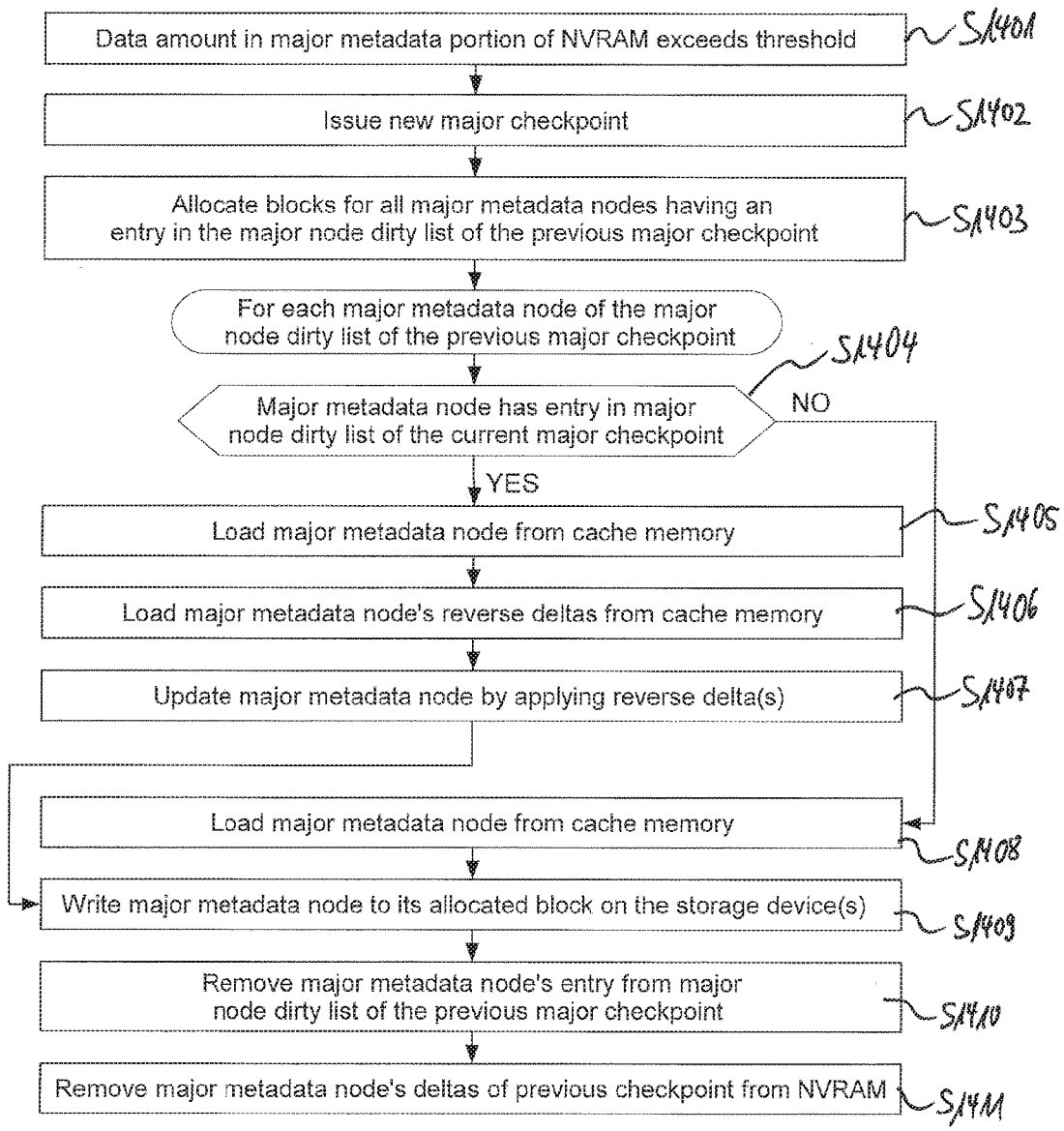
FIG. 14 exemplarily illustrates a flow chart exemplarily illustrates a flow chart of processing a second-type checkpoint (major checkpoint) according to some further exemplary embodiments.

FIG. 14 exemplarily illustrates a flow chart exemplarily illustrates a flow chart of processing a second-type checkpoint (major checkpoint) according to some further exemplary embodiments, exemplarily using management information such as major node dirty lists for the current and previous checkpoint, respectively. Similar processing can be provided also for minor nodes and minor checkpoints.

In step S1401 to S1403 the process may include steps similar to steps S1151 to S1153, wherein step S1403 may be performed based on the entries of the major node dirty list of the previous checkpoint, while a new major node dirty list of the current new checkpoint is maintained upon step S1402.

Then, the following processing may be (successively or in parallel) performed for each major metadata node having an entry in the major node dirty list of the previous checkpoint.

When a major node having an entry in the major node dirty list of the previous checkpoint shall be written to storage device(s), it is checked in step S1404 whether the corresponding major node has an entry in the major node dirty list of the current checkpoint (i.e. whether it has been modified/dirtied again since issuing the new major checkpoint).

If step S1404 gives NO, the corresponding major node can be processed similar to FIG. 11B by loading the corresponding major node from the cache memory in step S1408 and writing the corresponding major node from the cache memory to the respective allocated block on the storage device in step S1409.

Then, the corresponding entry of the corresponding major node can be removed from the major node dirty list of the previous checkpoint in step S1410 and its associated delta(s) in the non-volatile memory may be removed in step S1411.

On the other hand, if step S1404 gives YES, the corresponding major node is loaded from the cache memory in step S1405 (i.e. in the updated version of the current checkpoint) and the corresponding reverse delta(s) are loaded from the cache memory in step S1406, and, in step S1407, the corresponding major node as loaded from the cache memory can be "updated" backwards to the version of the previous major checkpoint by applying the corresponding reverse delta(s) and the "updated" major node according to the version of the previous checkpoint is written to storage device(s) in step S1409.

Then, the corresponding entry of the corresponding major node can be removed from the major node dirty list of the previous checkpoint in step S1410 and its associated delta(s) in the non-volatile memory relating to the previous major checkpoint may be removed in step S1411 (without however removing the delta(s) associated with the new current major checkpoint).

VI. Further Examples Relating to Subtree Caching

VI.1 Read Request Processing Including Subtree Caching

Figure 15A:
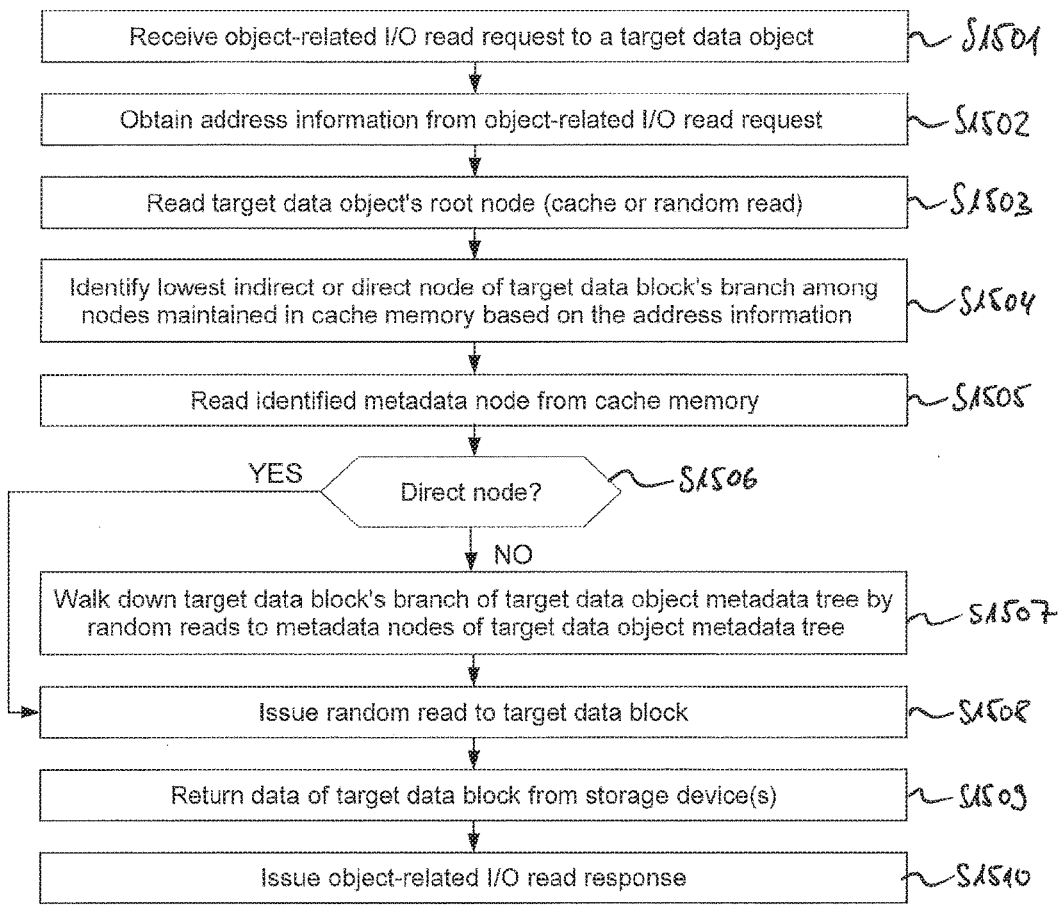
FIG. 15A exemplarily illustrates a flow chart of processing a read request, including metadata subtree caching according to some exemplary embodiments.

FIG. 15A exemplarily illustrates a flow chart of processing a read request, including subtree caching according to further exemplary embodiments.

In step S1501, an object-related I/O read request directed to a data object is received, e.g. at the metadata layer.

In step S1502, address information is obtained from the object-related I/O read request which indicates an address of a data block to be read (e.g. on the basis of a logical block address).

In step S1503, e.g. based on information (such as an object ID or the like) identifying the data object, a root node of a metadata tree structure associated with the data object is identified and the identified root node is read (e.g. from cache, if available in cache, or by random read from storage device(s)).

In step S1504, among the (direct or indirect) nodes stored in the cache memory being related to at least one node level of the metadata tree structure associated with the data object, the (direct or indirect) node of a tree branch related to the data block to be read is identified based on the address information obtained in step S1502.

In step S1505, the identified (direct or indirect) node is read from the cache memory via cache read.

If the identified node is a direct node (i.e. when the direct nodes of the metadata tree structure are stored in cache according to direct node subtree caching) and step S1506 gives YES, based on the pointer to the data block to be read among the pointers of the direct node read from cache memory, the data block to be read is read from storage device(s) via a random read operation from storage device(s) in step S1508, e.g. by issuing a block-related read request to the storage device(s) or the data protection layer.

On the other hand, if the identified node is an indirect node (i.e. when the indirect nodes of the metadata tree structure of one level of indirect nodes are stored in cache according to indirect node subtree caching) and step S1506 gives NO, based on the pointer to the next lower direct or indirect node of the tree branch, which relates to the data block to be read, among the pointers of the indirect node read from cache memory, the process continues with a step S1507 to read the one or more (direct and/or indirect) lower nodes of the tree branch, which relates to the data block to be read, via a random read operation from storage device(s), e.g. by issuing corresponding block-related read requests to the storage device(s) or the data protection layer.

After reading the respective direct node of said tree branch, based on the pointer to the data block to be read among the pointers of the direct node, the data block to be read is read from storage device(s) via a random read operation from storage device(s), e.g. by issuing a block-related read request to the storage device(s) or the data protection layer, in step S1508.

Upon returning the data block to be read via block-related read response and receiving the block-related read response at the metadata layer in step S1509, an object-related I/O read response with the requested data is issued in step S1510 at the metadata layer, e.g. to be returned to the interface/protocol layer for creating a respective response to be returned to a requesting host.

VI.2 Write Request Processing Including Subtree Caching

Figure 15B:
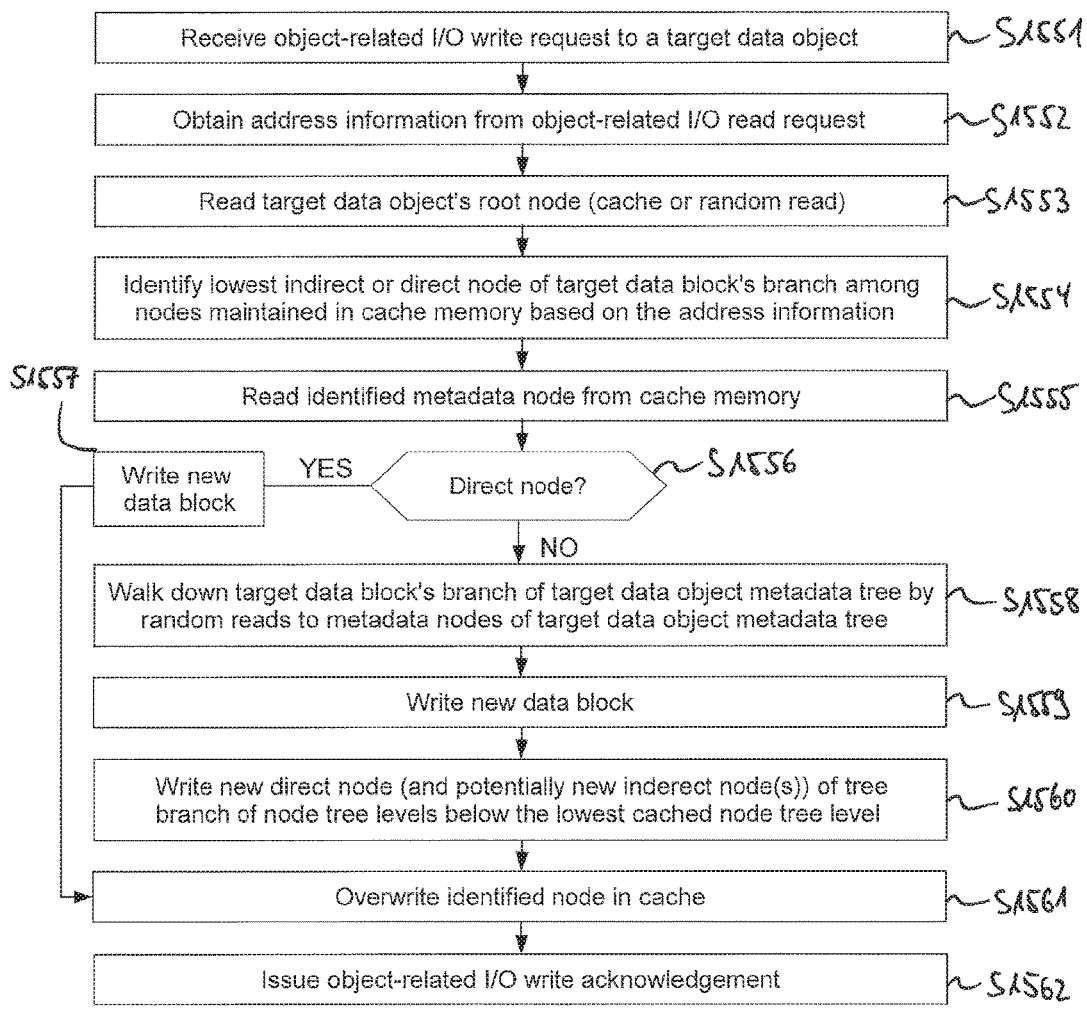
FIG. 15B exemplarily illustrates a flow chart of processing a write request, including metadata subtree caching according to some exemplary embodiments.

FIG. 15B exemplarily illustrates a flow chart of processing a write request, including subtree caching according to further exemplary embodiments.

In step S1551, an object-related I/O write request directed to a data object is received, e.g. at the metadata layer.

Then, steps similar to steps S1502 to S1506 above are performed, steps S1552 to S1556.

In a step S1552, address information is obtained from the object-related I/O write request which indicates an address of a data block to be newly written (e.g. on the basis of a logical block address).

In a step S1553, e.g. based on information (such as an object ID or the like) identifying the data object, a root node of a metadata tree structure associated with the data object is identified and the identified root node is read (e.g. from cache, if available in cache, or by random read from storage device(s)).

In a step S1554, among the (direct or indirect) nodes stored in the cache memory being related to at least one node tree level of the metadata tree structure associated with the data object, the lowest (direct or indirect) node of a target tree branch related to the data block to be newly written is identified based on the obtained address information.

In a step S1555, the identified (direct or indirect) node is read from the cache memory via cache read.

If the identified node is a direct node (i.e. when the direct nodes of the metadata tree structure are stored in cache according to direct node subtree caching) and step S1556 gives YES, the data block is written to a new block address on storage device(s) into a newly allocated and previously free block in step S1557.

Similarly, when step S1556 gives NO, the data block is written to a new block address on storage device(s) into a newly allocated and previously free block in step S1559, however after walking down the target data block's tree branch for node tree levels below the lowest cached node tree level of indirect nodes until reading the direct node from storage device(s) in step S1558.

However, if the identified node of step S1554 is an indirect node (i.e. when the indirect nodes of the metadata tree structure of one or more levels of indirect nodes are stored in cache according to subtree caching) and step S1556 gives NO, the process additionally allocates blocks and newly writes the modified one or more (direct and/or indirect) lower nodes of the tree branch, which relates to the data block to be newly written, via a random write operation(s) to storage device(s) in step S1560, e.g. by issuing corresponding block-related write requests to the storage device(s) or the data protection layer.

Accordingly, for all nodes of the tree branch lower than the identified node in the cache memory, a new node is written to have the updated pointer information leading the tree branch to the newly written data block.

Then, the (direct or indirect) node of the tree branch identified in step S1554 is updated in step S1561 by a respective corresponding cache overwrite to update its pointers to have the updated pointer information leading the tree branch to the newly written data block.

In step S1562, the corresponding object-related I/O write acknowledgement is issued at the metadata layer, e.g. to be returned to the interface/protocol layer.

VI.3 Dynamic Subtree Caching

Figure 16A:
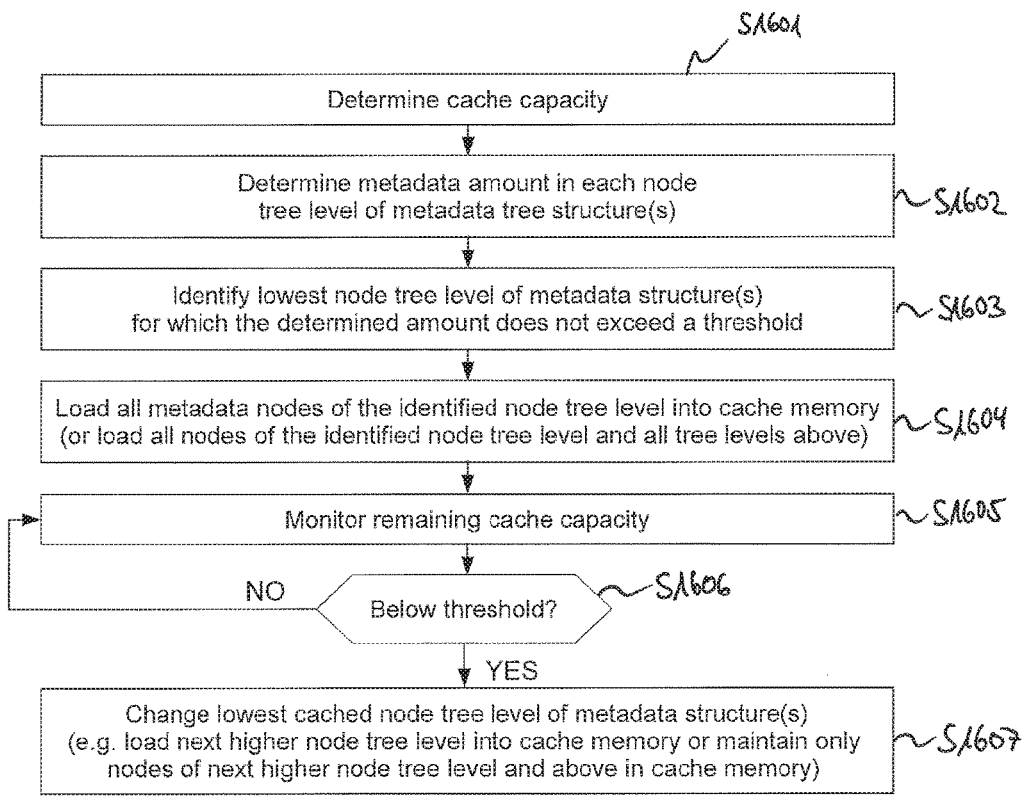
FIG. 16A exemplarily illustrates a flow chart of dynamic metadata subtree caching according to some exemplary embodiments, and FIG. 16B exemplarily illustrates a flow chart of dynamic metadata subtree caching in connection with checkpoint processing according to some further exemplary embodiments.

FIG. 16A exemplarily illustrates a flow chart of dynamic metadata subtree caching according to exemplary embodiments.

In step S1601, a capacity of the cache memory is determined. Specifically, it is determined which portion of cache can be made available for caching of portions of metadata tree structure. This may be calculated based on settings of an administrator adjusting cache resources or cache policies, or the available cache capacity may be set manually by corresponding instruction via a management computer 300.

In step S1602, the metadata amount is determined in one or more or each node tree level of metadata tree structure of one or more data objects. This may be done, for example, by calculating the respective number of (direct or indirect) nodes per each node tree level, if the node size is fixed.

In step S1603, exemplarily based on a threshold (which may be set or be determined based on the cache capacity determined in step S1601), the lowest node tree level of the metadata tree structure of one or more data objects is identified based on the amount(s) determined in step S1602 which does not exceed the threshold.

This may be performed by determining the amounts for each node tree level, or by starting with a lowest node tree level of direct nodes, and calculating step by step the amounts for each next higher node tree level if the previous node tree level was associated with an amount exceeding the threshold.

It should be noted that generally it may be assumed that the amount of data of each node tree level is lower than the amount of data of the next lower node tree level and higher than the amount of data of the next higher node tree level. That is, while it is preferable to store the direct nodes of the lowest node tree level to achieve the most optimal reduction of read and write amplifications, such lowest node tree level also would lead to the large cache memory consumption since the node tree level of the direct nodes generally is likely to have the largest number of nodes.

Once the lowest node tree level of the metadata tree structure of one or more data objects which does not exceed the threshold is identified in step S1603 based on the amount(s) determined in step S1602, the metadata of all (direct or indirect) nodes of this particular identified lowest node tree level of the metadata tree structure, for which the amount does not exceed the threshold, is loaded into the cache memory in step S1604, to be systematically maintained in cache.

In further embodiments, also metadata nodes of some or all node tree levels above the identified node tree level may be loaded into the cache memory in step S1604, to be systematically maintained in cache.

Here, the lowest node level of the metadata tree structure to be loaded into cache memory may be identified globally for all metadata of one or more data objects, or independently for metadata associated with one data object, independently for metadata associated with a group of data objects, or independently for metadata associated with each single data object, or for a complete metadata structure including a metadata structure of an index object and a metadata structure of one or more data objects being pointed to by the metadata structure of the index object.

In step S1605, the remaining cache capacity is monitored to monitor whether the data amount of the cached node level may increase.

If the monitored remaining cache capacity falls below a threshold (which may be set or be determined based on the cache capacity determined in step S1601), the lowest cached node tree level is changed such that a next higher node tree level represents the new lowest cached node tree level of metadata nodes systematically maintained in the cache memory.

For example, nodes of a next higher node level of the metadata tree structure may be loaded into the cache memory (instead of the previously stored lowest node level of the metadata tree structure) to use a lower capacity of the cache memory, and the process may continue again with step S1605.

Alternatively, if the further nodes of upper node tree levels above the previous lowest node tree level of the metadata tree structure have been previously maintained systematically in cache memory, the nodes of the lowest cached node tree level are removed from cache memory (or set as temporarily stored cache data that can be overwritten by other data in cache) so that the nodes of a next higher node tree level represent the new lowest node tree level of the metadata tree structure maintained systematically in cache memory.

Figure 16B:
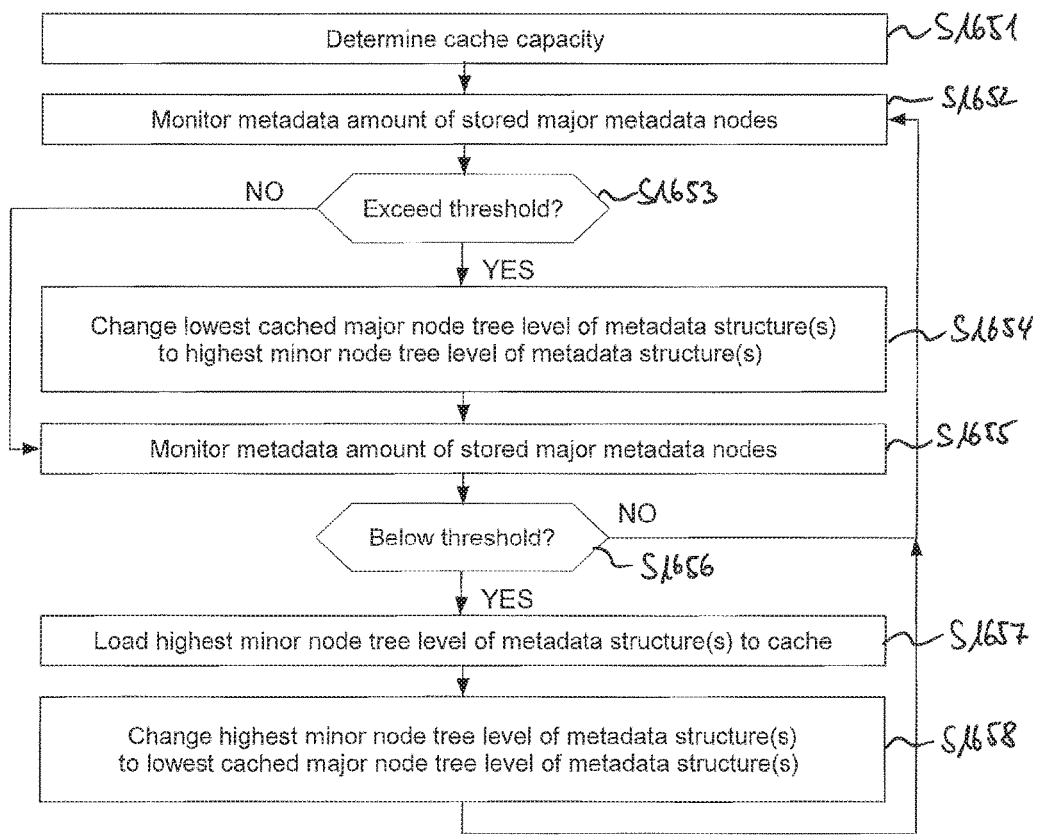

FIG. 16B exemplarily illustrates a flow chart of dynamic metadata subtree caching in connection with checkpoint processing according to some further exemplary embodiments.

In step S1651, a capacity of the cache memory is determined. Specifically, it is determined which portion of cache can be made available for systematic caching of portions of metadata tree structure. This may be calculated based on settings of an administrator adjusting cache resources or cache policies, or the available cache capacity may be set manually by corresponding instruction via a management computer 300.

In step S1652, the metadata amount of major metadata nodes stored in cache memory is determined or monitored.

In step S1653, it is checked whether the metadata amount of major metadata nodes stored in cache memory exceeds a threshold (which may be set based on step S1651 or be pre-set or configurable).

If the step S1653 gives YES, the lowest cached major node tree level of cached major metadata nodes is changed to be the new highest cached minor node tree level of cached minor metadata nodes, to reduce the cache usage of systematically caching the major metadata nodes, e.g. when the available cache capacity for other processes becomes too low. This may be accompanied by taking a minor checkpoint, for writing the new minor metadata nodes of the new highest cached minor node tree level to storage device(s).

In step S1656, it is checked whether the metadata amount of major metadata nodes stored in cache memory falls below a (preferably lower) threshold (which may be set based on step S1651 or be pre-set or configurable).

If step S1656 gives YES, the minor metadata nodes of the highest minor node tree level are read to be loaded into the cache memory (e.g. from storage device(s) by random reads, or from the non-volatile memory if available) in step S1657, and in step S1658 the highest minor node tree level is changed to the new lowest cached major node tree level of cached major metadata nodes, to increase the cache usage of systematically caching the major metadata nodes to improve reduction of write and read amplifications, in view of more efficient usage of free cache capacities.

VII. Lazy Update

VII.1 Free Space Object

As mentioned in the above, when a data block is to be written (e.g. when writing user data into a data block and also when writing a new root, direct or indirect node to the storage device), a previously free storage block needs to be allocated.

For such metadata to be used for allocation, a data object may be managed which indicates which blocks are used or free. Free blocks are blocks that are currently unused and available for allocation in connection with new data writes. A block is used if it includes previously written data (user data or metadata such as e.g. data relating to a root node, an indirect node or a direct node) and the block is referenced by at least one object or node's pointer. The number of pointers pointing to the same block may be referred to as reference count of the respective block. If the reference count is zero, the block can be considered to be free and available for new allocation.

In general, a block being unused and available for (re-)allocation may be referred to as a free block.

The data of such data object, which indicates which blocks are used or free for allocation, may be exemplarily referred to as free space object (FSO) and may be provided, for example, as a bitmap in some exemplary embodiments, and, in general, the data of the free space object may include, for each storage block of (e.g. connected or available) storage device(s), a respective indicator which indicates whether the associated block is in use or free (available for allocation).

In a simple example, a bitmap may be provided in which each bit is associated with one storage block (two bit states per block, i.e. used or free), but in some other exemplary embodiments there may also be provided more than one bit per storage block to provide more detailed information on a status of the block, e.g. further indicating a reference count of the respective block, when in use, and/or indicating whether the block is referenced by a current metadata tree structure and/or previous checkpoint versions of a metadata tree structure.

When the free space object is managed as a data object, a metadata data tree structure according to e.g. FIG. 3A or 7A may also be used for managing the metadata associated with the free space object.

However, when the allocation management information of the free space object is read or written to in connection with data writes and allocation of free blocks for the data writes and freeing now unused blocks to be available for new allocation, this implies that the metadata tree structure associated with the free space object is also read and written so that significant read and write amplifications may occur similar to the read and write amplifications discussed in connection with FIGS. 3B and 3C.

VII.2 Allocation Management Information Update Operations

According to exemplary embodiments, there may be two operations to update the allocation management information of the free space object, e.g. an operation to allocate a new block, e.g. indicating that a previously free block is updated to the status "used", e.g. by changing/updating the respective indicator associated with the respective block from "free" to "used", and an operation to free a block which is not used anymore (e.g. because the data of the block has been newly written to a newly allocated block or the block has been de-duplicated).

According to exemplary embodiments, there may be three or more operations to update the allocation management information of the free space object, e.g. an operation to allocate a new block, e.g. indicating that a previously free block is updated to the status "used", e.g. by changing/updating the respective indicator associated with the respective block from "free" to "used", an operation to increase (increment) a reference count of the block (e.g. when a newly written node has a pointer pointing to the respective block or when another duplicate block has been de-duplicated) and an operation to decrease (decrement) a reference count of the block (e.g. when a node having a pointer pointing to the respective block is deleted, e.g. when data of the block of reference count larger than one has been newly written to a newly allocated block, or the block has been de-duplicated).

In addition, there may be provided an operation to free a block which is not used anymore (e.g. because the data of the block of reference count one has been newly written to a newly allocated block or the block has been de-duplicated), or, alternatively, the decrement operation may be regarded as an operation to free a block, if the decrement operation is performed in connection with a block having reference count one, and will have a reference count zero after the reference count decrement operation.

In general the above operations to update the allocation management information of the free space object which do not allocate a new block may be referred to as "non-allocation update operations" (including e.g. freeing a certain block, decrementing a reference count and/or incrementing a reference count of a certain block), and the operation to update the allocation management information of the free space object that a previously free block is used/allocated may be referred to as "allocation update operation".

Preferably, "allocation update operations" to update the allocation management information of the free space object, when a previously free block is (re-)allocated, are applied to the allocation management information of the free space object at the time of allocation of the respective block to avoid that a block may be allocated twice (or more often).

However, the inventors have considered that non-allocation update operations do not need to be applied to the allocation management information of the free space object at the time of the occurrence but can be delayed to achieve further benefits.

VII.3 Region-Based Accumulation of Update Operations

It is proposed to accumulate non-allocation update operation management information indicating non-allocation update operations to be performed, and to apply the accumulated non-allocation update operations at least for portions of the allocation management information of the free space object by an accumulated update to avoid or at least reduce read and write amplifications in connection with updates of the allocation management information of the free space object.

For such processing, according to some preferred exemplary embodiments, it is proposed that the allocation management information of the free space object is divided into a number of regions, and respective non-allocation update operation management information indicating non-allocation update operations to be performed for blocks of the region of the allocation management information of the free space object may be accumulated for each of the regions.

The accumulation of non-allocation update operation management information may be regarded as being randomly distributed among the complete allocation management information of the free space object.

Figure 17A:
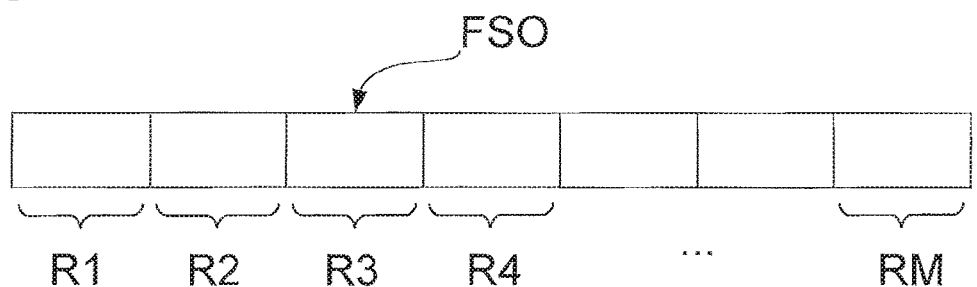
FIGS. 17A to 17C exemplarily shows schematic drawings of allocation management information of the free space object FSO being divided into plural regions accumulating updates to be applied over time, according to some exemplary embodiments.

FIG. 17A exemplarily shows a schematic drawing of allocation management information of the free space object FSO being divided into plural regions R1 to RM.

Whenever a block status is changed (e.g. freeing the block, allocating the block, decrementing a reference count, incrementing a reference count, etc.), an indicator in the allocation management information of the free space object FSO being associated with the respective block shall be updated so that the respective indicator reflects the change of the block status.

Figure 17B:
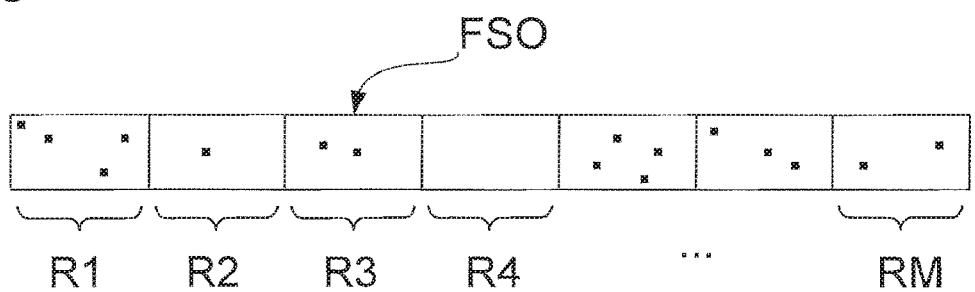
Figure 17C:
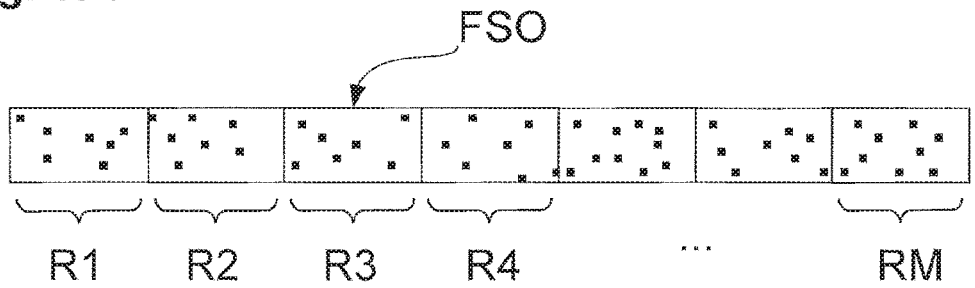

FIG. 17B exemplarily shows a schematic drawing of allocation management information of the free space object FSO of FIG. 17A after a short period of time, and FIG. 17C exemplarily shows a schematic drawing of allocation management information of the free space object FSO of FIG. 17A after a longer period of time.

In the regions R1 to RM, each of the accumulating blocks shall exemplarily represent an indicator to be updated in the allocation management information based on a change of an associated block.

As can be seen, since such updates in connection with status changes of blocks in the allocation management information of the free space object FSO relate to plural random reads and random writes to storage devices, the different regions R1 to RM will likely accumulate updates to be applied randomly in a random distributed manner across the regions R1 to RM of the allocation management information of the free space object FSO.

Accumulating updates to be applied in the allocation management information of the free space object FSO may be performed by managing, for each region, a respective non-allocation update operation management information such as an update operation list per region.

VII.4 Update Operation Management Information

In some exemplary embodiments, non-allocation update operation management information can be realized as update operation lists provided per region.

Figure 18A:
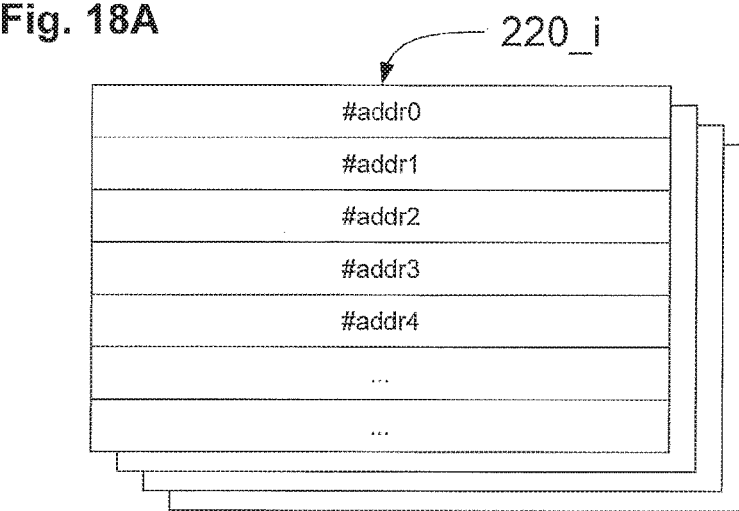
FIGS. 18A to 18C exemplarily illustrate examples of update management information according to exemplary embodiments.

In a simple example, when the status of blocks is changed only between "free" and "used" and back, the non-allocation update operation management information may be exemplarily provided as an update operation list 220_i per region R_i, wherein each update operation list 220_i may indicate logical block addresses of blocks of the particular region which need to be freed, as exemplarily shown in FIG. 18A. The logical block address may also be give as block number in some exemplary embodiments.

Then, for each region, the respective non-allocation update operation management information for the respective region, exemplarily indicates accumulated logical block addresses of blocks to be freed, i.e. of blocks for which the status can be changed to "free" in the respective region of the allocation management information of the free space object FSO.

When such update operation list 220_i indicates plural blocks in the region R_i for which the update operation shall be applied to the allocation management information of the free space object FSO, instead of individually and randomly applying such update operations, then the respective region R_i of the allocation management information of the free space object FSO can be updated for the plural blocks indicated in the update operation list 220_i, thereby significantly reducing write and read amplifications.

In another example, when the status of blocks is changed by incrementing and/or decrementing reference counts (e.g. a block being freed when the reference count is decremented to zero), the non-allocation update operation management information may be exemplarily provided as an update operation list 420_i per region R_i, wherein each update operation list 420_i may indicate logical block addresses of blocks of the particular region which need to be updated in the allocation management information of the free space object FSO by incrementing or decrementing their respective reference count.

Figure 18B:
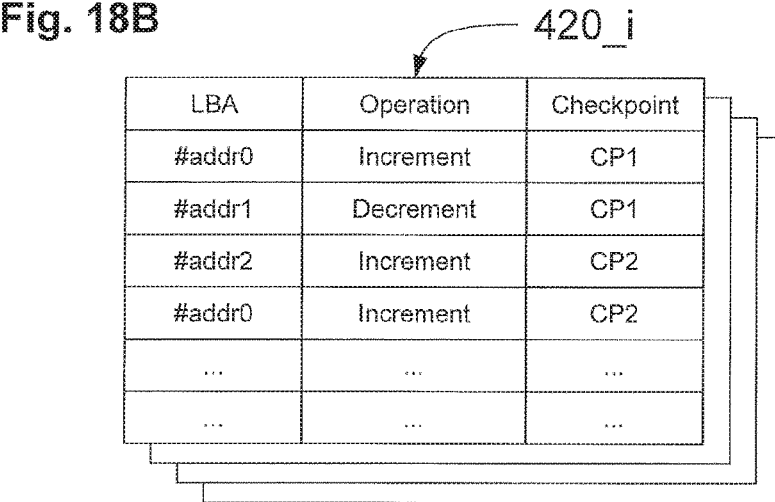

The update operation list 420_i may further indicate the respective update operation to be performed, e.g. either to decrement or increment the reference count associated with the respective block, and, additionally, the update operation list 420_i may further indicate a respective checkpoint number indicating a checkpoint (e.g. a checkpoint of a managed associated file system or other data structure stored on the storage devices), as exemplarily shown in FIG. 18B. Such checkpoint numbers may also be indicated additionally in the update operation list 220_i of FIG. 12A in the simple example in which blocks are only considered "free" or "used".

Preferably, when freeing blocks (update operation of decrementing the reference count to zero), the block should preferably not reused (e.g. by re-allocation) during the same checkpoint, and so the update operation to update a status of a block to "free" may be applied only for blocks for which the checkpoint number indicated in the update operation list 420_i is smaller than a current checkpoint number. This may include minor and/or major checkpoint numbers.

For each region, the respective non-allocation update operation management information for the respective region, exemplarily indicates accumulated logical block addresses of blocks for which update operations need to be performed, i.e. of blocks for which the respective reference count needs to be decremented or incremented in the respective region of the allocation management information of the free space object FSO.

When such update operation list 420_i indicates plural blocks in the region R_i for which the update operation shall be applied to the allocation management information of the free space object FSO, instead of individually and randomly applying such update operations, then the respective region R_i of the allocation management information of the free space object FSO can be updated for the plural blocks indicated in the update operation list 420_i according to the respective indicated update operation, thereby significantly reducing write and read amplifications.

In the above, the entries in the respective update operation lists may exemplarily be not indexed per block, and so the same block address may be indicated multiple times in the same update operation list, e.g. in connection with incrementing and/or decrementing the reference count more than once.

Figure 18C:
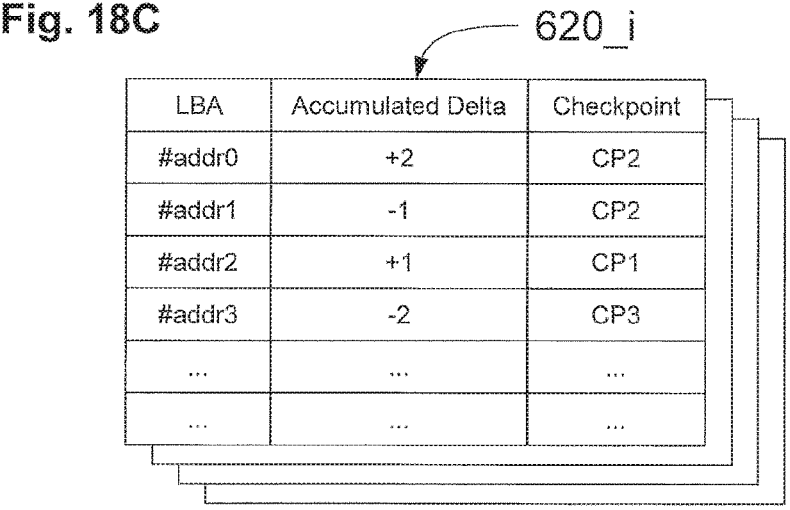

In further exemplary embodiments, the update operation list 620_i per region R_i may also be indexed per block, as exemplarily shown in FIG. 18C. In the update operation list 620_i, the logical block address (or block number) of the blocks which need status change are identified exemplarily together with a checkpoint number of the last status change, similar to FIG. 18B.

However, instead of indicating the update operation "increment" or "decrement", the update operation list 620_i indicates a delta number of accumulated reference count changes, to indicate, whether the reference count is increased or decreased, and by which amount the reference count is to be changed, when applying the update. For example, if the block indicator of the allocation management information of the free space object FSO is to be updated after accumulating n "decrement" operations and m "increment" operations, the reference count of the block is to be updated by changing the reference count by the accumulated delta number m-n.

VII.5 Update List Management

Figure 19:
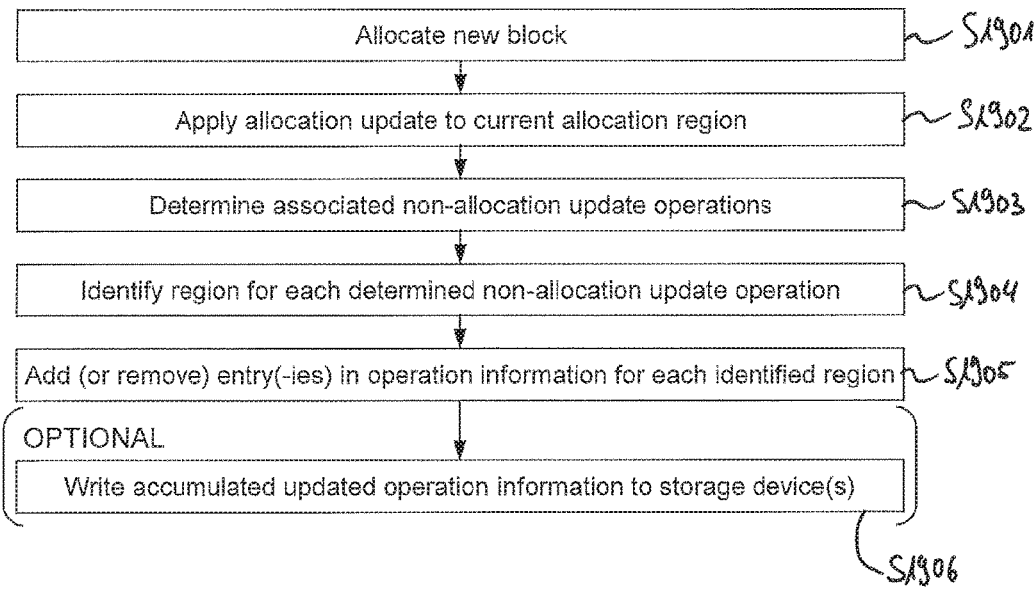
FIG. 19 exemplarily illustrates a flow chart of efficient allocation information management according to exemplary embodiments.

FIG. 19 exemplarily illustrates a flow chart of efficient allocation information management according to exemplary embodiments.

In step S1901, a new block is allocated (e.g. when a new block of user data is written or when a new node such as a root node, indirect node or direct node is written).

Preferably the allocation management information is immediately updated in step S1902 to change the status of the respective block from "free" to "used" (including e.g. to increment the reference count from zero to one), in order to avoid that the block is allocated again for another write.

This may be done by applying the allocation update to the allocation management information of the free space object FSO on disk or on storage device(s). Alternatively, a current region from which the blocks are currently allocated (e.g. a current region in which the allocation cursor is currently positioned) may be loaded into cache during allocation of blocks in the current region, and updates indicating allocation of blocks are applied to the region in cache (e.g. by cache overwrite), thereby avoiding read and write amplifications in connection with allocation updates to the allocation management information.

When the allocation cursor moves to another region, or when the blocks are allocated from another region, the other region can be loaded to cache and the previous region can be sequentially written based on the updated region from cache (having all allocation updates being applied thereto).

However, as mentioned above, non-allocation updates (such as freeing other blocks, incrementing and/or decrementing reference counts of other blocks) may be required subsequently by such allocation of a new block, and in step S1903, such associated non-allocation update operations are determined but not applied directly.

For example, when data of a block is to be modified, the data block is written to a new block location (i.e. a new block is allocated) but the reference count of the previous block may be decremented by one, or the block may be freed. Also, storage blocks storing nodes of the metadata tree may need to be freed or the reference count thereof may need to be decreased. Step S1903 identifies such related non-allocation updates (such as freeing other blocks, incrementing and/or decrementing reference counts of other blocks).

In step S1904, for each of the identified/determined related non-allocation update operation, it is determined in which region of the allocation management information of the free space object FSO the respective non-allocation update operation is to be applied, and the respective regions are identified, e.g. based on logical block addresses and/or block numbers.

In step S1905, for each non-allocation update operation determined in step S1903, the respective update operation is indicated in an entry (e.g. by adding an entry, e.g. according to FIG. 18A or 18B, or by modifying a pre-existing entry, e.g. according to FIG. 18C) of the non-allocation update operation management information associated with the respective region.

By doing so, update operation information of updates to be applied to each of the regions is accumulated in the respective non-allocation update operation management information associated with the respective regions.

In the above, the non-allocation update operation management information associated with the respective region may be held in cache memory.

In some further embodiments, the non-allocation update operation management information associated with the respective region may in addition or alternatively be written to an storage device, e.g. in an optional step S1906, e.g. to save cache capacity and further delay applying the non-allocation update operations in the free space object as stored on storage device(s).

In some embodiments, in order to avoid or further reduce read and write amplifications, new entries of non-allocation update operation management information associated with the respective region may be held in cache until a certain predetermined number of new entries is accumulated and/or until a certain predetermined amount of data of new entries is accumulated, and then the accumulated new entries may be written to the non-allocation update operation management information associated with the respective region as held on the internal storage device such as an internal disk or an internal flash module.

For example, when a certain predetermined number of new entries is accumulated and/or until a certain predetermined amount of data of new entries is accumulated for a certain region such that the data corresponds to an integer multiple of a block size of the internal storage device, the accumulated new entries may be written to the non-allocation update operation management information associated with the respective region as held on the internal storage device efficiently.

VII.6 Applying Update Operations to a Region

Figure 20:
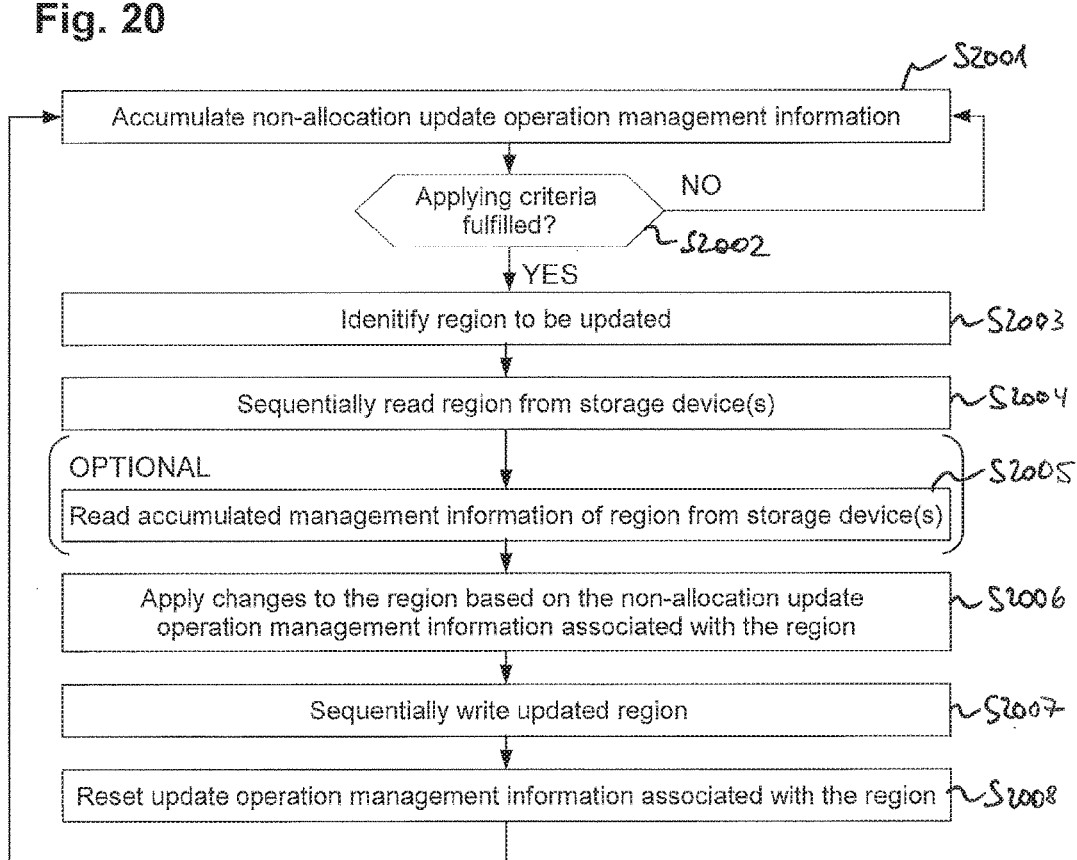
FIG. 20 exemplarily shows a flow chart of a process applying update operations to a region according to some exemplary embodiments.

FIG. 20 exemplarily shows a flow chart of a process applying update operations to a region.

In step S2001, update operation entries are accumulated in update operation management information associated with the respective regions, e.g. according to FIG. 19.

In step S2002, it is checked whether an applying criteria is fulfilled to apply the accumulated update operation entries for one or more regions. Such applying criteria can be provided in multiple ways.

For example, the number of entries and/or the number of accumulated update operation entries in update operation management information per region may be monitored, and when the number of entries and/or the number of accumulated update operation entries in update operation management information exceed a threshold, the accumulated update operations of the respective region can be applied. Then, the applying criteria is fulfilled when the number of entries and/or the number of accumulated update operation entries in update operation management information exceed a threshold for at least one region.

Also, in addition or alternatively, the applying criteria may involve a periodic update such that the applying criteria is fulfilled whenever a periodic time to update expires, and at that time, the one or more regions being associated with the highest number of entries and/or the highest number of accumulated update operation entries in update operation management information are selected to be updated.

Also, in addition or alternatively, the applying criteria may involve a check of an amount of available free blocks that can be used for allocation according to the allocation management information of the free space object FSO, and when the amount of available free blocks falls below a threshold, one or more regions of the allocation management information are updated, e.g. until the amount of free blocks that can be used for allocation according to the allocation management information of the free space object FSO is sufficiently increased, e.g. until the amount of free blocks exceeds a second threshold. Again, at that time, the one or more regions being associated with the highest number of entries and/or the highest number of accumulated update operation entries in update operation management information can be selected to be updated.

In step S2003, when the applying criteria is met (step S2002 gives YES), the one or more regions to be updated can be selected or identified. For example, the one or more regions being associated with the highest number of entries and/or the highest number of accumulated update operation entries in update operation management information can be selected to be updated.

That is, in step S2003 the one or more regions of the free space object to be updated is identified.

In step S2004, the data of the selected region(s) of the allocation management information of the free space object FSO is read by sequential read from storage device(s). By doing so, read and write amplifications can be advantageously avoided or at least be significantly reduced in connection with updates of the allocation management information of the free space object FSO. For example, the data of the selected region(s) can be loaded into cache.

Optionally, in exemplary embodiments which perform the optional step S1906 above, the update operation management information for the respective selected region(s) can be read from storage device(s) in the optional step S2005.

Otherwise, the update operation management information for the respective selected region(s) will be available in cache memory.

In step S2006, based on the accumulated update operation entries in update operation management information for the respective selected region(s), the data of the selected region(s) is updated (e.g. the update operations are applied) according to the entries of non-allocation update operations associated with the region obtained from the respective update operation management information. By doing so, read and write amplifications can be advantageously avoided or at least be significantly reduced in connection with updates of the allocation management information of the free space object FSO.

Upon updating the data of the selected region(s), the updated data of the selected region(s) is written as sequential write to storage device(s) in step S2007. By doing so, read and write amplifications can be advantageously avoided or at least be significantly reduced in connection with updates of the allocation management information of the free space object FSO.

In step S2008, the respective update operation management information for the selected region(s) is reset (e.g. to remove all entries of executed update operations to avoid that such update operations are redundantly repeated when the same region is updated next time).

As will be appreciated by one of skill in the art, the present invention and aspects and exemplary embodiments, as described hereinabove and in connection with the accompanying figures, may be embodied as a method (e.g., a computer-implemented process, a business process, or any other process), apparatus (including a device, machine, system, computer program product, and/or any other apparatus), or a combination of the foregoing.

Accordingly, exemplary embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, generate means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages generated, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

The invention claimed is:

1. A non-transitory computer readable storage medium storing a computer program including instructions to cause a computer to execute a method for managing a data storage system, the method comprising:
    managing a metadata tree structure for storing data to one or more storage devices of the data storage system in units of blocks, the metadata tree structure including a root node pointing directly or indirectly to blocks, and a leaf tree level having one or more direct nodes pointing to blocks, and including one or more intermediate tree levels having one or more indirect nodes pointing to indirect nodes or direct nodes of the metadata tree structure;
    performing caching of nodes of the metadata structure on the basis of the tree level, wherein the caching on the basis of the tree level includes systematically maintaining the root node in a cache memory and further includes systematically maintaining nodes of at least one first tree level of the metadata structure in the cache memory, wherein other nodes of the metadata structure, including nodes of at least one second tree level of the metadata structure, are stored to the one or more storage devices to be temporarily loaded to the cache memory upon being required for managing I/O access to data based on the metadata structure; and
    managing I/O access to data based on the metadata structure, including obtaining the root node and one or more nodes of the at least one first tree level of the metadata structure systematically maintained in the cache memory from the cache memory and obtaining one or more nodes of the at least one second tree level of the metadata structure from the one or more storage devices,
    wherein nodes of a first group associated with one or more lowest tree levels of the metadata structure, including at least a tree level of direct nodes, are temporarily loaded to the cache memory when required for managing the I/O access to data based on the metadata structure, and nodes of a second group associated with one or more higher tree levels above the one or more lowest tree levels in the metadata structure are systematically maintained in the cache memory—independently of a frequency of the I/O access to data, each of the nodes of the first group being different from each of the nodes of the second group, —and
    wherein the managing of the I/O access to data includes determining nodes of the first group, loading the nodes of the first group from the one or more storage devices and accessing to data based on the nodes of the first group loaded from the one or more storage devices and—accessing to data based on the—nodes of the second group—which are already—systematically maintained in the cache memory.

2. The non-transitory computer readable storage medium according to claim 1, wherein
    writing modified nodes of the first group to the one or more storage devices is controlled on the basis of taking a first-type of checkpoint, and writing modified nodes of the second group to the one or more storage devices is controlled on the basis of taking a second-type of checkpoint.

3. The non-transitory computer readable storage medium according to claim 1, wherein
    taking a new first-type checkpoint and writing nodes of the first group which have been modified in a previous first-type checkpoint to the one or more storage devices, is performed more frequently than taking a new second-type checkpoint and writing nodes of the second group which have been modified in a previous second-type checkpoint to the one or more storage devices.

4. The non-transitory computer readable storage medium according to claim 1, wherein
    modifying one or more nodes of the first group includes writing the one or more modified nodes to a non-volatile memory, and modifying one or more nodes of the second group includes writing respective delta data for each of the one or more modified nodes to the non-volatile memory, each respective delta data being indicative of a difference between the respective modified node of the second group as stored in the cache memory and the respective non-modified node as stored on the one or more storage devices.

5. The non-transitory computer readable storage medium according to claim 4, wherein
    the size of a delta data unit is smaller than a size of an associated node.

6. The non-transitory computer readable storage medium according to claim 4, wherein
    taking a new first-type checkpoint is performed when an amount of data of nodes of the first group in the non-volatile memory exceeds a first threshold, and
    taking a new second-type checkpoint is performed when an amount of delta data associated with nodes of the second group in the non-volatile memory exceeds a second threshold.

7. The non-transitory computer readable storage medium according to claim 6, wherein
    the second threshold is larger than the first threshold.

8. The non-transitory computer readable storage medium according to claim 4, wherein, when performing a recovery operation, recovering a previously modified node of the first group includes reading the modified node of the first group from the non-volatile memory, and recovering a previously modified node of the second group includes reading the corresponding non-modified node from the one or more storage devices, reading corresponding delta data from the non-volatile memory, and modifying the non-modified node based on the corresponding delta data.

9. The non-transitory computer readable storage medium according to claim 4, the method further comprising:
changing a highest node tree level of the nodes of the first group to become a new lowest node tree level of the nodes of the second group based on monitoring a cache capacity, in particular if a data amount of nodes of the second group falls below a third threshold, and
changing a lowest node tree level of the nodes of the second group to become a new highest node tree level of the nodes of the first group based on monitoring a cache capacity, in particular if a data amount of nodes of the second group exceeds a fourth threshold.

10. The non-transitory computer readable storage medium according to claim 4, wherein,
when modifying a node of the second group associated with a new second-type checkpoint before a respective corresponding modified node of the second group associated with a previous second-type checkpoint is written to the one or more storage devices, the respective modified node of the second group associated with the new second-type checkpoint and corresponding reverse delta data is stored in the cache memory, the corresponding reverse delta data being indicative of a difference between the respective modified node of the second group as stored in the cache memory and the respective corresponding modified node of the second group associated the previous second-type checkpoint.

11. The non-transitory computer readable storage medium according claim 10, wherein,
writing the respective corresponding modified node of the second group associated with the previous second-type checkpoint to the one or more storage devices includes modifying the respective modified node of the second group as stored in the cache memory based on the corresponding reverse delta data as stored in the cache memory.

12. A method for managing a data storage system, comprising:
managing a metadata tree structure for storing data to one or more storage devices of the data storage system in units of blocks,
the metadata tree structure including a root node pointing directly or indirectly to blocks, and a leaf tree level having one or more direct nodes pointing to blocks, and including one or more intermediate tree levels having one or more indirect nodes pointing to indirect nodes or direct nodes of the metadata tree structure;
performing caching of nodes of the metadata structure on the basis of the tree level, wherein the caching includes maintaining the root node and nodes of at least one tree level of each of the metadata structure in a cache memory; and
managing I/O access to data based on the metadata structure, including obtaining the root node and nodes of the at least one tree level of the metadata structure maintained in the cache memory from the cache memory and obtaining at least one node of another tree level of the metadata structure, other than the at least one tree level of the metadata structure maintained in the cache memory, from the one or more storage devices,
wherein nodes of a first group associated with one or more lowest tree levels of the metadata structure, including at least a tree level of direct nodes, are temporarily loaded to the cache memory when required for managing the I/O access to data based on the metadata structure, and nodes of a second group associated with one or more higher tree levels above the one or more lowest tree levels in the metadata structure are systematically maintained in the cache memory—independently of a frequency of the I/O access to data, each of the nodes of the first group being different from each of the nodes of the second group, —and
wherein the managing of the I/O access to data includes determining nodes of the first group, loading the nodes of the first group from the one or more storage devices and accessing to data based on the nodes of the first group loaded from the one or more storage devices and—accessing to data based on the—nodes of the second group—which are already—systematically maintained in the cache memory.

13. The method according to claim 12, wherein
the root node and nodes of at least one tree level of the metadata structure are systematically maintained in the cache memory for managing the I/O access to data based on the metadata structures, and
the at least one node of another tree level of the metadata structure is temporarily loaded to the cache memory when required for managing the I/O access to data based on the metadata structures.

14. The method according to claim 12, further comprising:
controlling writing modified nodes of the first group to the one or more storage devices on the basis of taking a first-type of checkpoint, and controlling writing modified nodes of the second group to the one or more storage devices on the basis of taking a second-type of checkpoint.

15. A data storage system connectable to one or more client computers, comprising:
a processing unit including a processor or a programmable logic device;
a cache memory; and
one or more storage devices and an interface to communicably connect with one or more storage devices;
the processing unit being adapted to execute:
managing a metadata tree structure for storing data to the one or more storage devices in units of blocks, the metadata tree structure including a root node pointing directly or indirectly to blocks, and a leaf tree level having one or more direct nodes pointing to blocks, and including one or more intermediate tree levels having one or more indirect nodes pointing to indirect nodes or direct nodes of the metadata tree structure;
performing caching of nodes of the metadata structure on the basis of the tree level, wherein the caching includes maintaining the root node and nodes of at least one tree level of each of the metadata structure in the cache memory; and
managing I/O access to data based on the metadata structure, including obtaining the root node and nodes of the at least one tree level of the metadata structure maintained in the cache memory from the cache memory and obtaining at least one node of another tree level of the metadata structure, other than the at least one tree level of the metadata structure maintained in the cache memory, from the one or more storage devices, wherein nodes of a first group associated with one or more lowest tree levels of the metadata structure, including at least a tree level of direct nodes, are temporarily loaded to the cache memory when required for managing the I/O access to data based on the metadata structure, and nodes of a second group associated with one or more higher tree levels above the one or more lowest tree levels in the metadata structure are systematically maintained in the cache memory—independently of a frequency of the I/O access to data, each of the nodes of the first group being different from each of the nodes of the second group, —and wherein the managing of the I/O access to data includes determining nodes of the first group, loading the nodes of the first group from the one or more storage devices and accessing to data based on the nodes of the first group loaded from the one or more storage devices and—accessing to data based on the—nodes of the second group—which are already—systematically maintained in the cache memory.

16. The data storage system according to claim 15, wherein
the root node and nodes of at least one tree level of the metadata structure are systematically maintained in the cache memory for managing the I/O access to data based on the metadata structures, and
the at least one node of another tree level of the metadata structure is temporarily loaded to the cache memory when required for managing the I/O access to data based on the metadata structures.

17. The data storage system according to claim 15, wherein
writing modified nodes of the first group to the one or more storage devices is controlled on the basis of taking a first-type of checkpoint, and writing modified nodes of the second group to the one or more storage devices is controlled on the basis of taking a second-type of checkpoint.

18. The data storage system according to claim 15, wherein
taking a new first-type checkpoint and writing nodes of the first group which have been modified in a previous first-type checkpoint to the one or more storage devices, is performed more frequently than taking a new second-type checkpoint and writing nodes of the second group which have been modified in a previous second-type checkpoint to the one or more storage devices.

19. The data storage system according to claim 15, wherein
modifying one or more nodes of the first group includes writing the one or more modified nodes to a non-volatile memory, and modifying one or more nodes of the second group includes writing respective delta data for each of the one or more modified nodes to the non-volatile memory, each respective delta data being indicative of a difference between the respective modified node of the second group as stored in the cache memory and the respective non-modified node as stored on the one or more storage devices.

20. The data storage system according to claim 19, wherein
the size of a delta data unit is smaller than a size of an associated node.

21. The data storage system according to claim 19, wherein
taking a new first-type checkpoint is performed when an amount of data of nodes of the first group in the non-volatile memory exceeds a first threshold, and
taking a new second-type checkpoint is performed when an amount of delta data associated with nodes of the second group in the non-volatile memory exceeds a second threshold.

22. The data storage system according to claim 21, wherein
the second threshold is larger than the first threshold.

23. The data storage system according to claim 19, wherein,
when performing a recovery operation, recovering a previously modified node of the first group includes reading the modified node of the first group from the non-volatile memory, and recovering a previously modified node of the second group includes reading the corresponding non-modified node from the one or more storage devices, reading corresponding delta data from the non-volatile memory, and modifying the non-modified node based on the corresponding delta data.

24. The data storage system according to claim 19, the method further comprising:
changing a highest node tree level of the nodes of the first group to become a new lowest node tree level of the nodes of the second group based on monitoring a cache capacity, in particular if a data amount of nodes of the second group falls below a third threshold, and
changing a lowest node tree level of the nodes of the second group to become a new highest node tree level of the nodes of the first group based on monitoring a cache capacity, in particular if a data amount of nodes of the second group exceeds a fourth threshold.

25. The data storage system according to claim 19, wherein,
when modifying a node of the second group associated with a new second-type checkpoint before a respective corresponding modified node of the second group associated with a previous second-type checkpoint is written to the one or more storage devices, the respective modified node of the second group associated with the new second-type checkpoint and corresponding reverse delta data is stored in the cache memory, the corresponding reverse delta data being indicative of a difference between the respective modified node of the second group as stored in the cache memory and the respective corresponding modified node of the second group associated the previous second-type checkpoint.

26. The data storage system according to claim 25, wherein,
writing the respective corresponding modified node of the second group associated with the previous second-type checkpoint to the one or more storage devices includes modifying the respective modified node of the second group as stored in the cache memory based on the corresponding reverse delta data as stored in the cache memory.

* * * * *